US009092807B1

(12) United States Patent  (10) Patent No.: US 9,092,807 B1
Cosman  (45) Date of Patent: Jul. 28, 2015

(54) NETWORK-BASED SYSTEMS AND METHODS FOR DEFINING AND MANAGING MULTI-DIMENSIONAL, ADVERTISING IMPRESSION INVENTORY

(75) Inventor: Charles Douglas Cosman, Boulder, CO (US)

(73) Assignee: APPNEXUS YIELDEX LLC, New York, NY (US)

( * ) Notice: Subject to any disclaimer, the term of this patent is extended or adjusted under 35 U.S.C. 154(b) by 777 days.

(21) Appl. No.: 11/743,962

(22) Filed: May 3, 2007

Related U.S. Application Data

(60) Provisional application No. 60/798,021, filed on May 5, 2006.

(51) Int. Cl.
*G06Q 30/02* (2012.01)
*G06Q 10/08* (2012.01)

(52) U.S. Cl.
CPC ........ *G06Q 30/0277* (2013.01); *G06Q 30/0251* (2013.01); *G06Q 10/087* (2013.01); *G06Q 30/0253* (2013.01); *G06Q 30/0269* (2013.01)

(58) Field of Classification Search
CPC .......... G06Q 30/0277; G06Q 30/0251; G06Q 30/0253; G06Q 30/0269; G06Q 10/087
USPC ......................................................... 705/29
See application file for complete search history.

(56) References Cited

U.S. PATENT DOCUMENTS

| 5,761,652 | A | 6/1998 | Wu et al. |
| 5,966,126 | A | 10/1999 | Szabo |
| 6,064,967 | A | 5/2000 | Speicher |
| 6,338,053 | B2 * | 1/2002 | Uehara et al. ..................... 707/1 |
| 6,502,077 | B1 | 12/2002 | Speicher |
| 6,756,994 | B1 | 6/2004 | Tlaskal |
| 6,801,945 | B2 | 10/2004 | Lin et al. |
| 7,136,871 | B2 | 11/2006 | Ozer et al. |

(Continued)

FOREIGN PATENT DOCUMENTS

WO  99/13398  3/1999

OTHER PUBLICATIONS

Nakamura, et al., "Improvements to the Linear Programming Based Scheduling of Web Advertisements", Electronic Commerce Research, vol. 5, Jan. 2005, pp. 75-98.

*Primary Examiner* — Florian Zeender
*Assistant Examiner* — H Rojas
(74) *Attorney, Agent, or Firm* — Michael A. Glenn; Perkins Coie LLP

(57) ABSTRACT

A method for representing and managing an inventory of overlapping multi-dimensional items such as advertising or ad impressions. The method uses an inventory management module to generate unique segment identifiers for sets of inventory items by processing descriptions of the sets of impressions including defining criteria. The method includes processing the unique segment identifiers to create a representation of the inventory as a plurality of inventory regions, which may include non-overlapping regions that correspond to inventory items in a single set of the inventory and also include overlapping regions that correspond to inventory items in two or more of the sets (e.g., items that match two or more sets of defining criteria or attributes). Availability and selection of inventory is determined using the information on inventory regions to control effects of cannibalization, such as by implementing logically necessary allocation to only cannibalize a region on a limited or forced basis.

9 Claims, 47 Drawing Sheets

(56) References Cited

U.S. PATENT DOCUMENTS

| | | |
|---|---|---|
| 7,174,305 B2 | 2/2007 | Carruthers et al. |
| 2001/0042006 A1 | 11/2001 | Chan et al. |
| 2002/0069105 A1* | 6/2002 | do Rosario Botelho et al. .............................. 705/14 |
| 2002/0104083 A1 | 8/2002 | Hendricks et al. |
| 2002/0133399 A1* | 9/2002 | Main ................................ 705/14 |
| 2003/0050827 A1 | 3/2003 | Hennessey |
| 2003/0154142 A1 | 8/2003 | Ginsburg |
| 2004/0024778 A1* | 2/2004 | Cheo ........................ 707/104.1 |
| 2004/0059708 A1 | 3/2004 | Dean |
| 2004/0093286 A1* | 5/2004 | Cooper et al. ................... 705/28 |
| 2004/0138956 A1 | 7/2004 | Main et al. |
| 2005/0021403 A1 | 1/2005 | Ozer et al. |
| 2005/0050215 A1 | 3/2005 | Lin et al. |
| 2005/0182676 A1 | 8/2005 | Chan |
| 2006/0026067 A1* | 2/2006 | Nicholas et al. ................. 705/14 |
| 2006/0053069 A1 | 3/2006 | Ebel et al. |
| 2006/0080171 A1 | 4/2006 | Jardins et al. |
| 2006/0212898 A1 | 9/2006 | Steelberg et al. |
| 2006/0253327 A1 | 11/2006 | Morris et al. |
| 2007/0039018 A1 | 2/2007 | Saslow et al. |

* cited by examiner

NETWORK-BASED SYSTEMS AND METHODS FOR DEFINING AND MANAGING MULTI-DIMENSIONAL, ADVERTISING IMPRESSION INVENTORY

CROSS-REFERENCE TO RELATED APPLICATIONS

This application claims the benefit of U.S. Provisional Application No. 60/798,021 filed May 5, 2006, which is incorporated herein by reference in its entirety.

BACKGROUND OF THE INVENTION

1. Field of the Invention

The present invention relates, in general, to managing advertising over digital communications networks such as the Internet and satellite and cable digital television, and, more particularly, to software, hardware, and computer systems and methods for building an accurate representation of available advertising space inventory (e.g., available impressions on web pages or the like meeting particular criteria or attributes of a product segment) and for allocating the available inventory in an improved manner to limit cannibalization of overlapping inventory segments.

2. Relevant Background

Use of the Internet and similar communications networks has become ubiquitous with millions of people accessing information and communicating with their computers and other network devices such as wireless phones. Even television has become digital and information and programming is provided to televisions via set top boxes and the like or over the Internet to computers and network devices. Each person that accesses such networks and digital information represents a customer that can be targeted for advertising such as space on the periphery of a web page, a streaming border about a digital image or video, pop up images, and many other forms of Internet and digital media advertising. Briefly, an ongoing problem for service providers such as Internet web service providers and digital television companies is how best to allocate their advertising time and space. Conflicting goals are to sell all advertising space or impressions (e.g., advertising product) that are available but also to sell the advertising product in such a way as to maximize advertising revenue. The following background information is provided to explain the difficulty of managing advertising product due in large part to the complexity of describing available advertising products such as impressions that fit into multiple product segments and offering such impressions to one purchaser necessarily means that the impressions are no longer available to a later purchaser who may have been willing to pay more for the product (e.g., results in "cannibalization" of an advertising product segment).

Advertising on the Internet has become a huge market with annual advertising expenditure in excess of $14 billion in the United States in 2006. When compared to traditional broadcast advertising, the Internet advertising market differs in sophistication with regard to the target audience that a given advertising campaign is intended to reach as well as the variety of metrics used for measuring the advertising goal set by an advertiser or advertising product purchaser. Advertising campaigns are now commonly specified for delivery to specific target audiences, e.g., a market segment, with advertising viewers that have a specified combination of criteria such as people who have a certain age, live in a select locale, have particular interests and hobbies, have a certain income, and/or other criteria or combinations of such criteria. Beyond the domain of Internet advertising, the day has arrived where the broadcast medium is beginning to apply the same sophisticated marketing techniques to the television medium via similar technologies as used by Internet advertisers and sellers of advertising products being implemented in set-top boxes or other access control devices used by cable and satellite broadcasting systems to provide their customers with programming and, increasingly, advertising that is targeted toward particular viewers or customers.

Along with this increase in sophistication demanded by advertisers, the problem of managing the advertising product or impression inventory by the sellers of advertising products also has increased significantly. As in any advertising medium, the amount of advertising inventory available in a given period of time is finite (e.g., there are only so many impressions left available for a particular web site or on web service pages). Contracts are created between advertisers and publishers (e.g., buyers of advertising products or impression inventory) that specify a particular market segment, range of dates for publication of their advertisements, and an advertising goal that, independent of the metrics used to quantify the goal, translate into a certain quantity of the available inventory. Many of these contracts compete for the same limited inventory of advertising products. If two contracts specify the same segment such as men that are under thirty years old that enjoy fishing or some other set of criteria or attributes of the viewers of the advertising, the contracts clearly compete directly for the inventory. Managing such direct competition for advertising product inventory is relatively simple to manage. However, much more complicated problems arise in managing advertising inventory available on the Internet or other digital media such as digital television. For example, even if two contracts specify different segments, they still compete for the same inventory inasmuch as their specified market segments overlap. One example may be a first contract that simply requests that its ads be delivered to a segment made up of viewers that are under thirty years old while a second contract requests its ads be delivered to a segment made up of females under thirty years old. These two inventory segments overlap and fulfilling the first contract typically will result in the sale of inventory in both segments (e.g., cannibalization of the segment having attributes of females under thirty years old to satisfy a contract requesting simply viewers under thirty years old). The complexity of advertising management rapidly increases with the number of attributes that are used to specify market segments and the number of different segments concurrently under contract.

Further, when advertiser demand is high, the total sold inventory of a given publisher property may approach one hundred percent. At this point, accurately managing the inventory becomes a critical component of maximizing advertising revenue. To the extent that these quantities are not managed optimally, revenue is lost. For example, if the available quantity of a given market segment or advertising product is underestimated, valuable inventory will go unsold, and the seller of such advertising product or inventory loses revenue corresponding to the lost sales. Conversely, if the available quantity of inventory is overestimated, one or more contracts cannot be fully delivered (e.g., there are not enough impressions on web pages for the number of ads that need to be published or delivered according to the contracts). This results in a revenue adjustment or a lengthening of the contract period, which often causes other contracts to fail as it results in other advertising inventory being used to service the previously unfulfilled contract.

Managing these aspects of the inventory is a difficult task that continues to be a challenge to all publishers or sellers of advertising space. The advertising market continues to grow, and Internet publishers are enjoying strong demand for their inventory and as a result are selling a majority of their advertising space. However, the majority of Internet publishers continue to struggle with the various aspects of this problem and, as a result, potential advertising revenue is lost every day. Internet publishers are continuously looking for ways to better manage their advertising inventory such as by better fulfilling contracts with their advertising segments (or segmented inventory) because they understand this may significantly enhance their overall revenue numbers.

As noted above, the advertising inventory being managed is in some cases the advertising impressions being viewed on an Internet site. In this environment, the inventory or advertising product available is commonly measured as the total number of ad spaces on which an advertisement, in any form, can appear anywhere on the pages that make up the web site. This total number is multiplied by the number of times the individual pages are viewed by end users over a given time period, typically a day (i.e., the daily impression count). Each presentation of an individual advertisement in this environment is called an ad "impression". The individual attributes or criteria that characterize the various advertising products are hereafter referred to interchangeably as variables or the dimensions of the inventory. These attributes can vary significantly between publishing properties such as web sites depending on the type of property and the availability of any additional data available to the publishers that has market value to their potential advertisers (e.g., information on the viewers or users of the web site via cookies or the like). For example, attributes can be location specific representing some aspect of the location of the advertisement within a subset of the content area of a web site. In other cases, the attributes can be time related, such as time of day or day of week. Yet further, the attributes can be geographical, such as city, state, or country attributes or be demographical with attributes such as gender, age, and income. In still other cases, the attributes may include information on a viewer's or user's purchase history with attributes such as a list of recently purchased products or the attributes can be specific to the particular market segment that a particular publisher targets such as with their web site content.

Regardless of the inventory domain or the dimensions that characterize the inventory, there are several critical data points of interest, and providing an accurate estimation of these values or quantities is at the core of accurate inventory management. One such data point is the "total forecast" that can be defined as the total anticipated quantity of inventory for a particular segment of the inventory over a particular time period as projected by the analysis of historical data. In the advertising inventory domain, this number represents the total amount of expected advertising impressions available during the specified period that will meet the criteria of the specified market segment. Market or product segments can also be referred to as product segments or, more simply, advertising products since they are usually sold by publishers as such, and, therefore, these terms are used interchangeably in this document. For example, a product segment may be defined as viewers that are males that are 30 to 40 years old with an impression location anywhere in the hierarchy of web pages making up the finance section of a particular web site over the period of one day for a particular ad space. With all of these criteria or segment parameters in mind, the calculated total forecast number for that advertising product would represent the total amount of impressions that are expected to meet the set of criteria or segment parameters.

The total forecast value may be subdivided into two components. A first component is the "base forecast," which represents the total forecast quantity as derived directly from recent history. In the Internet advertising domain, the "history" typically includes transaction logs of the information available from the computer servers that serve the advertisements for a particular web site or network of web sites (e.g., ad servers). A second component is the "predicted forecast," which includes extrapolations of the base forecast forward in time including considering historical growth and also considering seasonality patterns such as sporting events, holiday traffic, or day of the week to accordingly modify the predicted forecast.

One challenge of producing a base forecast involves quantifying all of the products within the publisher's inventory in a way that is accurate but still meets the performance requirements of the system. For smaller inventory sets such as those of small to medium publishers with a total daily volume of perhaps a million total ad impressions per day, it may be acceptable to import the entire inventory set into a computer system for management. However, for larger inventory sets such as those from publishing domains with a daily volume of impressions in the hundreds of millions or billions per day, this is not practical due to the amount of processing time it takes to perform direct analysis on the data. For example, the time to scan and aggregate a billion records in a relational database may take on the order of hours, whereas an order entry system trying to fill an advertisement request might require a one second response time.

Another challenge facing a designer of an advertising management process is that the data needs to be sampled in a way that meets both the required accuracy as well as the required performance metrics of the system. This is a difficult task since representing the inventory with a sample of the data in order to meet the required performance level can reduce the accuracy of the base forecast numbers. According to sampling theory, the reduction in sampling accuracy is directly related to both the size of the sample and the relative scarcity of the segment being measured. Unfortunately, in the advertising domain, the smaller the product segment the more likely it is to have a higher value to a publisher and advertiser. Therefore, the more vulnerable a smaller segment of advertising inventory is to sampling error.

In addition to the total forecast value, another quantity that should be considered in managing Internet and other digital advertising is the "total sold" value or data point, which is typically defined as the total amount of sold inventory for a particular segment of the inventory over a particular time period. This represents the number of impressions for a given advertising product or segment that have already been sold based on previous advertising requests or orders, which also may be referred to as reserved or allocated product or impressions. Generally, the total sold value is relatively simple to manage. For the purposes of the present discussion, the terms "sold" and "allocated" are considered equivalent where reference herein both in text and in equations.

An additional value or quantity that typically is considered when managing Internet or digital advertising is the "total available," which can be defined as the total amount of remaining inventory that is available for sale. The total available also is limited to the advertising product or impressions that meet the specified criteria of the requested advertising product when considering both the base forecast of the product less the quantity of inventory consumed by previous orders.

Adding to the complexity of managing these values or quantities is the fact that the relationships between the different product segments within a publisher's advertising inventory can differ considerably. Some segments represent subsets of the total inventory that are mutually exclusive. For example, if one segment was for a location anywhere in the finance area of a given web site and another was for a location anywhere in the shopping area, then no single piece of inventory is common to both segments. But some product sets have a hierarchical relationship in which one segment is a total subset of the other. For example, a product representing impressions located anywhere within the shopping section of a site has a hierarchical relationship with the impressions located within the electronics subsection of the shopping area. As noted above, other inventory segments may partially overlap. Market segments characterized by user demographics typically have this property. For example, if one product has dimensions or attributes that its viewers are males of age 30 to 40 years and another product has attributes of age 30 to 40 years living in the San Francisco area, there will be inventory that is common to both sets (i.e., the segments partially overlap but are not fully hierarchical). To the extent that many inventory segments will overlap, in whole or in part, the effects of the sale of a quantity of inventory of one product segment can potentially impact the availability of many others that overlap with it. This is an aspect of managing multi-dimensional inventory that makes it much more complex than the management of conventional inventory and may be thought of as cannibalization.

With overlapping product definitions, the forecast and availability of each product is reported individually. Therefore, when considering the forecast and availability of more than one product, the forecast and availability of all the products taken concurrently will be far less than the sum of all the individual product forecast and the available quantities because many of the products will share some or all of the same inventory. Beyond quantifying all these values accurately, it is important that the inventory management system is fully synchronized with the delivery system so that the delivery system allocates inventory in accordance with the same management methods used to report these metrics.

Hence, there remains a need for improved methods and systems for managing advertising inventory or products (e.g., available ad space or impressions) that are typically defined by a set of dimensions or criteria (e.g., multi-dimensional inventory or products) and that are published or delivered on the Internet or via other digital media such as cable or satellite television. Preferably, such methods and systems would be adapted to provide an enhanced representation of available inventory based on the dimensions or criteria (also sometimes referred to as variables) used to define segments of the advertising inventory or sets of ad impressions. Additionally, the methods and systems preferably would be able to better control or limit cannibalization of various segments to satisfy contracts for inventory while also increasing the ability of a publisher or advertising seller to fulfill contracts (e.g., to provide impressions matching the criteria specified by a buyer or party to a contract for such advertising inventory).

SUMMARY OF THE INVENTION

To address the above and other problems with managing inventories that are described multi-dimensionally such as Internet or other digital advertising inventories, embodiments of the present invention provide an inventory management system and methods that include improved techniques for building a representation of the available inventory and for allocating portions of this available inventory to fulfill contracts. The available inventory is represented by decomposing large amounts of historical data to reduce it to its essence or what is important for fulfilling contracts effectively based on a given set of segment criteria (or variables or parameters or "dimensions"). In some cases, the representation techniques are performed by one or more software modules that decompose server transaction logs and build compressed representations or product vectors that represent each product segment or set of advertising product (e.g., ad impressions) including representations and information on overlapping data segments or intersections of two or more product sets (e.g., regions of inventory that may define a non-overlapping portion of a segment or an overlapping portion formed by the intersection or overlap of two or more segments). Representations of available inventory built according to the invention also allow systems and methods of the invention to provide enhanced inventory forecasts.

One feature of the inventory allocation techniques employed by embodiments of the invention is that it limits cannibalization of overlapping segments or advertising products such as via the use of logically necessary (or forced) allocation. In contrast to the use of simple proportions or averaging to allocate product or impressions from overlapping segments to control cannibalization, logically necessary allocation reduces and, in some cases, fully minimizes cannibalization as it allocates available product or inventory from overlapping segments to fulfill contracts. The inventory management systems and methods of the invention provide techniques for improving advertising revenue. However, the systems and methods are not necessarily directed toward targeted advertising techniques or marketing to a particular segment but, instead, are mainly interested in providing a better characterization of available inventory and how to allocate often overlapping and hierarchically related advertising products that may be grouped into segments (which, in turn, are defined by one or more variable or criteria of interest to advertisers) so as to fulfill contracts in a more optimized manner.

Before providing more specific examples of embodiments of the invention, it may be useful to provide a more general background and problem context as understood by the inventor, with this understanding allowing solutions to previously troubling problems becoming apparent to the inventor. Embodiments of the invention relate to a system for the management of multi-dimensional inventory. Multi-dimensional inventory is any resource for which accounting and allocation is required, whereas management is required not only on the total population of the inventory but also on individual segments thereof that can potentially be defined by specifying specific values for any arbitrary number of the attributes or criteria that characterize the inventory. One embodiment of the inventory being managed and described herein by embodiments of the management system is advertising inventory in which the total finite set of inventory to be managed is the set of all of the advertisements that are available for sale over a given time period for a given publishing domain.

While many of the described embodiments describe advertising inventory in the Internet publishing domain as the set to be managed, it should understood that the same methods and systems are useful for managing advertising inventory in other domains. For example, properly enabled set-top boxes or similar devices in a broadcast medium such as satellite or cable television system can readily be used to deliver ad impressions and digital advertising products to viewers based on a contract between the publisher (or seller of advertising) and an advertiser (or purchaser of advertising products). Further, beyond the advertising domain, the systems and methods described herein can be applied to the management of any finite resource where the available quantity and allocation is to be managed by specifying particular subsets, or segments, based on specifying values for the attributes that characterize those subsets. For example, the systems and methods of the invention, with minimal modification, can be deployed to manage the creation of risk pools of individual insurance policies based on the values for any number of variables that characterize the risks associated with a set of policyholders. Another example from the area of finance is to allocate pools of new mortgage debt being packaged for mortgage backed securities, similar to the advertising product segments, based on a number of variables that characterize debt such as credit risk, yield range, time to maturity, or the like.

Embodiments of the present invention define systems and methods to create an approach for the management and optimization of multi-dimensional inventory. In these systems and methods, the quantities of forecast, sold, and available counts are represented with significantly increased accuracy. Further, the systems and methods produce and accurately apply forecast growth models to reflect the growth and seasonal effects of the publishing domain. Beyond the achievement of greater accuracy, the present invention provides methods to manage the allocation of inventory in a way that the consumption of correlated products is reduced to its logical minimum or nearer such minimum resulting in creating the maximum possible availability of all products and, therefore, the maximum or increased revenue. Further, the present invention provides systems and methods to communicate with a system or systems that are responsible for real-time allocation and delivery of the inventory (e.g., ad servers and the like in a delivery system), in a manner that is consistent and fully synchronized with the system as a whole. In this way, the management techniques used by the management system are accurately mirrored by the behavior of the delivery system. Taking these advantages and features together and assuming a sales environment where demand for certain products is meeting or exceeding the supply as managed by a less efficient mechanism than that described herein, the systems and methods of the invention, which accurately forecast product inventory and simultaneously or concurrently minimize the consumption of overlapping products, provides through its efficiencies the benefit to the publisher of being able to sell and successfully deliver more inventory to contract, which allows the inventory owner to capture more revenue. Although actual numbers are generally difficult to accurately quantify, it has been estimated that for many publishing properties involved in Internet advertising, the present invention will provide an average increase in gross advertising revenues of approximately 15 percent on the existing visitor traffic when compared to typical existing inventory management systems.

Additionally, the systems and methods described herein are inventory neutral inasmuch as the managed attributes of the inventory that are used to define product segments can be from any domain of values. Further, the systems and methods are designed to concurrently handle site-specific inventory attributes so that in a domain of sites in an advertising network individual sites can define and sell inventory according to the specifics of their target market. The present invention also supports a variety of contract types including guaranteed, exclusive, auctioned, and preemptible contracts, which can all concurrently coexist across any advertising product mix. Further, a variety of contract metrics are supported including Cost Per Thousand (CPM) and Cost Per Click (CPC), which can also coexist for any arbitrary mix of products. Yet further, the methods and systems according to the present invention are neutral with regard to the delivery system and order management system so that they can be incorporated to interface with new or existing order management and ad delivery systems in both the Internet and broadcast domains.

More particularly, a computer-based method is provided for representing and managing an inventory of overlapping items such as advertising or "ad" impressions. The method includes running an inventory management module on a computer, server, or the like and using this module to generate a plurality of unique segment identifiers for sets of the items in the inventory. This is typically done by processing descriptions of the sets of impressions such as by defining criteria or parameters (e.g., dimensions) for the items in each of the sets. The method also includes processing the unique segment identifiers with the inventory management module to create a representation of the inventory as a plurality of inventory regions, which may include non-overlapping regions that correspond to inventory items in a single set of the inventory and also include overlapping regions that correspond to inventory items in two or more of the sets (e.g., items in such regions match the defining criteria of two or more segments of the inventory such as would be the case in the simple example of one segment including impressions directed to males while another segment includes impressions directed to males under 30 years old). The method includes generating a count defining a number of the items corresponding to each of the inventory regions and storing the counts and representation of the inventory in memory or a data store. Then, in response to an inventory availability request received by the inventory management module (such as from an order management system), a report is provided or transmitted to the requesting application that includes at least a portion of the counts and the inventory representation. In this way, an application using the inventory is provided information not just on the individual segments but also on the overlapping portions of the inventory.

In some embodiments, the representation of the inventory includes a product vector representation of each of the inventory regions such as a bitmap of each region with a bit that can be set for an inventory item to indicate each segment into which the item fits (e.g., for which the item has matching criteria or defining parameters). In the case of ad impressions, the generating of the counts associated with the inventory regions may include forecasting for a particular time interval the number of impressions by processing historical transaction logs to determine for each record which segments correspond to that ad impression and then determining counts for each region in the inventory including the overlapping regions (or regions defined by two or more overlapping segments). Management of the inventory may include the inventory management module receiving a quantity of the items to allocate and determining availability of the particular item by changing the availability of all the other inventory items to account for cannibalization while minimizing or at least controlling the effects of cannibalization on the other items. In some preferred embodiments, this is achieved by utilizing a logically necessary or forced allocation method that may be provided by one of the following product availability techniques: a hierarchical method, an overlapping set method, a constraining set method, and a lowest cardinality assignment method (with each of these methods/techniques described or defined in detail herein).

DETAILED DESCRIPTION OF THE PREFERRED EMBODIMENTS

The present invention is directed to methods and systems for managing multi-dimensional inventory such as advertising product inventory that is allocated via contracts to purchasers or advertisers and later delivered via a delivery system. The following description begins with an overview of one useful implementation of an inventory management system that may be provided within a computer network to provide the functionality of the present invention. The functions of the various components and the data created and communicated in an inventory management system are then described in detail with emphasis provided on the significant features related to building an accurate representation of available inventory (e.g., compressing transaction logs and other input records/data to obtain a representation that includes only information in a data structure such as product vectors that include information useful for allocating the inventory) and related to allocating such inventory.

The functions and features of the invention are described as being performed, in some cases, by "modules" that may be implemented as software running on a computing device and/or hardware. The methods or processes performed by each module is described in detail below typically with reference to flow charts highlighting the steps that may be performed by subroutines or algorithms when a computer or computing device runs code or programs. Further, to practice the invention, the computer, network, and data storage devices and systems may be any devices useful for providing the described functions, including well-known data processing and storage and communication devices and systems such as computer devices or nodes typically used in computer systems or networks with processing, memory, and input/output components, and server devices configured to generate and transmit digital data over a communications network. Data typically is communicated in a wired or wireless manner over digital communications networks such as the Internet, intranets, or the like (which may be represented in some figures simply as connecting lines and/or arrows representing data flow over such networks or more directly between two or more devices or modules) such as in digital format following standard communication and transfer protocols such as TCP/IP protocols.

Figure 1:
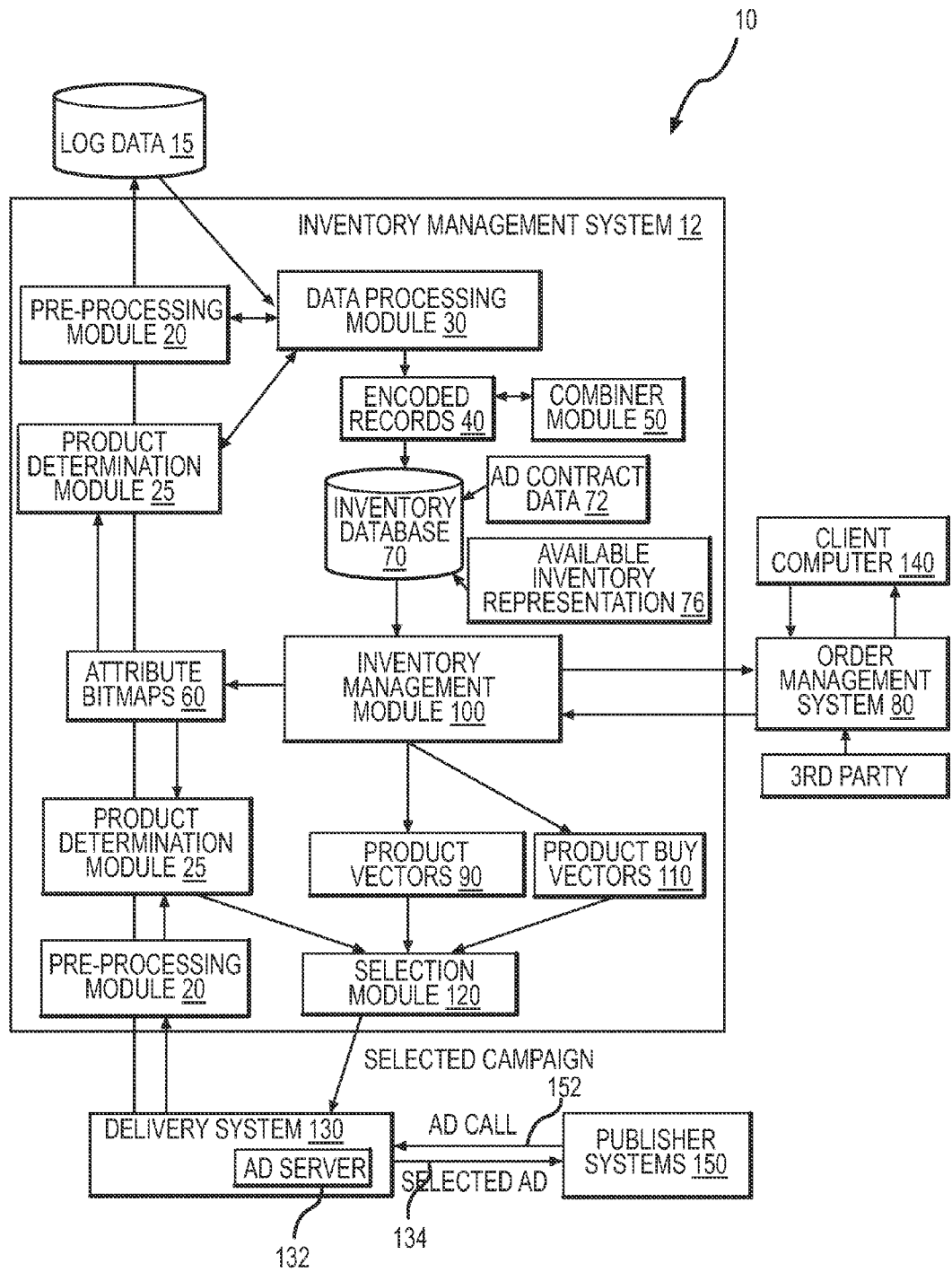
FIG. 1 is a functional block diagram of a computer network or distributed computing system incorporating an inventory management system according to an embodiment of the invention.

FIG. 1 illustrates a simplified schematic diagram of an exemplary computer system or network 10 and its major components that can be used to implement an embodiment of the present invention. The system 10 includes an inventory management system 12 according to the present invention that may be provided on one or more standalone servers or other computing and data storage devices or may be provided as part of another system (e.g., as part of an order management system 80 or a delivery system 130). The inventory management system 12 includes a pre-processing module 20, a product determination module(s) 25, a data processing module 30, a combiner module 50, an inventory database 70, an inventory management module 100, and a selection module 120. The system 12 interfaces and interacts during inventory management and product delivery with a historical collection of log data or server transaction logs 15, an order management system 80, a delivery system 130 including an ad server 132, and a client computer 140.

During operation of the system 10 and inventory management system 12, the client computer 140 interfaces such as with a GUI or an interface run via a browser with the order management system 80. The order management system 80 in turn interacts with the inventory management module 100 of the inventory management system 12 to get information on the forecast quantities and available quantities, over a plurality of days, of one or more products of interest, each of which are associated with a particular segment of the data for which there is a market demand (all of which may be provided in the available inventory representation 76 in inventory database 70 or stored elsewhere in the system 12 or accessible by system 12). Acting on the returned information, a certain quantity of inventory (e.g., a purchase quantity) for a particular product segment can optionally be allocated by the inventory management module 100 over a plurality of days (e.g., a contract period) commencing from a particular date (e.g., a contract start date) and terminating on a particular subsequent date (e.g., a contract end date). Collectively, this process can be referred to as a product buy.

During an exemplary interaction or interface between the order management system 80 and the inventory management module 100, the management module 100 may receive a segment expression or segment identifier and a data range from the order management system 80 (with these terms being explained in more detail below). The inventory management module 100 acts to resolve the segment description to a segment identifier (if necessary), e.g., the order management system 80 does not have to be aware of how the system 12 is representing or identifying advertising products or segments so that it can submit queries on availability without regard to format and the module 100 acts to place the query or segment description into a matching format for look ups. The inventory management module 100 then may act to determine the current availability for the segment over the specified range of dates such as by doing a look up or comparison on the available inventory representation 76 or encoded records or forecast vectors in inventory database 70. The inventory management module 100 then returns a set of counts (e.g., one for each specified day or other specified time interval) for matching product segments in the inventory representation that are available for sale or assignment to a contract or product buy.

The data used and managed by the inventory management module 100 is stored in the inventory database 70 by the management module 100. This database 70 contains existing contract data 72 in the system including the particulars of the product segment for which each contract applies, the quantity of inventory that are sold under the contract, the plurality of dates over which the quantity of inventory is to be delivered, the contract fulfillment metric (e.g., Cost Per Thousand (CPM), Cost Per Click (CPC), Cost Per Action (CPA), or the like), the contract type (e.g., guaranteed impression, exclusive purchase, auction, preemptible, or the like), and the contract context (e.g., sales contract, contract proposal, management inventory hold, or the like). In addition to the contract information 72, the inventory database 70 also contains a pre-processed and logically compressed representation of the full population of inventory data 76 including, in some embodiments, the daily forecast of the inventory of impressions for each product over a plurality of dates from the present date to some date in the future (sometimes also called an inventory data structure, a topology of the inventory, a set of aggregated forecast vectors, and the like with an important feature being that the representation takes into account that a single piece of inventory such as an ad impression may satisfy more than one definition of a product or product segment (which in turn each may be defined by one or more criteria or parameters)). In this regard, the inventory data 76 includes in some embodiments both the forecast information on the individual product segments defined in the system as well as all the information about each product's correlation to all other products defined in the system 12.

The inventory management module 100 creates a list of managed products, which is defined as a unique set of product segments contained in the plurality of contracts 72 stored in the inventory database 70 in addition to any other segments that have been defined in the system as segments of interest for various purposes. Additionally, the inventory management module 100 optionally provides information on previously undefined product segments that are not currently referenced by any existing contract 72 stored in the inventory database 70. Using the contract and inventory data 72, 76 in the inventory database 70, the inventory management module 100 computes the product availability information, which is defined as the current available quantity of inventory for the plurality of product segments over a plurality of days and which is subsequently stored in the inventory database 70 as part of the available inventory representation data 76. This availability information 76 is computed by subtracting from the daily forecast of the inventory of impressions for each product segment over a plurality of days the amount of inventory allocated for each contract that specifies that same product segment for each date in the range of dates specified by the contract. Additionally, the inventory management module 100 subtracts from the number of available inventory impressions for each product the corresponding quantity of inventory that has been allocated as side effects of allocations to other segments. This second aspect of allocation is hereinafter referred to as cannibalization. The result of the availability calculations for the plurality of products over the plurality of days is stored in the inventory database 70 as part of the available inventory representation 76.

The inventory management module 100 periodically produces a set of product identifier vectors 90 and their associated weight values and also produces campaign identifier vectors 110 and their associated weight values, which collectively serve as control data for the selection module 120 as shown by arrows from vectors 90, 110 to selection module 120. When an ad call 152 is received by the advertising delivery system 130 from a publisher system 150 such as from a client device out on the network or possibly from a directly connected client device, the particulars of the ad call 152 are presented to the pre-processing module 20. After modifying or filtering the input record as necessary, the pre-processing module 20 provides the input record to the product determination module 25. The product determination module 25 returns a plurality of product identifiers that represent a unique set of eligible products whose associated segments of the population of the inventory data 76 are satisfied by the particulars of the input record.

Using the output of the product determination module 25 and the set of product vectors 90, the selection module 120 identifies the matching product vector and applies the associated weight values to determine the optimal product from the available inventory representation 76 to select in response to the particular ad call. Following product selection, the selection module 120 then uses the product buy vectors 110 to select the actual ad campaign associated with the selected product segment that was previously determined. This information is returned to the delivery system 130, which in turn selects the appropriate media associated with the particular ad campaign and logs the input record for future use by the system 12 operating according to the present invention. Additionally, if the selection module 120 determines that the ad call 152 was not needed to fulfill an inventory allocation under management by the system (e.g., in ad contract data 72), the selection module 120 can optionally return a reference back to the delivery platform 130 that it can proceed with its default behavior, e.g., to use the ad call 152 for an auction-based, non-guaranteed ad campaign or the like.

The following paragraphs provide more detailed methods and functionality of the inventory management system 12 of embodiments of the invention with many of the implemented methods explained or illustrated with data examples presented in tabular form. One preferred embodiment for storage of the data 72 and 76 used by the examples described below and stored in the inventory database 70, as well as other data stores such as the log data 15, is a relational database engine. However, those skilled in the art will recognize that these data stores can be implemented by any number of data storage technologies such as file based, ETL tools, hierarchical databases, object databases, and so forth.

Figure 2:
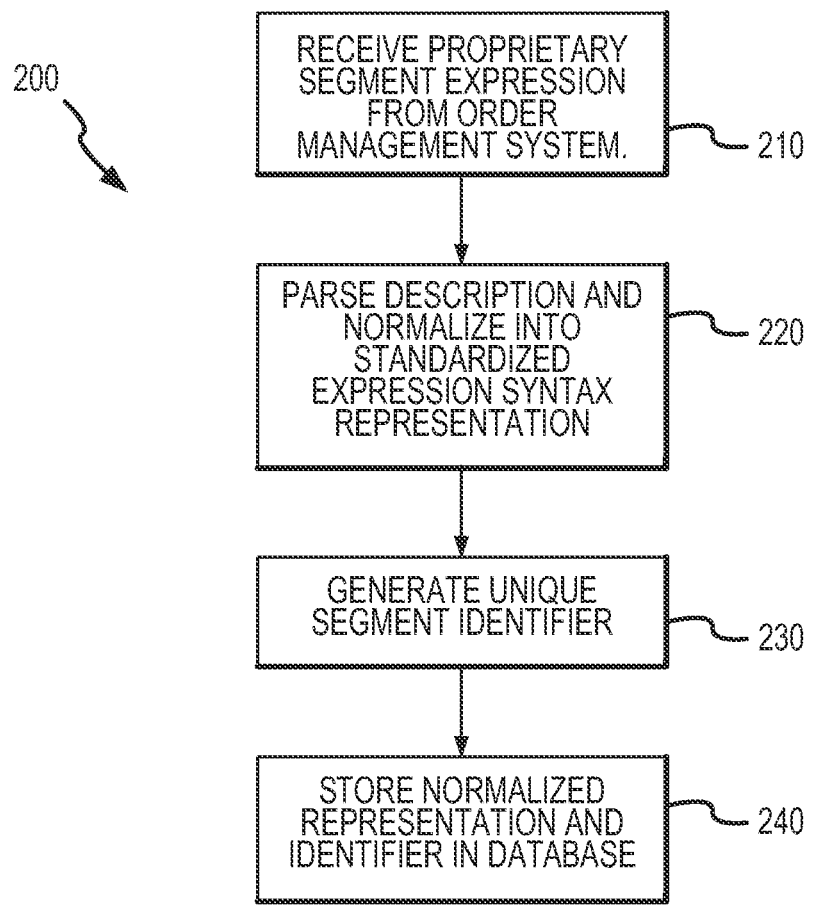
FIG. 2 is a flow diagram illustrating at a relatively high level a product definition formalization process performed by an inventory management module according to the invention.

A starting point for describing the aforementioned system 12 is a description of the methodology to formalize the various segments or sets specified by the various sales contracts and other references and to uniquely identify each of those specific segments with a unique identifier. In this manner, the inventory management module 100 is able to build a new and unique representation 76 of the available inventory that is made up of a plurality of segments or sets (e.g., sets of ad impressions that meet sets of criteria in the Internet or digital media advertising embodiments). FIG. 2 illustrates at a high level product definition formalization 200 performed by the inventory management module 100. At 210, the module 100 receives a proprietary segment expression from the order management system 80. At 220, the module 100 parses this description and normalizes it into a standardized expression syntax representation. At 230, the module 100 generates a unique segment identifier and, at 240, stores the normalized representation and identifier in the database 70 such as part of representation 76 or for use in forming representation or data structure 76.

The order management system 80 has the option of referring to a segment directly by the use of its associated identifier or by a descriptive string that specifies a Boolean-like expression (e.g., a predicate expression) that defines the constraining attributes, if any, of a subset of the data. Some simple examples of predicate strings are found in Table 1.

TABLE 1

Product Definition Examples

| Product ID | Bit Position | Terms | Predicate String | Horizon |
|---|---|---|---|---|
| 1 | 1 | 1 | state = "california" | 10 |
| 2 | 2 | 2 | age = "18-25" and income = "10k-25k" | 30 |
| 3 | 3 | 1 | gender = "female" | 15 |
| 4 | 4 | 2 | age IN ("18-25", "35-50") | 0 |
| 5 | 5 | 1 | Income != "10k-25k" | 0 |
| 6 | 6 | 1 | state = "California" and gender = "female" | 20 |
| 7 | 7 | 0 | Any | 0 |

The predicate string for product 1 specifies that all data that satisfy the constraints of product 1 have an attribute, associated with the name "state," containing a value of "california." Product 6 specifies the same constraint or criteria along with the additional criteria that the product segment has the value "female" for the attribute associated with the name "gender." In one useful embodiment, the inventory management module 100 parses the expression into individual terms each containing an attribute name, operator, and value or list of values. For expressions with multiple terms, each is typically separated by the Boolean operators "and" and "or." The attribute names and associated values can take on any value. The operators described herein within each term can be one of "=" for equivalence, "IN" for a list of values, or "!=" for non-equality, "<" for less than, ">" for greater than, "=<" for less than or equal to, and "=>" for greater than or equal to; however, it will be readily apparent to one skilled in the are that the set of operators can be extended to any desired operation such as CONTAINS and other operators.

Figure 3:
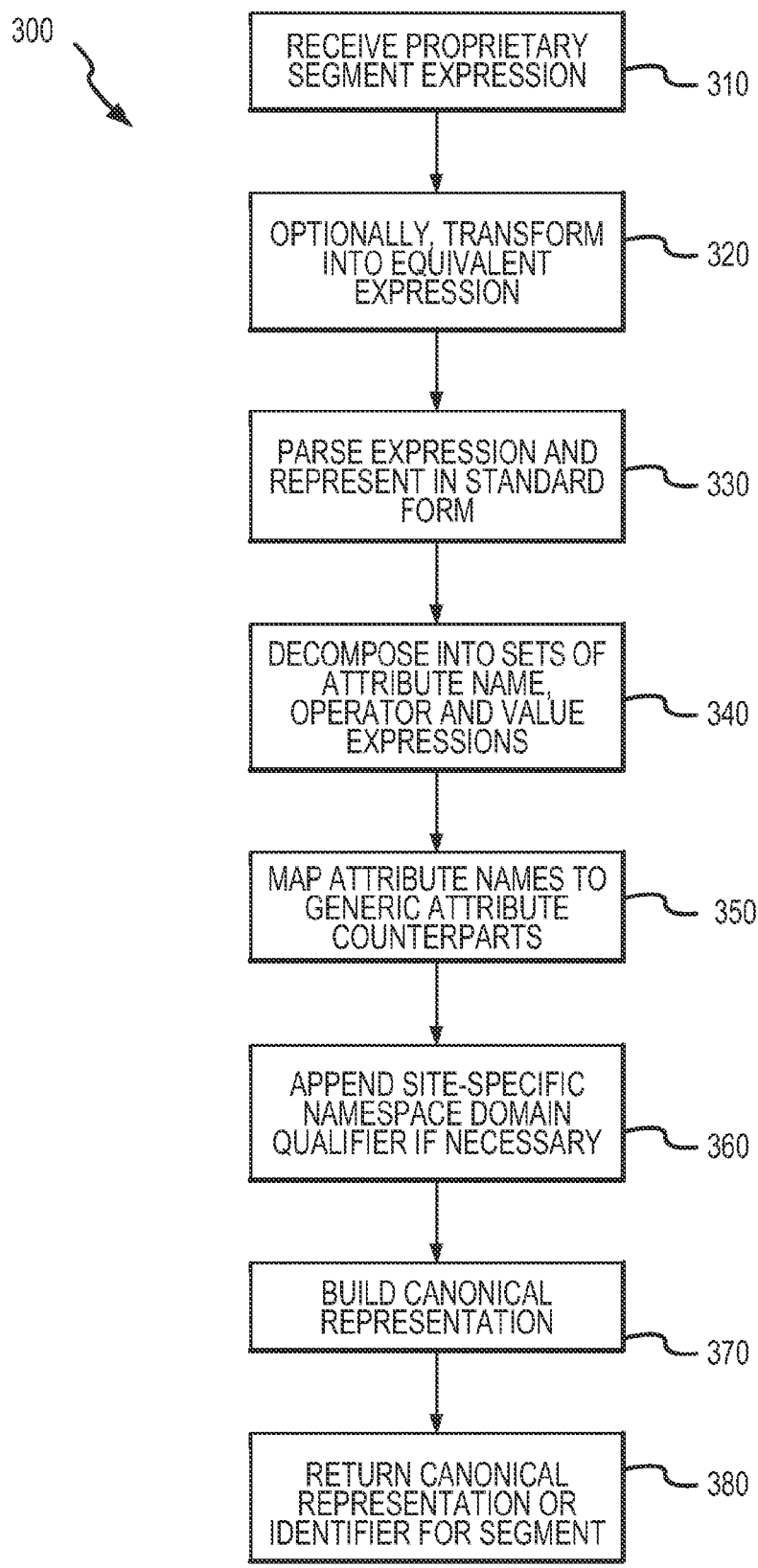
FIG. 3 is a flow diagram illustrating a more detailed view of a product definition formalization process performed by an inventory management module to provide a unique identifier for a product or segment of a managed inventory.

FIG. 3 illustrates a more detailed process 300 carried out typically by the module 100 for generating a product definition such as found in Table 1. At 310, the inventory management module 100 receives a proprietary segment expression from the order management system 80 and at 320 acts to optionally transform it into an equivalent expression. At 330, the module 100 parses the expression and represents it in a standard form. The module 100 then acts at 340 to decompose the standard form into sets of attribute name, operator, and value expressions. At 350, the attribute names are mapped to generic attribute counterparts, and at 360, a site-specific namespace domain qualifier may be appended, if necessary. The process 300 continues with the module 100 building at 370 a canonical representation for the segment (or portion of inventory such as set of ad impressions) and returning at 380 the canonical representation or identifier for the segment to the order management system 80 or for internal use in system 12.

The actual mechanism used to parse the predicate expression can take many forms provided the result of the parsing mechanism results in a logical construct that uniquely identifies the defined constraint set as expressed in the predicate expression. In an exemplary implementation of the present invention, the mechanism is a general parser that produces a syntax tree representing the predicate expression. It is recognized that, on occasion, different predicate expressions can, depending on the characterization of the data, actually resolve to the same subset. For example, if an attribute gender was two valued and non-null, the expressions "gender=male" and "gender !=female" would be equivalent. However, it is not essential to differentiate this case for the purposes of the present invention.

It is also acceptable for the parser to produce any transformations of the predicate expression provided they do not violate the axioms of set theory or Boolean algebra and that transformations are done in a consistent manner. For example, if an expression contained an OR' ed set of values for a single attribute, it could be transformed into an SQL-like IN operator. For example, the expression "state=california OR state=colorado" is equivalent to "state IN (california, colorado)". In yet another example, the operator "=" or "!=" can be transformed into the IN or NOT IN operators, respectively, with a single argument. Similarly, various methods can be utilized that implement transformations of compound expressions that contain an OR operator across different attributes into a set union of its component AND'ed terms, as is allowed via the distributive property of both set theory and Boolean algebra and illustrated by the expression: A & (B+C)=(A & B)+(A & C). For example the expression "gender=male AND state=california OR age=18-25" can be transformed into the set union of the set "gender=male AND state=california" and the set "age=18-25". In an exemplary method of the present invention, compound expressions of this form are transformed in this way into separate expressions to simplify the product determination process.

To perform attribute mapping using the attribute mapping data, which is stored in the inventory database 70 (such as part of the available inventory representation 76), and examples of which are illustrated in Table 2, the inventory management module 100 translates the attribute names contained in the predicate string into their generic counterparts that in turn are mapped to specific ordinal positions in the list of attributes. The translation of domain-specific attribute names into generic counterparts allows the system as a whole to uniformly apply the same management and control functions specified in the present invention across a variety of data domains. Although the mapping described herein specifies ordinal mapping, it should be apparent to those skilled in the art that other generic mapping schemes can be used to practice the invention.

TABLE 2

Attribute Mapping

| Display Name | Attribute Name | Position | Domain |
| --- | --- | --- | --- |
| State | Attr1 | 1 | Network |
| Age | Attr2 | 2 | Network |
| gender | Attr3 | 3 | Network |
| income | Attr4 | 4 | Network |
| holdings | Attr5 | 5 | mystocks.com |
| investment target | Attr6 | 6 | mystocks.com |
| Genre | Attr5 | 5 | movieworld.com |
| cobrand | Attr6 | 6 | movieworld.com |

The attribute mappings can apply globally across a single installation of the present invention as illustrated in the entries of Table 2 with a value of "network" for the "domain" attribute. Attributes that fall into this category apply uniformly to all data being managed by the system. Alternatively, the same positional attribute can be used for multiple mappings, each of which apply to and are scoped to an individual site domain. This is illustrated by the entries that have an individual site domain value listed in the "domain" attribute of Table 2.

For example the data in Table 2 and in Table 3 illustrate that the same positional attribute, i.e., "Attr5", is being mapped to two independent sets of attribute names and value domains. In this example, one Web site that is associated with personal finance is mapping the attribute to investment strategies while the other site, which is focused on the movie industry has mapped the same value to a particular movie genre. Additionally, this name-space approach can be used with attribute names with like values across different site domains to provide additional flexibility. As illustrated in Table 3, values associated with these attributes are appended with a separator character and the name of the specific domain. This value is appended to the input record by the pre-processing module 20. Optionally, the attribute names and values can be obfuscated as illustrated for reasons of privacy. Obfuscating the data allows the present invention and its methods and systems to manage and allocate inventory without knowing the semantics behind the inventory, thereby protecting the data provider from data theft or repurposing.

TABLE 3

Site-Level Attribute Encoding Examples

| Site | Encoded Value | Obfuscated Value |
|---|---|---|
| mystocks.com | growth@mystocks.com | g4bf4@mystocks.com |
| movieworld.com | drama@movieworld.com | t87gb@movieworld.com |

Figure 4:
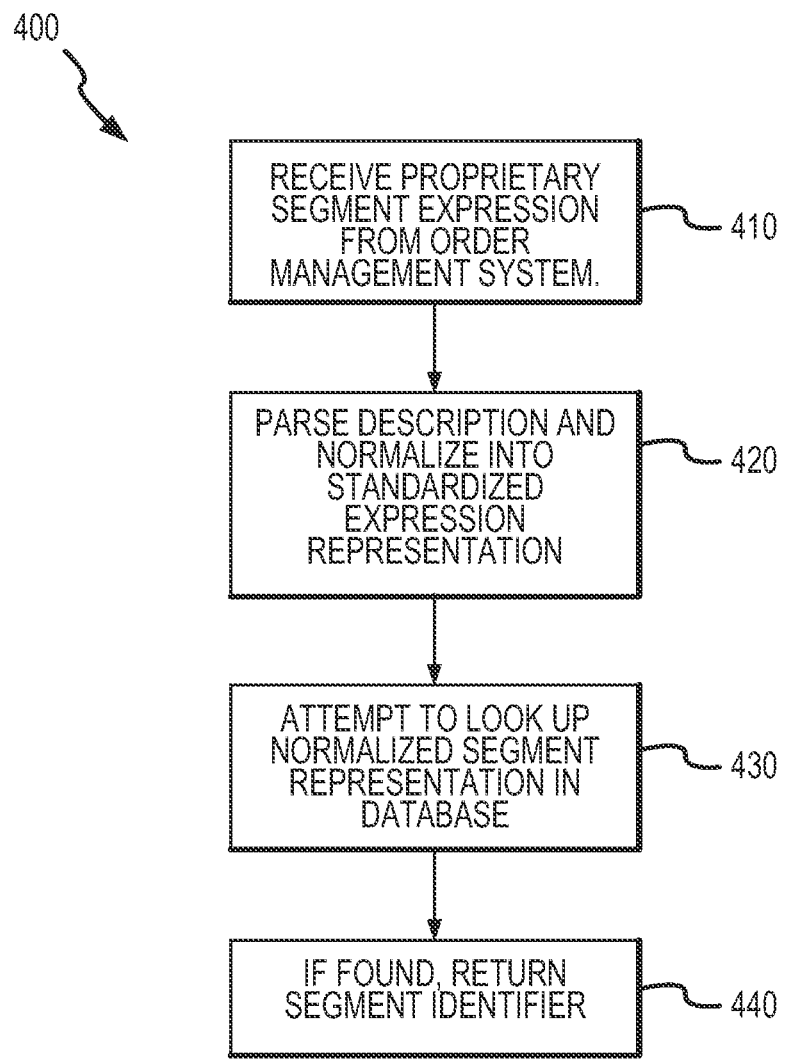
FIG. 4 is a flow diagram illustrating one exemplary method of performing product expression resolution that may be performed by an inventory management module.

The inventory management module 100 next performs product identification. After performing the previous steps of parsing the predicate string and performing attribute mapping and substitution, the module 100 makes a first attempt to resolve the predicate string into a known product. FIG. 4 illustrates one exemplary method 400 for performing product expression resolution that may be performed by the inventory management module 100 or another component of the system 12. In the method 400, the inventory management module 100 receives at 410 a proprietary segment expression from the order management system 80. At 420, the module 100 parses the description and normalizes it into a standardized expression representation. Then, at 430, the module 100 attempts to look up the normalized segment representation in the database 70, and if found, at 440, the module 100 returns the segment identifier that is used throughout the system 12 to manage and allocate segments of the inventory.

This method is optimized for performance since many of the methods of the inventory management module 100 use the product identification as input. One useful method for performing product identification involves computing a hash value for the predicate string that provides a unique value. Then, the hash value is used as a key to find the matching product by comparing it against the hash key column of the product table (not illustrated). If a match is found, the product identifier for the matched product is returned to the calling routine. Alternatively, the original predicate string itself can be stored and optionally associated with a unique index to provide similar functionality. If the previous attempt fails to find a match, a second attempt is made to find an exact match based on the term components. This may still result in a match since the order of the terms in the predicate string may be different yielding a different hash or string value, yet both may resolve to the same segment of the inventory data.

Using this method, the parsed terms of the predicate string and the individual sub-components of each term are compared against the product attribute data structure, an example of which is illustrated in Table 4 based on: (1) the number of terms; (2) for each of the terms and exact match of the positional attribute identifier; (3) the operator; and (4) the attribute value or list of values. If an exact match is found, the associated unique product identifier for that product is returned to the calling routine.

TABLE 4

Product Attribute Data Structure

| Product ID | Operator | Attribute | Value |
|---|---|---|---|
| 1 | = | Attr1 | california |
| 2 | = | Attr2 | 18-25 |
| 2 | = | Attr4 | 10k-25k |
| 4 | IN | Attr2 | 18-25 |
| 4 | IN | Attr2 | 35-50 |
| 6 | = | Attr1 | california |
| 6 | = | Attr3 | female |

If no match is found, the step taken next by the module 100 depends on which function the inventory management module 100 is performing. If the context is defining a new product to come under management, a new entry is created for that product in the associated product and product attribute data structures 76, and a new unique product identifier associated with this new product is returned to the calling routine. If the inventory management module 100 is just performing a product forecast look-up, the ad-hoc product forecast mechanism, described later, is used. By creating a formalized and unique identifier, representing a distinct, identifiable segment of interest, it is possible to associate every sales contract and proposal with a specific product. Significantly, such a representation of the available inventory or available product allows for the precise management of the inventory independent of the particulars of individual contracts.

To manage the inventory such as multi-dimensional advertising inventory, it typically is also preferable to perform product encoding. Often, there will exist in the inventory a plurality of products that a given record will satisfy the conditions for, and, conversely, a plurality of products whose definitions are not satisfied by the particulars of a given record. Hence, it is desirable to find a compact method to encode each record with this information (e.g., to enhance the inventory representation 76). This structure is referred to herein as the "product vector" an example embodiment of which is illustrated in Table 5 and sets of these product vectors are shown at 90 in FIG. 1. For each product listed in Table 1 there is a corresponding entry in the column "bit position." The data in this field is used to identify the position within the product vector that the respective indicator for that particular product is found.

TABLE 5

Product Vector Encoding
Product Vector

100100100000000

The encoding of the product vector itself can take many forms to practice the present invention. In one exemplary embodiment, it can be represented as binary data interpreted as a 2's compliment number in which each bit of data is used to represent an individual binary indicator for each product. This may be delineated by its indicated position with a value of 1 indicating that this record is applicable for the particular product while a value of 0 indicates that the record does not meet the criteria for a particular product. It is recognized that there are numerous methods that one skilled in the art could use to produce a differently encoded method to produce a vector of products. For example, product encoding may include encoding the information as an ASCII character string of 1's and 0's or may include using other useful techniques such as encoding a string encoded as a base 8 (octal) or base 16 (hexadecimal) value to represent the same information. Additionally, with any encoding scheme, the encoding can be done from left to right or right to left with bit position 1 starting at either end. Alternatively, the product vector could simply be explicitly represented as the set of identifiers for the set of product segments that match the data record. The main difference between the choices of representation is the algorithms required to perform operations on the product vectors. For example, to produce the set union of two different product vectors represented in 2's compliment binary representation, a bit-wise AND'ing operation can be used whereas in the explicit set representation the same operation would require a unique sort of all the identifiers in the two product vectors.

Figure 5:
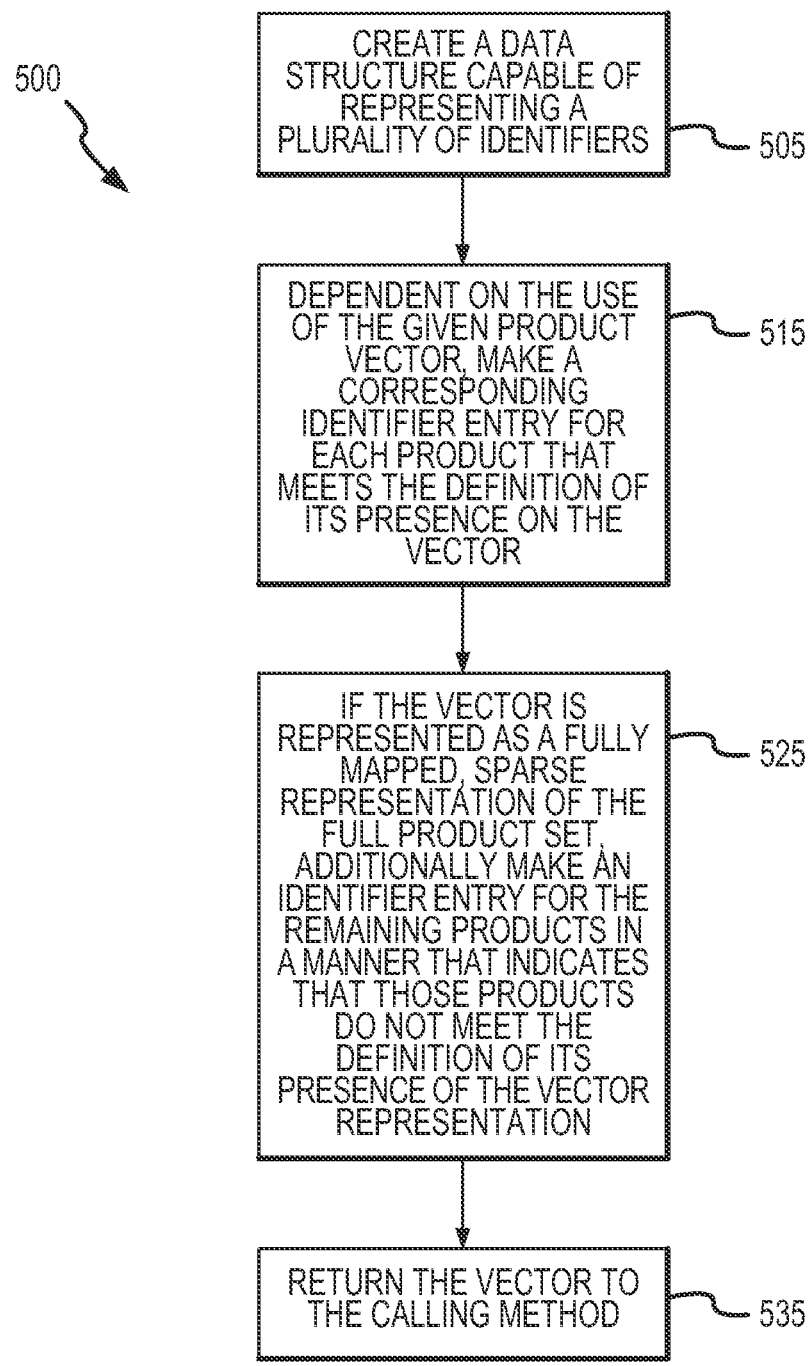
FIG. 5 is a flow diagram illustrating a method of generating a representation of inventory by providing product vectors.

FIG. 5 illustrates generally a method 500 that is useful for generating a representation of inventory by providing a product vector representation. In the method, a data structure is created at 505 that is capable of representing a plurality of identifiers. At 515, depending on the use of a given product vector, an identifier entry is made corresponding to each product that meets the definition of its presence on the vector. At 525, if the vector is represented as a fully mapped and sparse representation of the full product set, an identifier entry is made for the remaining products in a manner that indicates that those products do not meet the definition of its presence of the vector presentation. At 535, the vector that is created is returned to the calling method.

For the purpose of illustration and visual clarity in this document, product vectors (such as may be used for product vectors 90) are shown as an ASCII string with bit ordering from the left to right with bit position 1 in the leftmost position, bit 2 immediately to the right of bit 1, and so forth. In this representation, the length of the vector preferably is set at a minimum large enough to represent all or substantially all the defined products within the inventory database 70. For example, if there were 1000 distinct products under management, the vector should be large enough so that within its encoding scheme 1000 individual binary pieces of data can be maintained. An example vector representing 15 products is illustrated in Table 5. In this example, bits 1, 4 and 7 are set indicating that the criteria for products 1, 4 and 7 are satisfied by the information in a corresponding record, while the other bits are set to 0 indicating that their corresponding products do not meet the criteria of the in the corresponding record. Other product vector encoding methods, for example standard set notion syntax, are also illustrated and described in subsequent sections of the present invention. For reasons of visual economy, the product vector examples shown in this document are limited to represent a relatively small number of products.

The pre-processing module 20 of the inventory management system 12 of FIG. 1 generally is the first module to process input records. The input records may be from the historical store of log data 15 while processing data for the data processing module 30. In other cases or times, the pre-processing module 20 may be processing input records in real-time from the delivery system 130 for the selection module 120.

The pre-processing module 20 is responsible for several functions. One function involves filtering out irrelevant records from the input stream. For example, input records that are the result of Internet "robot" search engines are typically not relevant for the purposes of inventory management since revenue producing advertisements are not served to such programs. Furthermore not all of the data that is received in real time or written out to the historical log store 15 represents inventory that will be placed under management of the present invention. For example, keyword search results, which are sold in an auctioned environment, may not come under management by the inventory management system 12 and, therefore, are preferably excluded from the set of data being analyzed and managed for inventory purposes.

An additional function of the pre-processing module 20 involves augmenting the original set of record attributes with new derived attributes. For example, it may be desirable to group the values found for certain attributes into labeled sets that are referred to herein as categories. Product buys that are derived from these attributes, therefore, can optionally be targeted to the categories rather than the individual scalar values of the attributes themselves. The example data found in Table 6 serves to illustrate how this works during representative operation of the system 12. In this example, the attributes representing various music bands are mapped into a single genre called "alternative." This new value becomes a new derived record attribute that can subsequently be used in product definitions for the inventory management module 100 and used for product selection purposes by the selection module 120.

TABLE 6

Attribute Categories

| Category Name | Attribute | Domain | Category Value |
|---|---|---|---|
| alternative | Attr 10 | musicworld.com | nirvana |
| alternative | Attr 10 | musicworld.com | cells |
| alternative | Attr 10 | musicworld.com | clash |

Another function of the pre-processing module 20 is truncation and rounding. As an example of truncation, the superfluous application server session key data found in a referring URL can be truncated to reduce the size of the input record and make expressions based on that attribute easier to manage. An example of attribute rounding is taking time data such as the hours, minutes, and seconds found in a timestamp record and rounding it to the nearest minute if the inventory is to be managed only on a time slicing basis of hours and minutes.

Still another function of the pre-processing module 20 is supporting site-level attribute mapping as described previously and illustrated in Table 3. For reasons of name spacing, the input values for attributes that are associated with a site level mapping are typically appended with the domain name of the incoming URL on the record as illustrated. Of course, these are just examples of the domain-specific preprocessing that may be applied by the pre-processing module 20 and/or other modules. These examples show that whatever pre-processing metrics are applied by this module 20 are applied uniformly by both the data processing module 30 and the selection module 120 so that a consistent view of the data is seen by the modules of the system 12.

Referring again to FIG. 1, the product determination module 25 is the module responsible for looking at input records sourced from both the historical log records 15 produced at a prior time by the delivery system 130 as well as performing product determination in real-time for the delivery system 130 when ad calls 152 are received from publisher systems 150. The product determination module 25 takes an input record directly from the delivery system 130 or from the historical logs produced by the delivery system 130, which has been pre-processed by the pre-processing module 20, and it returns a plurality of product identifiers for which the input record meets the criteria for. The list of products and product definitions is frequently augmented with newly introduced products. Conversely, unused products are frequently removed from the list. Because of this dynamic nature, the product determination logic used by the product determination module 25 is driven by the current set of defined products.

Figure 6:
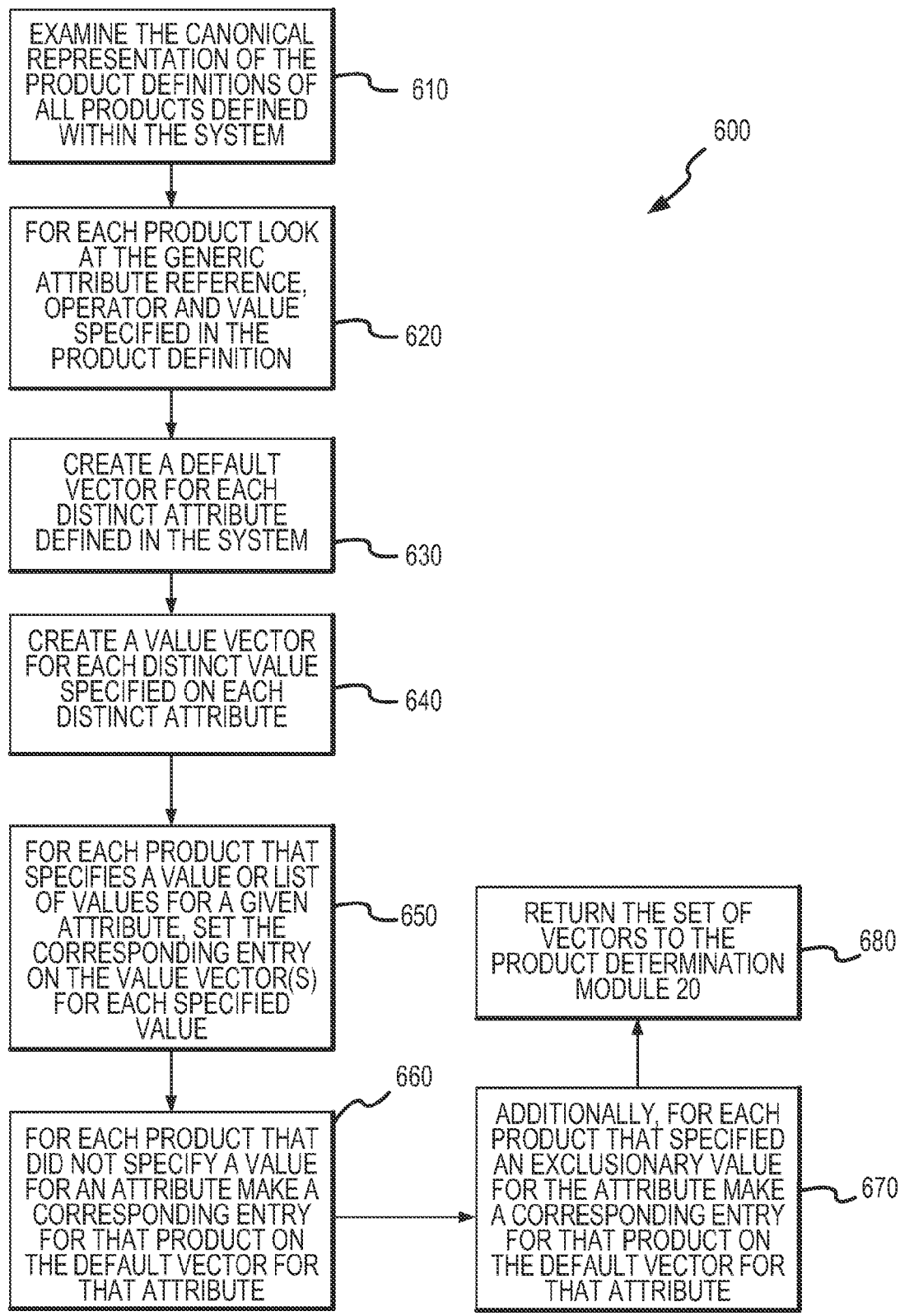
FIG. 6 is a flow diagram of a method of creating attribute bitmaps according to an embodiment of the invention.

To accomplish this, the inventory management module 100 periodically produces a set of attribute bitmaps 60 for the use by the product determination module 25 such as by using the data from the product attribute data structure as illustrated by the example in Table 4. One method for producing this set 60 is shown as method 600 of FIG. 6 and it or similar methods are described in detail in the following paragraphs, which may be carried out by the inventory management module 100 as shown by the arrow to bitmaps 60 in FIG. 1. At 610, the module 100 may examine the canonical representation of the product definitions of all products that have been defined in the system 12. At 620, the module 100 looks at the generic attribute reference, operator, and values specified in the product definition for each product and then at 630 acts to create a default vector for each distinct attribute that has been defined to be of interest for the system 12. At 640, the module 100 creates a value vector for each of these distinct values specified on each distinct attribute. At 650, for each product that specifies a value or list of values for a given attribute, the module 100 sets the corresponding entry on the value vector(s) for each specified value. At 660, for each product that did not specify a value for an attribute, the module 100 makes a corresponding entry for that product on the default vector for that attribute. At 670, for each product that specified an exclusionary value for the attribute, the module 100 makes a corresponding entry for that product on the default vector for that attribute. Then, at 680, the module 100 returns the set of vectors to the product determination module 25 as shown in FIG. 1.

An exemplary method for producing this set of attribute bitmaps 60 is given below and is illustrated using the example product vector encoding described previously but can be extended to other encoding schemes. For brevity, this mechanism is described using only four of the possible operators that can be contained in a segment expression. However, it will be apparent to those skilled in the art that similar methodologies can be used to support other operators. Using the segment attribute definitions listed in Table 4 to illustrate this bitmap creation method, a set of product vectors is produced for each set of attributes with one vector produced and associated with each distinct value listed in that table for the given attribute and referred to as a value vector. The value vectors are all initially set so that all bit positions are initialized to 0. For each of the products which have an entry in Table 4 for the given value on the given attribute, the bit is set to 1 on the corresponding value vector using the corresponding bit position that is defined for that product and with the remaining product identifiers being left with a value of 0. This is done for all the illustrated operators (e.g., "=", "!=", "IN", and "NOT IN").

Further, for each attribute, a single vector is produced to represent the plurality of products that have not specified any constraint for that particular attribute or have specified the attribute in an exclusionary context, e.g., "!=" or "NOT IN". This vector is herein referred to as the "don't care" or "default" vector interchangeably. The inventory management module 100 generates this by producing a list of all products that have not specified a value for that particular attribute or have specified it in an exclusionary context and sets the corresponding bits for each in a product vector associated with this set.

An example of the result of the above method is shown for illustration purposes in Table 7. For attribute "Attr1" both products 1 and 6 specify a value of "california" therefore bit positions 1 and 6 are set to 1 for the value vector associated with the value "california". Since no other product has specified any other value for this attribute, there is only one value vector for this attribute. In addition, a default vector is produced that has its bits set for the set of products that have not specified a value for this attribute, indicating these products are not dependent on the attribute. Correspondingly, the bits on the default vector for the products that have specified a value for the attribute in the affirmative, for example "=" or "IN", have their corresponding bits unset. This is illustrated in Table 7.

TABLE 7

Attribute Bitmap Examples

| Value | Bitmap |
| --- | --- |
| Attr1 | |
| california | 1000010 |
| Default | 0111101 |
| Attr2 | |
| 18-25 | 0101000 |
| 35-50 | 0001000 |
| Default | 1010111 |
| Attr3 | |
| female | 0010010 |
| Default | 1101101 |
| Attr4 | |
| 10k-25k | 0100100 |
| Default | 1011111 |

The attribute bitmap for Table 7 illustrates that the product mapped to position 2 has specified a value of "18-25" for "Attr2" while the product mapped to position 4 has specified that either a value of "18-25" or a value of "35-50" will meet the constraint for that attribute, therefore bit position 4 has been set to 1 on the product vector value pairs for both of these values. The example shown for Attr4 illustrates that for product 5, which specifies that Attr4 cannot have the value "10k-25k." The bit on the corresponding value vector is set, but the corresponding bit on the default vector is also set as illustrated in Table 7.

In an exemplary embodiment of this method, the product determination module 25 then, in some embodiment, applies the following algorithm to a given record in order to produce a product vector to be associated with the input record. The example data given in Table 8 serves to illustrate the process. The example input record has a value of "california" for Attr1. Therefore, the value vector associated with this value is selected and is bit-wise XOR'ed with the default vector for Attr1 producing an intermediate result for this record. The result of which is shown in Table 8 under the entry "Bit-XOR." This process is repeated for all attributes, which in this example are the four attributes Attr1, Attr2, Attr3, and Attr4.

TABLE 8

Product Determination, Record ID #1

| Product Vector | ID | Attr1 | Attr2 | Attr3 | Attr4 | Attrn |
| --- | --- | --- | --- | --- | --- | --- |
| 1001001 | 1 | california | 35_50 | Male | 10k-25k | An |

| Attr1 | | Attr2 | | Attr3 | |
| --- | --- | --- | --- | --- | --- |
| california | 1000010 | 35-50 | 0001000 | Default | 1101101 |
| Default | 0111101 | Default | 1010111 | Bit-XOR | 1101101 |
| Bit-XOR | 1111111 | Bit-XOR | 1011111 | | |

TABLE 8-continued

Product Determination, Record ID #1

| Attr4 | | | Bit-AND Terms 1-4 | | Result Vector |
|---|---|---|---|---|---|
| 10k-25k | 0100000 | Attr1 | 1111111 | 1001001 | |
| Default | 1011011 | Attr2 | 1011111 | | |
| Bit-XOR | 1111011 | Attr3 | 1101101 | | |
| | | Attr4 | 1111011 | | |

In an exemplary implementation, the value vector could be implemented as an array that is indexed into using the value, which in this example is the string "california." Alternatively, this can be accomplished using a linked list, hash table, or any other similar data structure with the same string being used as a search key. Additionally, there is a single list for the default vectors, with one entry for each attribute and which is indexed into using the generic attribute name, in this example the string "Attr1." Further, the intermediate result vectors for each of the above attributes are merged using a bit-wise AND'ing of all of these vectors producing the product vector for the associated input record. In one preferred embodiment, the product determination module 25 parses the resultant product vector bitmap into an array of product identifiers and returns the array to the calling module, which is either the data processing module 30 or the selection module 120.

Figure 7:
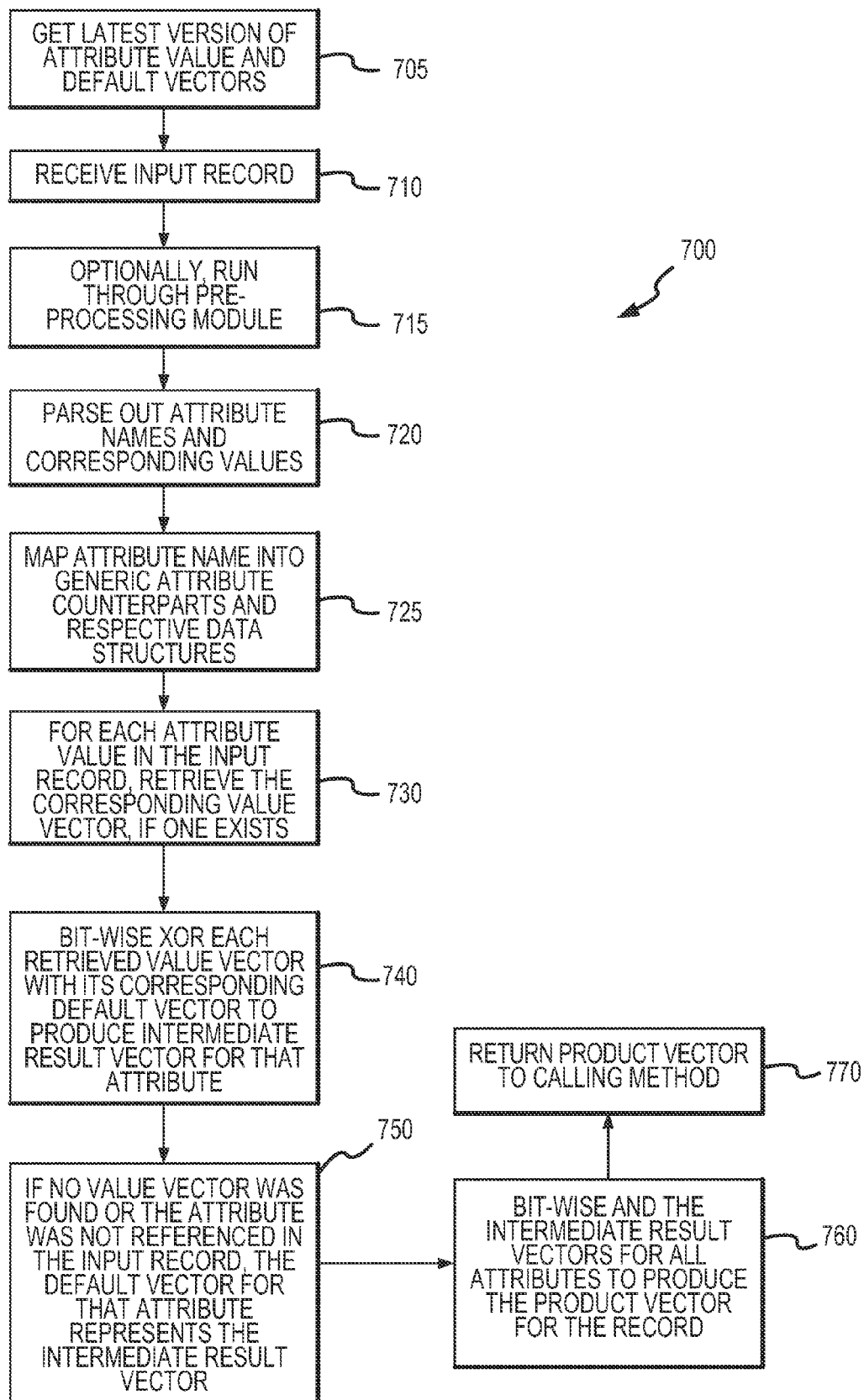
FIG. 7 illustrates with a flow diagram a product determination method that may be carried out by a product determination or other module within an inventory management system of the invention.

FIG. 7 illustrates another exemplary implementation of a product determination method 700 to provide further description of this aspect of the invention. At 705, the module 25 (or a subroutine of module 100) acts to get the latest version of the attribute and default vectors. At 710, the module 25 receives an input record such as from module 100 or from delivery system 130 via pre-processing module 20. At 715, the module 25 acts optionally to run the record through the pre-processing module 20 and then at 720 parses out attribute names and corresponding values. At 725, the module 25 maps attribute names into generic attribute counterparts and respective data structures. At 730, for each attribute value in the input record, the product determination module 25 retrieves the corresponding value vector (if one exists). At 740, the module 25 performs a bit-wise XOR function on each retrieved value vector with its corresponding default vector to produce an intermediate result vector for that attribute. At 750, if no value vector was found or the attribute was not referenced in the input record, the default vector for that attribute is used to represent the intermediate result vector. At 760, the module 25 performs a bit-wise AND function on the intermediate result vector for all attributes to produce the product vector for the record, and at 770, the product vector is returned to the calling method. The above operations are described in the context of the product vector being represented as a sparse bitmap representation and operations on the individual bits being low-level, bit-wise operations as are commonly supported by computer processors. However, it should be noted that if the representation of the product vector was in a different form, such as a set of matching product vector identifiers, then the operations to produce the equivalent logical result would be correspondingly altered to an equivalent set operation.

The system 12 is also effective for performing historical sampling. The data processing module 30 is generally responsible for reading the historical store of data or logs 15, processing it, and creating the sample set of encoded records 40 to be loaded into the inventory database 70 as part of the available inventory representation 76. In an exemplary implementation of this feature of the invention, the data processing module 30 reads records from the store of log data 15 and optionally runs each record through the pre-processing module 20 and then utilizes the product determination module 25 to produce a set of encoded records, an illustrative example of which is shown in Table 9.

TABLE 9

Encoded Records

| ID | Product Vector | Sample Date | Attr1 | Attr2 | Attr3 | Attr4 | Attrn |
|---|---|---|---|---|---|---|---|
| 1 | 1001001 | 07012006 | california | 35-50 | male | 10k-25k | An |
| 2 | 0011101 | 07012006 | oregon | 18-25 | female | 100+ | Dn |
| 3 | 0010101 | 07012006 | oregon | 26-35 | female | 100+ | An |
| 4 | 0001001 | 07012006 | colorado | 35-50 | | | Cn |
| 5 | 1111011 | 07012006 | California | 18-25 | female | 10k-25k | An |
| 6 | 0000001 | 07012006 | arizona | | male | | Dn |
| 7 | 0000001 | 07012006 | | | | | |
| 8 | 0010001 | 07012006 | | | female | 10k-25k | An |
| 9 | 0101001 | 07012006 | | 18-25 | | 10k-25k | |
| 10 | 0000001 | 07012006 | arizona | 26-35 | | 10k-25k | Dn |

Figure 8:
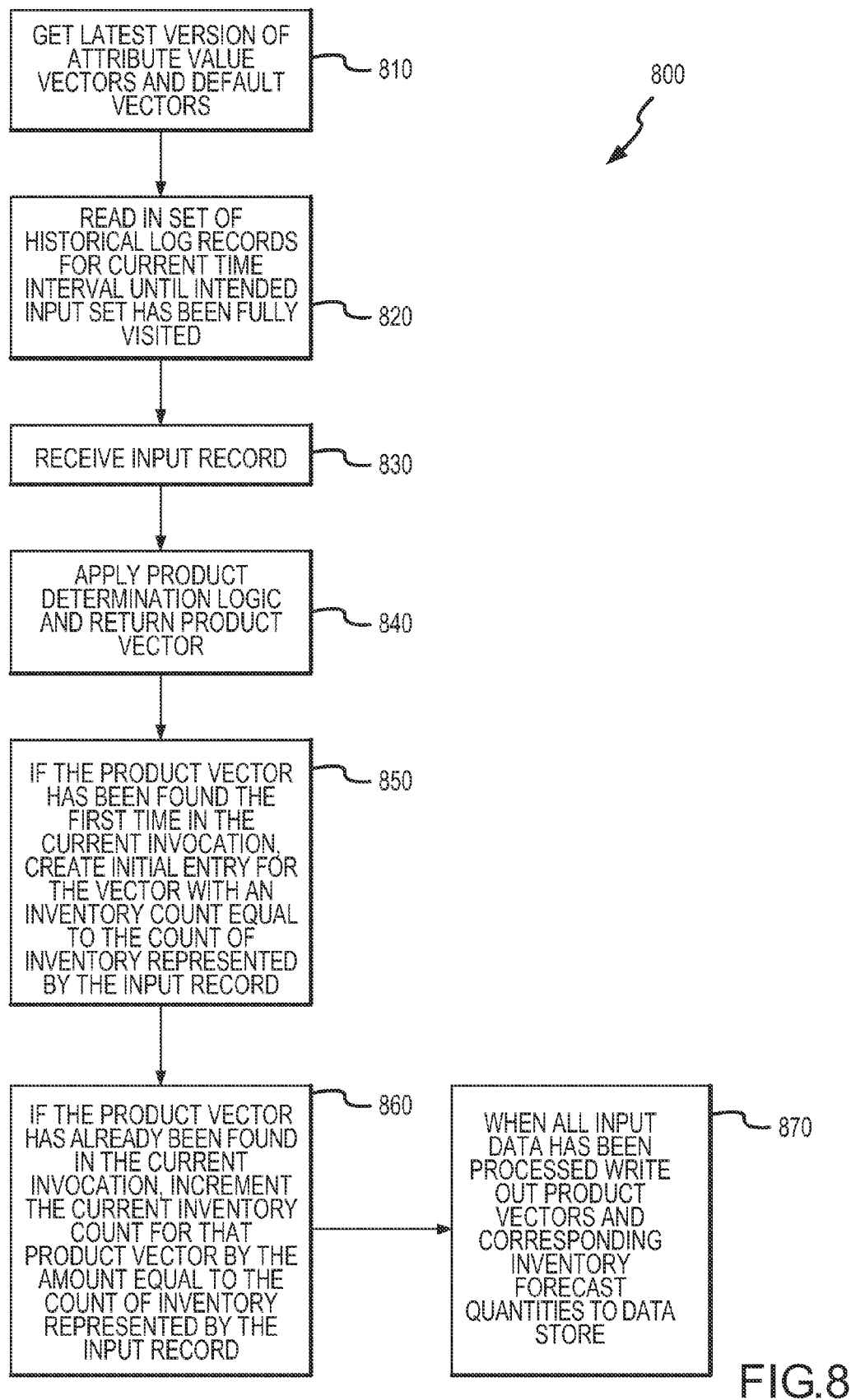
FIG. 8 illustrates with a flow chart or diagram one example of a historical sampling method such as may be performed by a data processing module according to the present invention.

Following this phase of processing, each record contains the original record attributes, some of which have been modified by the pre-processing module 20. The records are also augmented with the product vector produced by the product determination module 25. An example of the format of the data after this phase of processing is shown in Table 9. FIG. 8 illustrates one example of a historical sampling method 800 that may be performed by the data processing module 30. At 810, the module 30 gets or retrieves the latest version of the attribute value vectors and the default vectors. At 820, the module 30 reads in the set of historical log records from store 15 for a current time interval until intended input set has been fully visited. At 830, an input record is received and at 840 the product determination logic is applied (e.g., by the product determination module 25 as shown by arrows connecting modules 25 and 30 in FIG. 1) and a product vector is returned. At 850, if the product vector has been found the first time in the current invocation, the data processing module 30 creates an initial entry for the vector with an inventory count equal to the count of inventory represented by the input record. At 860, if the product vector has already been found in the current invocation, the current inventory count is incremented for that product vector by the amount equal to the count of inventory represented by the input record. At 870, when all input data has been processed, the data processing module 30 writes out product vectors and corresponding inventory forecast quantities to a data store (e.g., encoded records 40 written to inventory database 70 such as part of representation 76 or as one or more separately stored items).

During historical sample, the data processing module 30 maintains an accrual of counts of the number of times a given product vector has been found ignoring or discarding all remaining attributes of the input record. If the product vector is being seen for the first time, a new accrual record for that vector is created and initially set to a count of 1 or whatever count of inventory is associated with the given input record. In the more common case, the product vector will have already been created during the course of processing the data for the given time interval, in which case the current count for the matching product vector is incremented accordingly. This process continues until all of the historical data for the given time interval or a predetermined subset of which, has been processed, at which time the data is written out to a data store. An illustrative example of the output of this process is shown in Table 10 below (which may interchangeably be identified as encoded records 40, distinct regions or segments of inventory being managed, daily aggregated forecast vectors, a data structure for representing the topology of the inventory, and inventory representation 76 when stored or written to data store 70).

This data structure or the aggregated forecast vectors define a topology of inventory space as defined by the products of interest, as useful for supporting the various purposes of inventory management. This fundamental structure defines the regions of inventory space not only at the single product level but additionally at the plurality of all the intersections of those products where they exist, as are found in the set of historical data. In this regard, each product vector serves as a unique identifier representing each distinct region, and each accrued count represents the relative quantity of inventory in that space over the analyzed time period. This data structure contains all of the required information to manage the inventory for the set of products that are defined within the system.

It will be apparent to those skilled in the art that a similar implementation could be made using other forms of encoding the products or segments of interest or that the topology of inventory could be mapped to other decompositions or aggregations of product definitions. For example, a given product definition that contained an OR operator across different attributes could optionally be decomposed into the union of its terms, as described earlier, and mapped accordingly, resulting in a different vector that, represents a decomposition of the same information.

In order to support reporting forecast and availability counts in an ad-hoc manner on segments that have not been defined in the system, it is useful to provide a full record representation containing all of the original attributes. Since a summary accrual is not likely to scale well on the fully attributed record, a sampling scheme is typically used to provide a working set to support this functionality. In one exemplary implementation of the present invention referred to herein as the product vector sampling for each distinct product vector, a randomly selected sample of full records is retained, which includes the original record, which was possibly modified by the pre-processing module 20 and includes the corresponding product vector, with an equal number of records selected for each distinct product vector herein referred to as the bucket size. The method to use this approach to providing ad-hoc forecast and availability requests is described later on in the present invention.

The inventory management module 100 also functions to perform source validation. The entire result set being processed is meant to represent the total volume of inventory data (i.e., the available inventory representation 76) for a single period of time, and represented here for illustrative purposes as a single day. Therefore, it is preferable to validate that the data sourced from the log data 15 is the complete set of data for the time period being sampled. The data processing module 30 contains, in some embodiments, a method that verifies that all of the expected source data is present. In an exemplary implementation, this is accomplished by ensuring that the log data 15 is tagged with an attribute that indicates the source node and log file that the data originated from. This implies that the original log files are created on a regular interval such as hourly instead of created based on reaching a certain file size. A configuration file, read by the data processing module 30, specifies the number of nodes in the inventory source and the number of files per node, per day that are expected to be produced. If the number of source files found is not what was specified in the configuration file, the data processing module 30 reports an error so that the base inventory forecast 76 is not skewed by missing log data.

The system 12 is also adapted or configured to provide data merging as part of creating an accurate representation of the available inventory. In order to support multiple invocations of the data processing module 30 running in parallel, the combiner module 50 exists to merge the multiple intermediate sampling sets of the output of the data processing module 30 into a single set of records. In this case, the combiner module 50 takes in, or as input, intermediate sampling sets of multiple invocations of the data processing module 30 and merges them such that the counts on each distinct product vector are summed with their corresponding counterpart in each of the intermediate sampling sets producing a full summary of all the data processed by multiple invocations of the data processing module 30.

Figure 9:
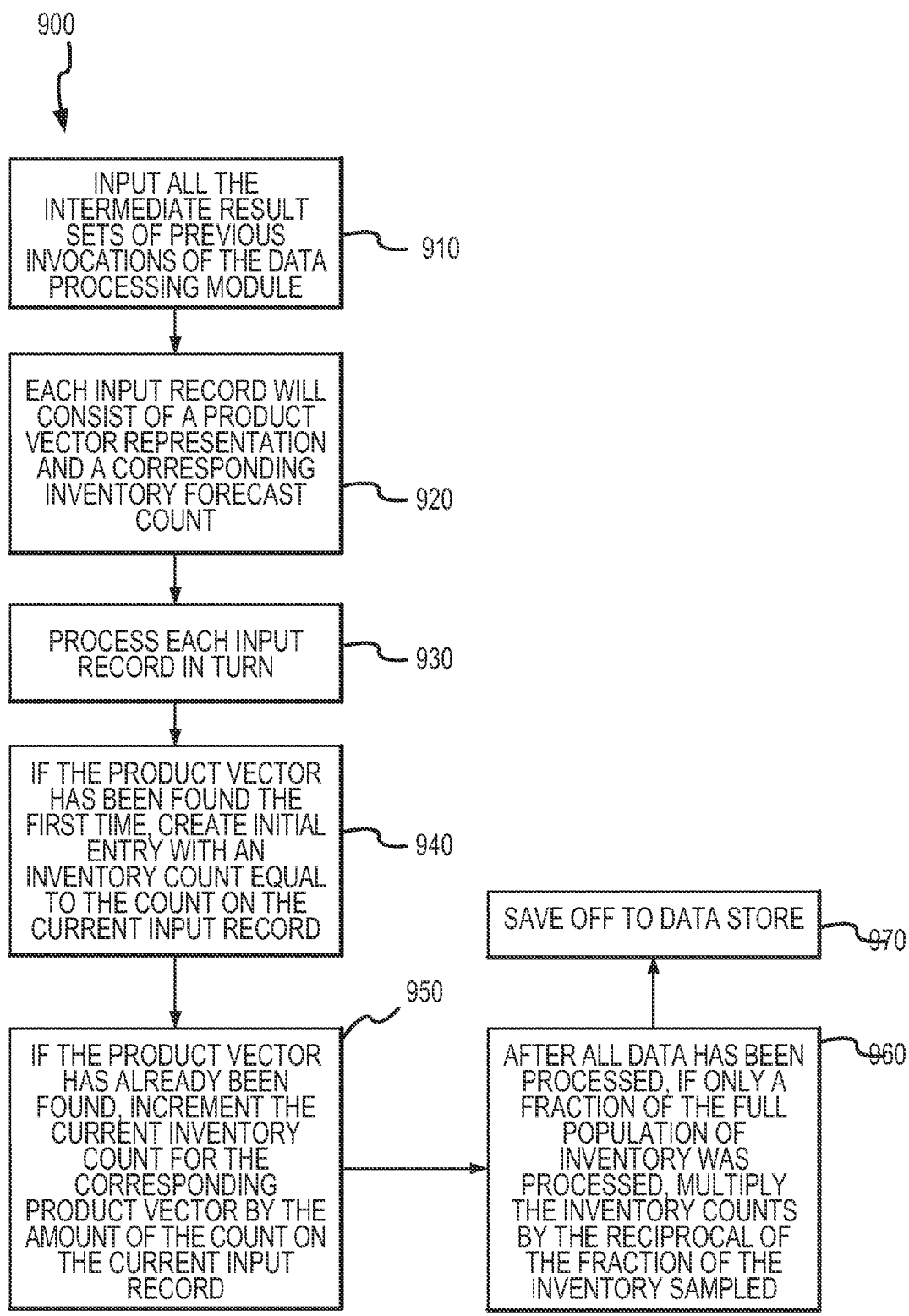
FIG. 9 illustrates a flow diagram of an exemplary data merging process as may be carried out by the combiner module in the inventory management system of FIG. 1.

One such exemplary data merging process 900 carried out by the combiner module 50 is shown in FIG. 9. As shown, at 910, the intermediate result sets are input from previous invocations of the data processing module 30. At 920, it is stressed that each input record includes a product vector representation and a corresponding inventory forecast count. At 930, the combiner module 50 processes each input record and if the product vector has been found the first time, creates an initial entry with an inventory count equal to the count on the current input record at 940. If it has, in contrast, already been found, at 950, the combiner module 50 increments the current inventory count for the corresponding product vector by the amount of the count on the current input record. At 960, after all data has been processed, if only a fraction of the full population of inventory was processed, the combiner module 50 multiplies the inventory counts by the reciprocal of the fraction of the inventory sampled. Then, at 970, the module 50 saves the merged data to a data store such as database 70.

In some large-scale environments, it may be impractical to process the entire set of log data 15. In these cases, a subset of the data can be randomly selected such that the percentage of data being sampled is known. In this manner, the merged result set from the combiner module 50 represents a fraction of the daily inventory, so the numbers are adjusted accordingly (e.g., see step 960 in process 900). For partially sampled data sources, the combiner module 50 is configured with a daily sampling multiplier value that is set to the reciprocal of the sampling fraction and which is used as a multiplier on the count value of the encoded records to scale the counts accordingly. For example, if only half of the historical log data was processed, the count value on each sampled record would be multiplied by the reciprocal of one half, which is two. When all of the intermediate sampling sets have been processed, the merged result is temporarily written out to a data store. This set represents the full inventory for a given day. Then, the combiner module 50 writes out the merged result set to a persistent data store, which in an exemplary implementation of the present invention is described herein as the inventory database 70 such as part of the available inventory representation 76.

To provide inventory aggregation as discussed with reference to FIG. 8, the inventory management module 100 takes the encoded records 40 and represents it as what is referred to herein as the aggregate forecast vectors and is illustrated herein by the example data found in Table 10.

TABLE 10

Aggregated Forecast Vectors

| Product Vector | Impression Count |
|---|---|
| 1101001 | 488 |
| 0011101 | 120 |
| 0010101 | 64 |
| 0001111 | 30 |
| 1111001 | 64 |
| 0000001 | 4066 |
| 0010001 | 128 |
| 0101001 | 1004 |

The aggregate forecast vectors shown in Table 10 are produced by performing an aggregation on the product vector values that produces a sum of the impression count field that is grouped on the unique values for the product vector field. The actual aggregation function can be done in the inventory database 70 or externally by the data processing module 30 or the combiner module 50 as previously described. This structure retains all the necessary data for managing the defined products while reducing the size of the representative data (e.g., provides a significantly compressed version of the inventory data available in the log data 15 and other records/data input into the system 12). As illustrated, the attribute fields are not included in the aggregate forecast vector data structure providing the benefit of decreasing the size of the data and, therefore, producing an increase in performance.

An additional field, referred to in this example as "forecast date," is added to the aggregate forecast vector data structure and is initialized to the current date that the system is currently processing data for, an illustrative example of which is shown in Table 11 and which will represent the base template for a time series of the daily forecast values for all the forecast inventory corresponding to each product vector over a plurality of dates. These are referred to herein as the daily aggregated forecast vectors or alternatively as the distinct regions or segments of inventory. This data structure is extended over a range of dates by taking the entire data structure and extrapolating it out for each day in the future, e.g., up to the number of days required to reach the maximum future date that is used to support a maximum contract date for existing orders as well as the expected forecast or availability requests coming from the order management system 80. In this process, the value of the "forecast date" field may be adjusted accordingly to represent each of these dates in the plurality of dates being represented. The impression counts for each are initially set to the value initially determined in the previous methods.

TABLE 11

Daily Aggregated Forecast Vectors

| Product Vector | Forecast Date | Inventory Count |
|---|---|---|
| 1101001 | Jul. 1, 2006 | 488 |
| 0011101 | Jul. 1, 2006 | 120 |
| 0010101 | Jul. 1, 2006 | 64 |
| 0001111 | Jul. 1, 2006 | 30 |
| 1111001 | Jul. 1, 2006 | 64 |
| 0000001 | Jul. 1, 2006 | 4066 |
| 0010001 | Jul. 1, 2006 | 128 |
| 0101001 | Jul. 1, 2006 | 1004 |

Figure 10:
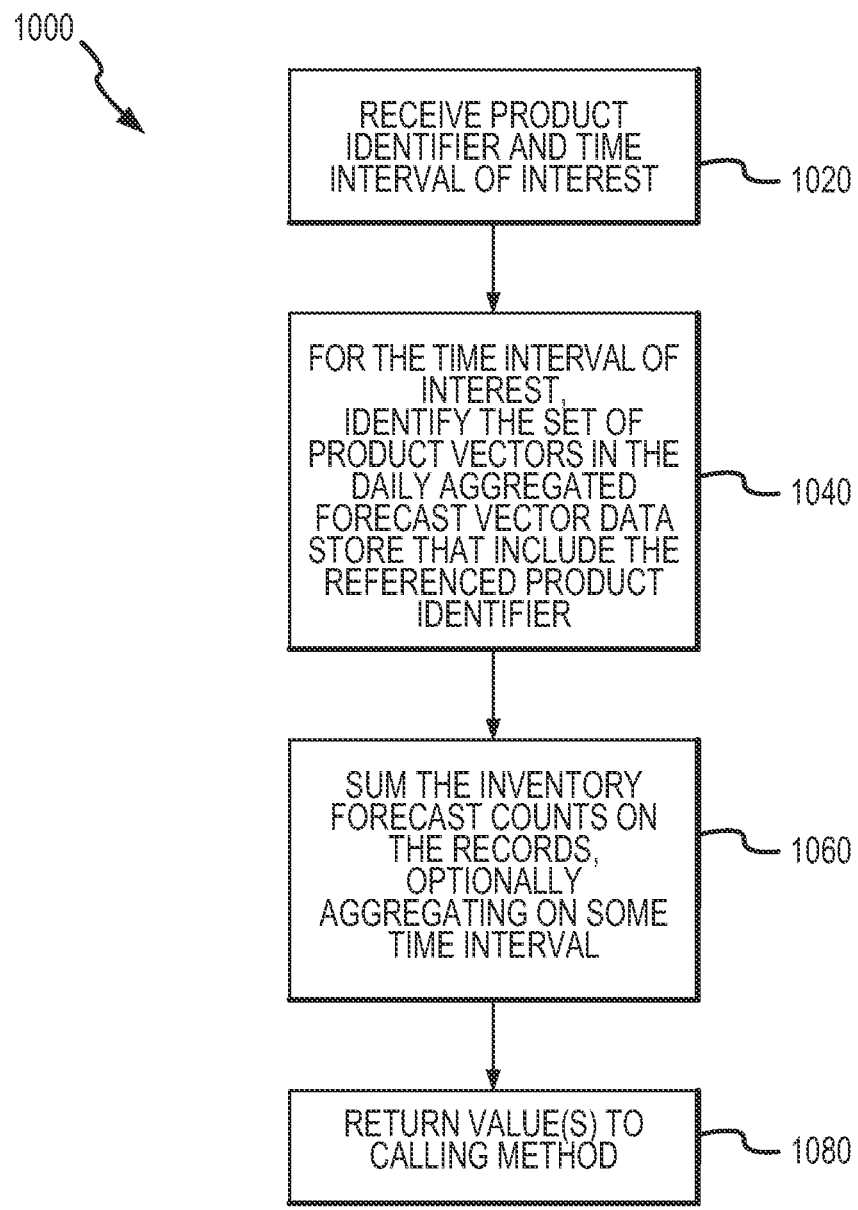
FIG. 10 illustrates one example of a base forecast determination that may be performed by an inventory management module during operation of an inventory management system.

Significantly, these aggregate forecast vectors are used by the inventory management module 100 to generate or compute a base inventory forecast. FIG. 10 illustrates one example of a base forecast determination 1000 that may be performed by the inventory management module 100 during operation of the system 12. At 1020, a product identifier is received along with a time interval of interest (such as from order management system 80). At 1040, for the time interval of interest, the module 100 identifies the set of product vectors in the daily aggregated forecast vector data store 76 that include the referenced product identifier. At 1060, the module 100 sums the inventory forecast counts on the records with optional aggregation on some particular time interval. At 1080, the module 100 returns the determined base forecast value or values to the calling method (e.g., to the order management system 80 or a calling method in system 12).

In another example, the base forecast can be computed for each product using the following method. This method is illustrated here assuming the product vector is represented as a 2's compliment bit vector. For any given product, p, with a bit position within the product vector of, n, assuming the product numbering scheme begins with the value of 1, the forecast for that product for day, d, is derived by summing the value of the "impression count" field for all records for day, d, where the value of bit n=1. The formula is:

Computing Product Forecasts forecast $p$=sum(bitand (product vector,$2^{n-1}$)*impression count)    Equation 1:

where the function "bitand" produces a bit-wise AND operation on the two arguments, which are the product vector and the mask to strip out the bit of interest and where the impression count field is the one referred to in the example given in Table 10, and also, where the records are limited to those for date d.

An example of the results of this calculation is illustrated in Table 12. This example shows the forecast number for each product as of a particular date. Note that, due to the fact that many of the products share some of the same inventory, the forecast numbers for the individual products are not all simultaneously available. Instead, it is interpreted that these forecast numbers apply to each product taken individually but not in aggregate. If it was the case that none of the products happen to share any inventory in common, each of the forecast numbers would apply both individually and in aggregate but this is not the common situation. The example provided in Table 12 is illustrated in the context of representing the product vector as binary data interpreted as a 2's compliment value. Independent of the scheme used to encode the product vector, the forecast for any given product for the date or range of dates of interest can be derived by summing the value of the count of inventory associated with each product vector on which the product of interest was present for the date or range of dates of interest.

TABLE 12

Product Daily Summary Inventory Counts Showing Forecast of Product N = sum(bit(n) * inventory count)

| Product ID | Forecast Date | Forecast Inventory | Reserved Inventory | Cannibalized Inventory | Available Inventory |
|---|---|---|---|---|---|
| 1 | Jul. 1, 2006 | 552 | 0 | 0 | 552 |
| 2 | Jul. 1, 2006 | 1556 | 0 | 0 | 1556 |
| 3 | Jul. 1, 2006 | 376 | 0 | 0 | 376 |
| 4 | Jul. 1, 2006 | 1679 | 0 | 0 | 1679 |

TABLE 12-continued

Product Daily Summary Inventory Counts Showing
Forecast of Product N = sum(bit(n) * inventory count)

| Product ID | Forecast Date | Forecast Inventory | Reserved Inventory | Cannibalized Inventory | Available Inventory |
|---|---|---|---|---|---|
| 5 | Jul. 1, 2006 | 214 | 0 | 0 | 214 |
| 6 | Jul. 1, 2006 | 30 | 0 | 0 | 30 |
| 7 | Jul. 1, 2006 | 5964 | 0 | 0 | 5964 |

The inventory management module 100 is further adapted to provide a forecast time series of the available inventory. In many environments, the daily quantity and characteristics of the inventory is not static and can change from day to day and over time. In the Internet advertising embodiments of the system 12, this may be because the number of visitors to a particular Web site or group of sites will rarely be exactly the same from one day to the next. This can be due to a number of factors. First, the site itself may experience growth. Second, the visitation patterns will vary between days of the week and time of day. Third, seasonal effects such as holiday traffic patterns can change the volume and make-up of the traffic. Because of such factors, it is useful to be able to take growth and seasonality models that attempt to predict and quantify the expected changes to traffic patterns and apply the effects of these models to the inventory data structures previously described.

In an exemplary implementation of the present invention, a data structure for specifying various growth and seasonality models is illustrated in Table 13. Each model specifies a particular product identifier, a growth rate specified as a floating point number, a start date, an end date, a flag to indicate if the growth is to be compounded, and a flag to indicate if the module is to be applied to all products that are correlated to the specified product.

TABLE 13

Growth Model Specification

| Model | Product ID | Growth Rate | Start Date | End Date | Compound | Correlate |
|---|---|---|---|---|---|---|
| 1 | 2 | 1.02 | 07022006 | 07042006 | Y | Y |
| 2 | 2 | 0.98 | 07052006 | 07072006 | Y | Y |
| 3 | 6 | 1.065 | 07022006 | 07042006 | Y | N |

The data of Table 13 may be interpreted as follows. Starting from the day given in the start date field, the daily forecast impression count for the specified product is to be adjusted to a new value that is computed by taking the existing value of the daily impression counts for that product and multiplying it by the value shown in the growth rate field. If the growth is to be compounded, the growth rate is compounded on subsequent days. Using the example shown in Table 13, model 1 indicates that starting on Jul. 2, 2006 the daily impression count for product 2 will be increased by 2%, compounded daily, for three days including the end date of July 4. Applying the same method, model 2 will reverse that trend by taking the same product and reducing its daily impression count by a compounded rate of 2% starting from July 5 and ending on July 7. In both of these example models, the flag indicates that the growth models should be applied to all correlated products so that the daily forecast impressions for each of these products are altered by the exact same amount. The example given as model 3 in Table 13 specifies that the model is not to be applied to all correlated products and, therefore, should just affect the forecast impression counts for product 6 without any change to any of the products that it is correlated with.

Using the growth models as specified, two different methods can be applied depending on whether a correlated or uncorrelated growth model is being applied. For models that specify correlated growth, starting from the first date in the range of dates indicated in the growth model specification, all aggregated forecast vector records that correspond to that date are searched. The process continues with selecting only those records for that date that have the bit corresponding to the product referenced in the growth model set to 1. The impression count values for these records are then multiplied by the "growth rate" factor illustrated in Table 13. For models that specify compounded growth, the growth rate value is multiplied by itself to produce the multiplier for the following day. The matching records are then found for the next date in the date range, and the new compounded value for the growth rate is used to adjust the impression count values for that date. This process is repeated for all of the days in the range specified by the growth model. An illustrative example of the data is shown in Table 14.

TABLE 14

Segment Forecast For Model 1

| Product Vector | Forecast Date | Impression Count |
|---|---|---|
| 1101001 | Jul. 1, 2006 | 488 |
| 1111001 | Jul. 1, 2006 | 64 |
| 0101001 | Jul. 1, 2006 | 1004 |
| 1101001 | Jul. 2, 2006 | 498 |
| 1111001 | Jul. 2, 2006 | 65 |
| 0101001 | Jul. 2, 2006 | 1024 |
| 1101001 | Jul. 3, 2006 | 508 |
| 1111001 | Jul. 3, 2006 | 67 |
| 0101001 | Jul. 3, 2006 | 1045 |
| 1101001 | Jul. 4, 2006 | 518 |
| 1111001 | Jul. 4, 2006 | 68 |
| 0101001 | Jul. 4, 2006 | 1065 |

Figure 11:
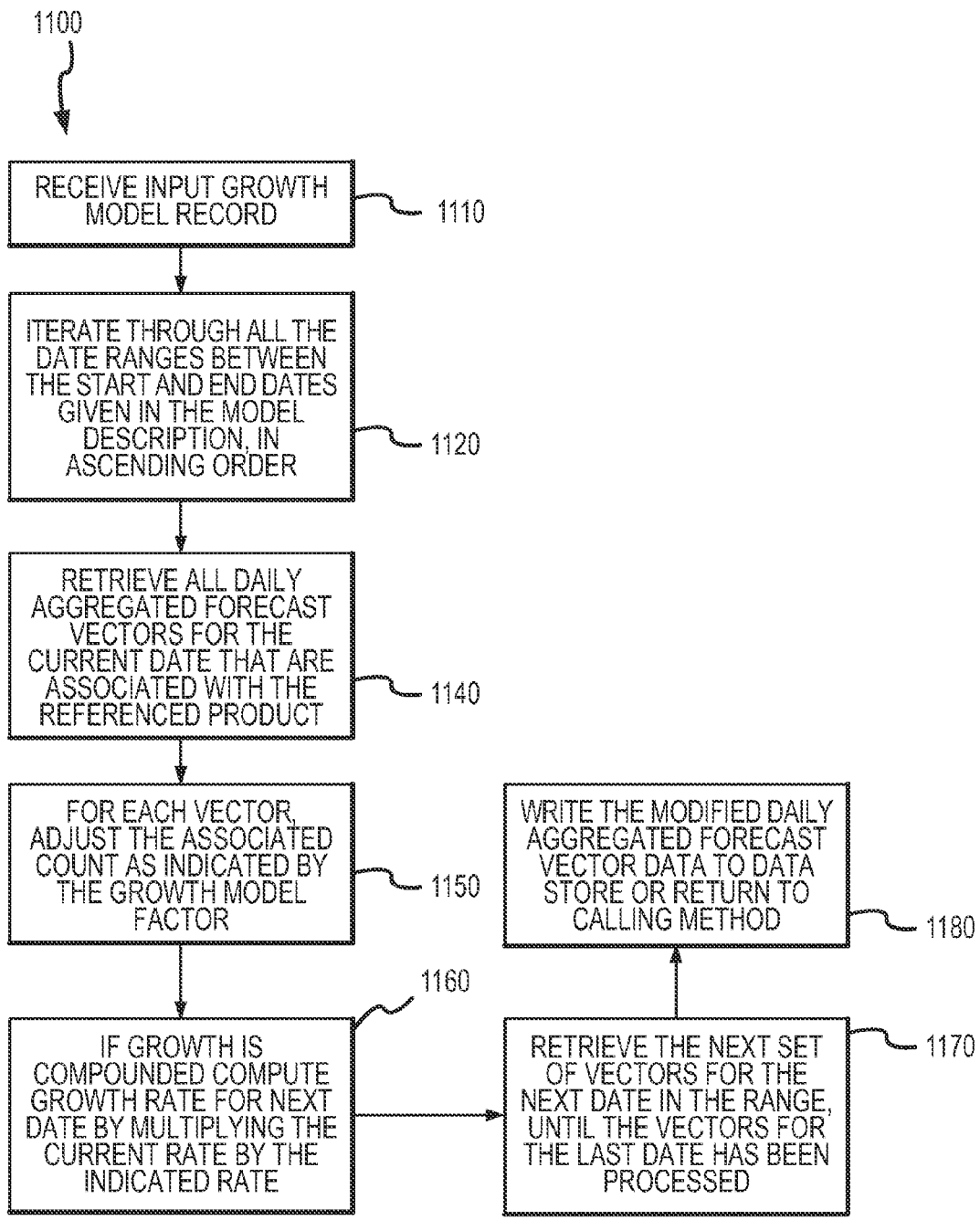
FIG. 11 illustrates an exemplary process in which growth and/or seasonality models for correlated growth are applied to previously-generated, aggregated forecast vectors.

FIG. 11 illustrates an exemplary process in which growth and/or seasonality models for correlated growth are applied to the inventory representation. As shown, at 1110, the inventory management module 100 or other component in system 12 receives an input growth model record, and at 1120, the module 100 iterates through all the date ranges between the start and end dates given in the model description in ascending or other useful order. At 1140, the daily aggregated forecast vectors for the current date are retrieved that are associated with the referenced product. At 1150, for each vector, the module 100 adjusts the associated count as indicated by the growth model factor. At 1160, if growth is compounded, the module 100 computes the growth rate for the next date by multiplying the current rate by the indicated rate. At 1170, the next set of vectors is retrieved for the next date in the range until the vectors for the last date has been processed. At 1180, the module 100 writes the modified daily aggregated forecast vector data to the data store such as database 70 and/or returns the data to the calling method.

An advantage of modeling product growth in this manner is that a single model specification for a single product can be used to adjust the quantities of all related products in exactly the same ratios as they are found to exist in the inventory data in relation to each other. For example, most inventory domains contain a product definition that represents an advertisement that can run anywhere on the site or in a network of sites. A simple example of this is product 7 illustrated in Table 1, which has no associated predicate string. For a product such as this, its product identifier will be present on every product vector in the database since it is at the top of the hierarchy of all products. Lacking a series of individual growth models for the various products, a seasonal growth model based on this top-level product, which utilizes the correlation option, will produce a reasonable model across all products.

A second example might involve a situation where based on historical analysis of the previous years traffic, two growth models may have been developed for two mutually exclusive products over the length of the Christmas holiday season, e.g., perhaps one for male traffic and one for female traffic. It is likely in this case that the correlation between the different product segments and male segment will differ substantially from those associated with female segment. In this case, when the two different models are applied to the growth of the associated inventory for each, the forecasts for the other associated products will be adjusted accordingly, e.g., at the individual rates set for each model.

For growth model specifications that are not to be applied across all correlated products, the following method may be applied for each date in the range of dates specified in the model. The date range is first scanned for a product vector that contains just the one product identifier corresponding to the target product referenced in the growth model. If none is found, a record is created with a product vector containing only the one specified product identifier. The impression count value is initialized to 0. Next, using the method specified above for computing the base forecast impression counts, the forecast impressions for this product are computed for the current day being processed. The growth rate number is applied to the current forecast, and the difference between the original value and the new value is derived. This new value is added to the value of the impression count field for the singleton record either found or created in the previous steps described above. This process is repeated for all the days in the date range specified in the model using either a compounded method or uncompounded method as described previously. An example that illustrates this type of growth is shown in Table 15.

TABLE 15

Segment Forecast For Model 3

| Product Vector | Forecast Date | Impression Count |
| --- | --- | --- |
| 0001111 | Jul. 1, 2006 | 30 |
| 0001111 | Jul. 2, 2006 | 30 |
| 0000010 | Jul. 2, 2006 | 02 |
| 0001111 | Jul. 3, 2006 | 30 |
| 0000010 | Jul. 3, 2006 | 04 |
| 0001111 | Jul. 4, 2006 | 30 |
| 0000010 | Jul. 4, 2006 | 06 |

Figure 12:
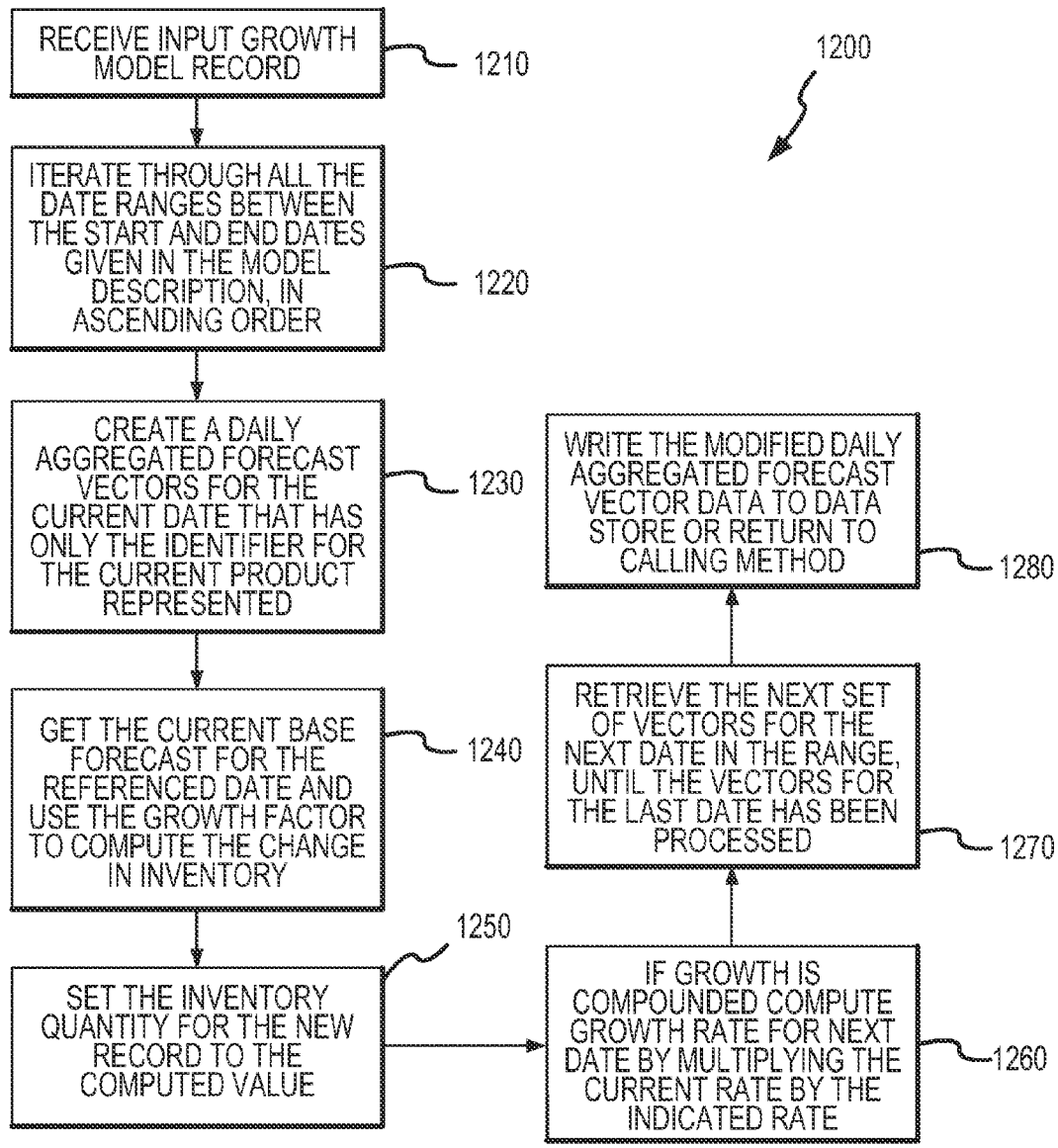
FIG. 12 illustrates a process for applying a growth model according to the invention in situations of uncorrelated growth.

FIG. 12 illustrates a process 1200 for applying a growth model according to the invention in situations of uncorrelated growth as discussed in the previous example. At 1210, an input growth model record is received, and the module 100 iterates at 1220 through all the date ranges between the start and end dates given in the model description in ascending or another useful order. At 1230, daily aggregated forecast vectors are created for the current date that has only the identifier for the current product represented. At 1240, the module 100 gets the current base forecast for the referenced date and uses the growth factor to compute the change in inventory. At 1250, the module sets the inventory quantity for the new record to the computed value and at 1260, if growth is compounded, the growth rate is computed for the next date by multiplying the current rate by the indicated rate. At 1270, the module 100 retrieves the next set of vectors for the next date in the range until the vectors for the last date has been processed. At 1280, the module 100 writes the modified daily aggregated forecast vector data to the data store such as database 70 and/or returns to the calling method.

Additionally, in lieu of specifying a value for the growth rate as described above, growth models can specify a base number of impressions that can be set for a given product. This is useful for a variety of situations including seeding the inventory with a new product that is to be introduced on a future date with an initial estimated number of impressions. This method applies only to specifications that are not correlated. The method for this is similar to the one for uncorrelated growth models except that the forecast numbers are set to the specified daily impression count set forth in the model. Additional growth models can be optionally applied to the data produced by these models to represent the anticipated growth of the new model.

The methods above illustrate the application of inventory growth models but do not specify how such models are generated for use by the inventory management module 100 to produce the available inventory representation 76. Growth modeling is an approximate science due to the fact that historically based projections of inventory levels can never predict the future with 100% accuracy. Further, there is an inherent manual aspect to predicting future changes in inventory levels due to the need of having the knowledge of past and future events that may not be correctly reflected in the historical inventory data. For example, it may be useful to filter out the effects of past one-time events that are not expected to reoccur or to adjust for changes in inventory levels due to business events such as acquisition of new inventory. However, it is still very useful to provide an automated system to build default growth models that can be applied at the discretion of product administrators and analysts.

Figure 13:
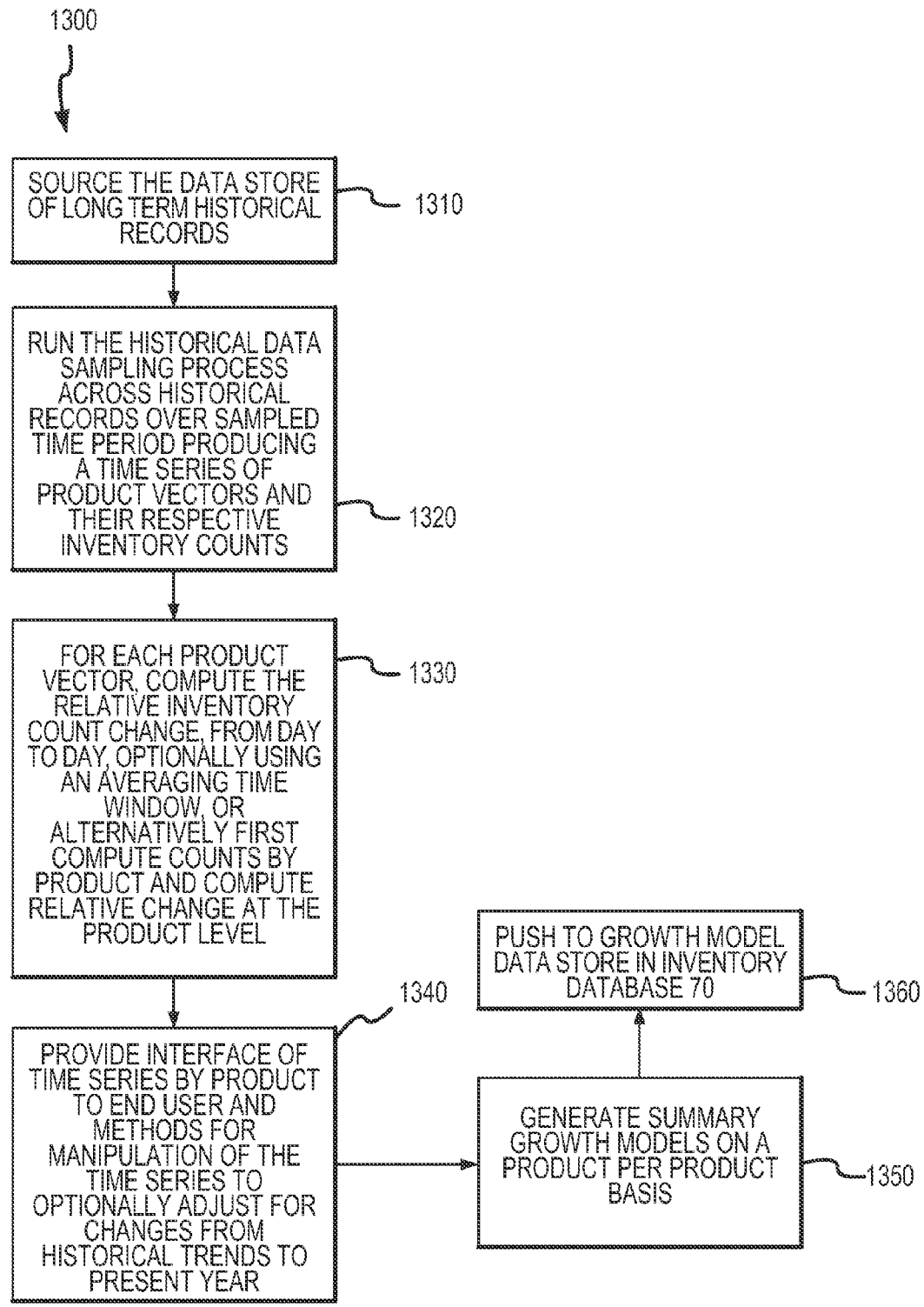
FIG. 13 is a flow diagram for a method of generating a growth model for use in modifying an inventory representation.

FIG. 13 provides an exemplary model generation method 1300, which may be performed by inventory management module 100, that begins at 1310 with sourcing the data store of long term historical records (such as log data 15 and/or inventory database 70). At 1320, the module 100 runs the historical data sampling process across historical records over a sampled time period to produce a time series of product vectors and their respective inventory counts. At 1330, for each product vector, the relative inventory count change is computed from day to day, and this may include optionally using an averaging time window or alternatively, first, computing counts by product and computing the relative change at the product level. At 1340, the module 100 may provide an interface of the time series by product to an end user. Additionally, methods may be provided for manipulating the time series to optionally adjust for changes from historical trends to the present year or some other point in time. At 1350, summary growth models are generated on a product per product basis, and then, at 1360, the growth model is pushed to a data store such as for storage in inventory database 70.

It should be noted that the ultimate accuracy of any growth model is fully dependent on the quality of the base forecast, as sampled over time, the base forecast as it is used as a starting point for the application of models, and the accuracy of the method for applying the growth models to the product segment of interest (with the corresponding effect on the growth of correlated product segments). With this in mind, although the present invention is exemplary in all these areas, the ultimate accuracy of a model applied to the system 12 is likely superior to what it would be otherwise.

Figure 14:
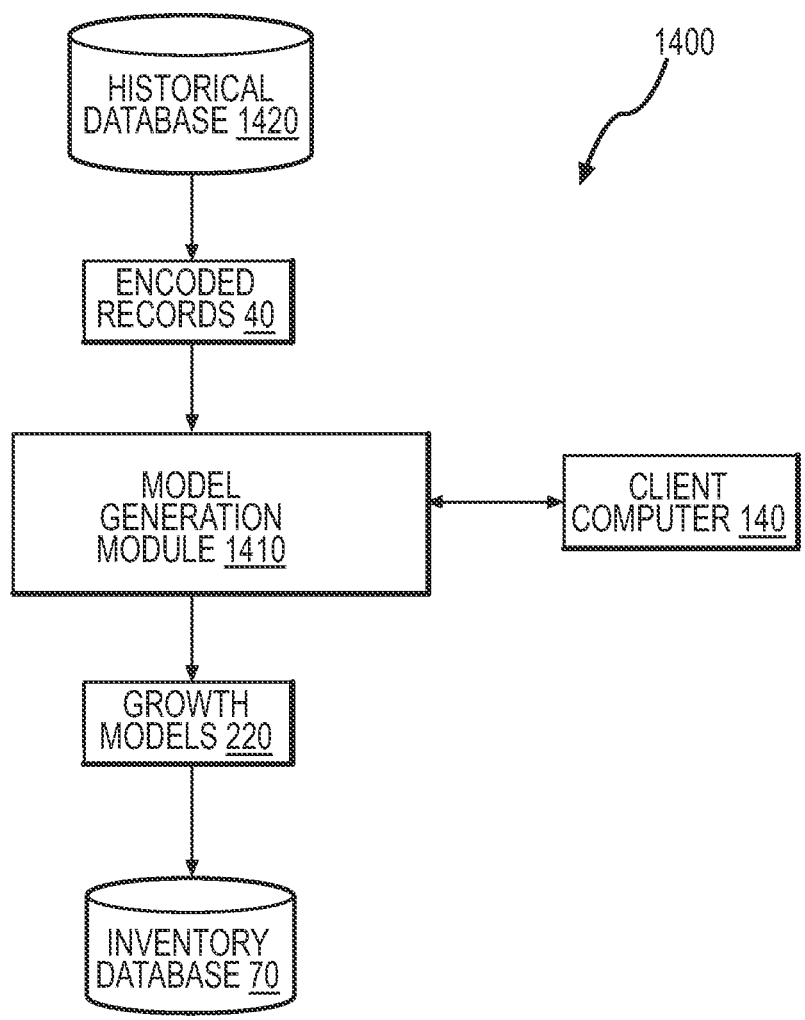
FIG. 14 illustrates a model generation subsystem that may optionally be provided as part of an inventory management system, such as the system shown in FIG. 1.

Model generation may be provided as part of an inventory management system 12 or be provided as a separate subsystem accessible by the system 12 (or models may otherwise be provided to the system 12). FIG. 14 illustrates one useful model generation subsystem 1400 that may be used with an inventory management system 12 as shown. The model generation module 1410 is a separate module that creates default growth and seasonality models based on historical analysis of a large data store of the encoded records built by the data processing module 30. It provides the benefit of being able to generate default growth models, to easily visualize growth patterns at the product level, to manipulate the patterns to adjust for differences between the historical and expected future growth, and to transfer these models to the inventory management module 100, where they can be accurately applied. This module 1410 and data store will often optimally reside on a separate computer system from the other modules and data stores in the system 12.

To generate the default models, the following method is used and implemented by model generation module 1410. The historical log records over one year's period from a historical database 1420 are processed by the data processing module 30, and optionally the combiner module 50, shown in FIG. 1. This processing includes processing the data for each day and producing for each day a set of records previously described as the aggregated forecast vectors. Each set is then processed using the forecast computation method as previously described, which results in producing a listing of daily summary impression counts and creating one record for each product for each day being analyzed. Due to the size of the historical records in database 1420, it may be necessary to only process a randomly selected subset of the historical logs. In which case, the methods described early of using a daily sampling fraction and daily sampling multiplier may be utilized. Alternatively, the daily summary impression counts that were produced as a matter of the daily processing over the previous year can be used instead of reprocessing the historical log records. This data is collected for a period from the present date back in time to analyze a period sufficient to provide the desired growth patterns, e.g., typically one-year prior. This creates what may be referred to as historical summary inventory counts and can be illustrated in Table 16. These are then written out to the historical database 1420.

TABLE 16

Historical Summary Inventory Counts

| Product ID | Forecast Date | Forecast Inventory | Growth Factor |
|---|---|---|---|
| 1 | Jul. 1, 2006 | 552 | 0 |
| 2 | Jul. 1, 2006 | 1556 | 0 |
| 3 | Jul. 1, 2006 | 376 | 0 |
| 4 | Jul. 1, 2006 | 1679 | 0 |
| 1 | Jul. 2, 2006 | 580 | .05 |
| 2 | Jul. 2, 2006 | 1633 | .05 |
| 3 | Jul. 2, 2006 | 394 | .05 |
| 4 | Jul. 2, 2006 | 1763 | .05 |

In a preferred embodiment of the present invention, for each product, the forecast inventory from the current day is compared with the previous day to compute the percent change between the two days until the full year has been processed. This processing generates a historical growth trend time series for each of the products defined in the system. Alternatively, instead of computing the percent change between each day, the percent change between a moving average can be used. Alternatively, computation of the daily change in inventory counts as a relative percentage of the prior day can first be computed directly on the daily aggregated forecast vectors that are produced from the historical data store described above without aggregating the changes up to the product level and optionally using a moving average. For example, if the daily aggregated forecast vectors 76 stored in the inventory database 70 was built from processing the data from a 7-day interval, a rolling 7-day average could be used to compute the relative percentage daily change. If no manual adjustments to the computed growth changes are to be made, these values can be applied directly to the daily aggregated forecast vectors in the inventory database 70. However, providing a view of the growth changes at the product level as described above presents a simplified interface to the end user for the following described manipulation methods.

The previous year's growth patterns will typically differ from the current year in a number of respects. For example, the days of the week and certain holidays will not fall on the same calendar date. Certain one-time events such as a natural disaster, which may have influenced traffic patterns, will most likely not repeat. Additionally, certain products will have been introduced during the year, creating a one-time jump and showing zero availability prior to the product creation date. Other products may show a sudden increase or decrease in inventory levels due to changes in the site or to the quantity of advertising inventory being managed by the system.

The model generation module 1410 provides a reporting interface in which growth patterns of a given product or sets of products are displayed in graphical form to an analyst through the client computer 140 shown in FIG. 1. The reporting interface provided by module 1410 may also facilitate or perform analysis of the historical trends for irregularities that require adjustment. In order to provide a mechanism to alert analysts of growth pattern anomalies, the module 1410 also, in some embodiments, provides a reporting interface that will identify and provide notification of any product that has a change in inventory greater than a system configurable amount (e.g., an alarm value) from one date to the next (or over a user selectable time period).

To provide a mechanism to adjust for these differences, the model generation module 1410 provides a set of functions to manipulate the growth numbers accordingly. Each function may take as input a target product, a range of dates, and a scope, which specifies that the function is to be applied to either the selected product individually, the selected product and all products that are a strict subset of the selected product, or to all products that are partially or fully intersecting with the selected product. For example, if the selected product was the "run of site" product and the scope was the selected product and its strict subset products, then all of the products that are associated with the given site would be affected by the function. Conversely, if the selected product was a specific content area of a site, then only the products associated with that area would be affected.

A realign function may be included in the module 1410 that takes the target products across a range of dates and realigns the growth patterns by a specified number of days forward or backwards. For example, to adjust for the effects of the day of the week, which will fall on a different calendar day from year to year, the realign function could be applied to the top-level product across the full period in the system. Another example would be to shift the growth pattern for a holiday that does not always fall on this same day to re-center it on the date for the upcoming year. An extend function may be provided in the module 1410 and used to extrapolate inventory growth for products that have a sudden increase or decrease in volume due to one-time changes at the product level. This function will take the target product or set of products and a range of dates as input and extrapolate the inventory levels by extending the growth pattern out from the specified region immediately adjacent to the range of dates. For example, if a new product was introduced at mid-year, it will initially appear in the system as having a growth pattern going from an inventory level of zero to some number representing the subsequent inventory levels. This function provides a mechanism to extend out the inventory levels that occurred following the product's introduction to the calendar period prior to the product's introduction.

Further, a shift function may be provide in module 1410 that takes a product or set of products and a range of dates as input and functions to adjust the inventory levels up or down by a specified percentage so as to provide a convenient mechanism to adjust product levels that are expected to be different than their historical levels. A flatten function may be provide in module 1410 that takes a product or set of products and a range of dates as input and flattens the growth pattern between the two dates by linearly extending the levels between the start and end date. This is useful to reverse or undo the effect of a one-time event that is not expected to occur in the future, such as a natural disaster that temporarily affected inventory levels. Further, an apply function may be used in module 1410 to propagate the generated models to the growth model data structure in the inventory database 70, where they can be accurately applied by the inventory management module 100 to the base forecast data.

To provide forecast and availability caching, once any of the above methods are used to compute the daily forecast impressions for a product, the results are typically stored in a table for that purpose. For example, such caching table may be referred to as the Product Daily Summary Counts. An example of such a table is illustrated in Table 12, along with the allocated and available counts. The forecast inventory counts are generally only adjusted: when the forecast inventory for a product is first computed following the initial loading of the encoded records into the inventory database; when a new product is created by the inventory management module 100; and/or following the application of a growth model. Availability counts are also stored in this structure and are only updated following the previous operations or following an allocation that effects the availability of a product using the methods described below. Subsequent forecast and availability lookups are serviced by returning the forecast impression value from the product daily summary counts table for the products and date ranges of interest.

The forecast methods described above typically only apply to products that have been formally defined in the system and, therefore, are represented with a product identifier in the various product vectors. However, it is also preferable to perform ad-hoc product forecast look-ups for inventory segments that have not been previously established. This is supported using the following methods.

Figure 15:
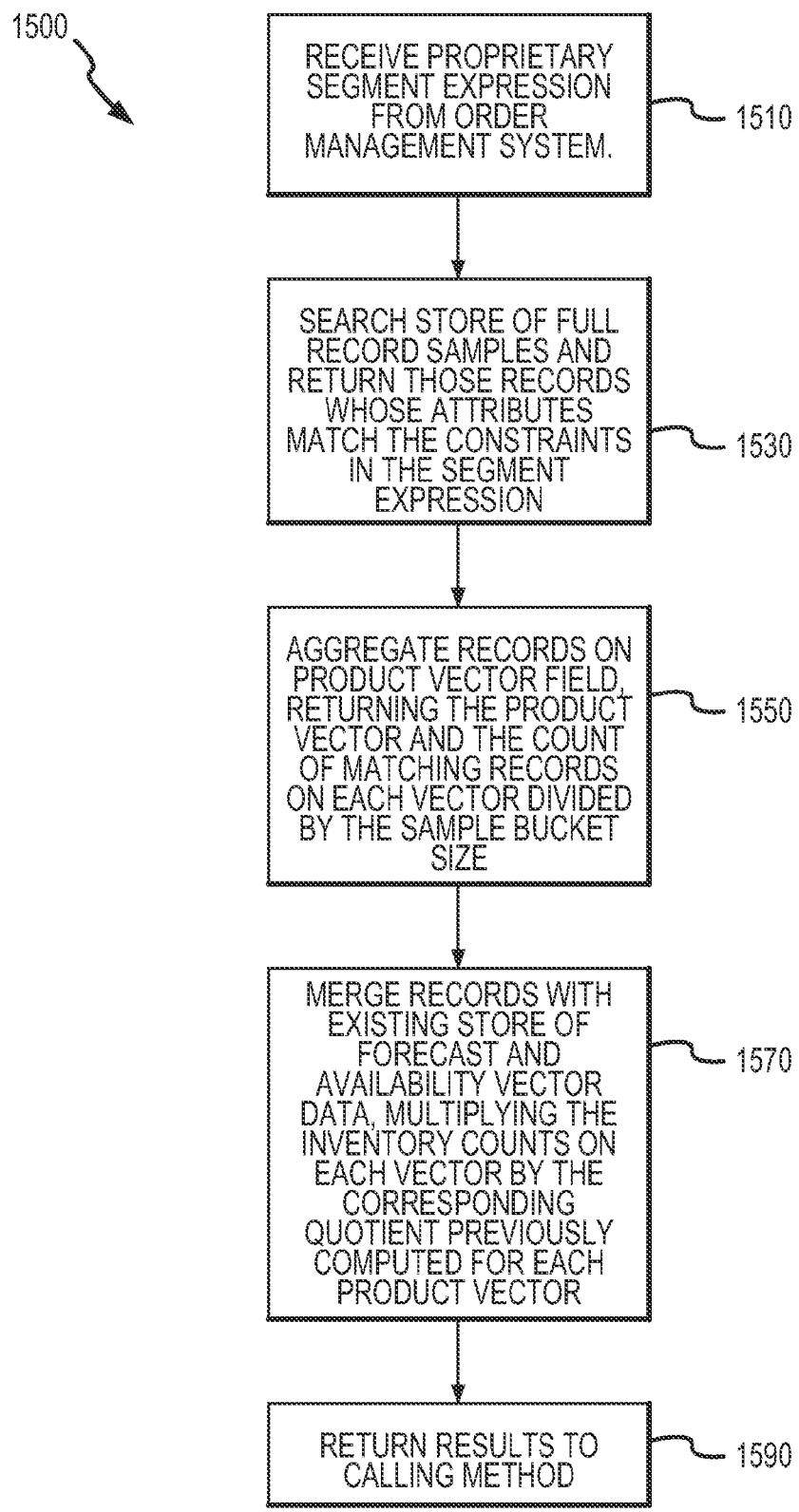
FIG. 15 illustrates with a flow diagram an exemplary method of performing an ad hoc product forecast look-up for an inventory segment that has yet to be established such as may be performed by the inventory management module of the system of FIG. 1.

FIG. 15 illustrates one method 1500 of performing an ad hoc product forecast look-up for an inventory segment that has yet to be established, such as may be performed by the inventory management module 100. At 1510, the module receives a proprietary segment expression from the order management system 80 or another querying module/client. At 1530, the module 100 searches the data store of full record samples and returns those records whose attributes match the constraints in the segment expression. In step 1550, the module 100 aggregates the records on the product vector field and returns the product vector and the count of matching records on each vector divided by the sample bucket size. At 1570, the records are merged with an existing store of forecast and availability vector data and the inventory counts on each vector are multiplied by the corresponding quotient previously computed for each product vector. At 1590, the module 100 returns the results to the calling method of the order management system 80 or the like.

Using the product vector sampling method for producing full record samples as described earlier, the following exemplary method of the present invention to determine the forecast or availability counts for a segment defined by an ad-hoc expression is described. A search is performed on the full record sampled set comparing the attribute values of the expression with the values in the sampled set. The records that match the expression are returned and an aggregated count is performed, aggregating on the product vector and returning product vector with the quotient formed by dividing each aggregated count on each product vector and dividing it by the bucket size that was used to create the sampled set. For example if the bucket size was 10 and the set of returned records for a given product vector was 2, the product vector and the quotient 0.2 is returned. This intermediate result set is then merged with the corresponding product vector in the segment forecast, multiplying the returned quotient with the impression count field, providing an estimate of the forecast impression count for the ad-hoc segment. A similar method is used to merge the result set with allocation data as described later to give an accounting of the count of available impressions. A similar algorithm is used if the full record sample was created using the stratified sampling method.

Figure 16:
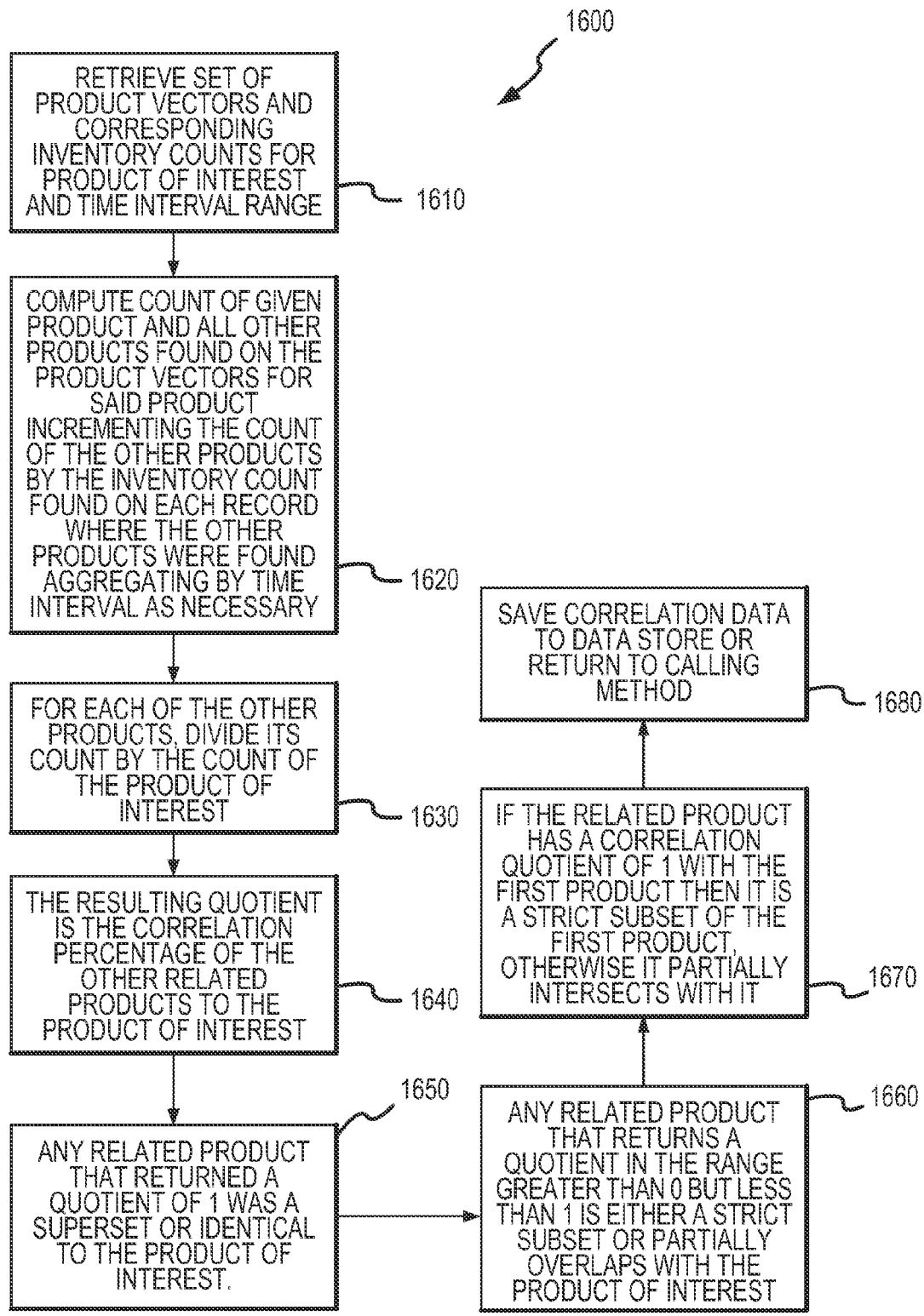
FIG. 16 illustrates one useful embodiment of a product correlation method according to the invention such as may be performed by the inventory management module of the system of FIG. 1.

Having computed the segment forecast information as partially illustrated in Table 14, product correlations are computed such as by operating the inventory management module 100 to perform the following method or other useful computational models, which is hereinafter referred to as the correlation determination method. FIG. 16 illustrates one useful embodiment of such a product correlation method 1600 that may be performed by the inventory management module 100 beginning at 1610 by retrieving the set of product vectors and corresponding inventory counts for a product of interest and a particular time interval range. At 1620, the count is computed of the given product and all other products found on the product vectors for the product including incrementing the count of the other products by the inventory count found on each record where the other products were found aggregating by a time interval as necessary. At 1630, for each of the other products, the module 100 divides its count by the count of the product of interest. At 1640, it is stressed or indicated that in the process 1600 the resulting quotient from 1630 is the correlation percentage of the other related products to the product of interest. Further, at 1650, it is indicated that any related product that returned a quotient of 1 was found to be a superset or identical to the product of interest. Still further, in process 1600, it is noted at 1660 that any related product that returns a quotient in the range greater than 0 but less than 1 is either a strict subset or partially overlaps with the product of interest, and at 1670, the module 100 determines that if the related product has a correlation quotient of 1 with the first product then it is a strict subset of the first product and otherwise it partially intersects with it. At 1680, the module 100 saves the correlation data to the data store or database 70 and/or returns to the calling method.

Due to the relative importance of the correlation determination method, the following description of how such a method may be implemented is provided. An initial product is selected, and the product table is scanned across all dates selecting only those records that contain the identifier for the selected product. For each of these matching records, an impression count that is grouped by date is summed for the selected product and all other products contained on the product vectors until all matching records for the product have been examined across the range of dates represented in the system. For each of the dates and for each of the other products, the impression count for each product is divided by the number of impressions of the initially selected product to produce a correlation factor with values between 0 and 1. This is the daily ratio of the other products with respect to the initially selected product. The formula for computing the product correlation factor may be the following or similar formulae. Let imp(a) be the number of impressions of product a and imp(b) be the total number of impressions for product b that occur on all the segments of the data representing product a, and further let corr(b, a) represent the correlation of product b to product a. Then the formula for this relationship is $$\text{Formula for Product Correlation } \operatorname{corr}(b,a) = \operatorname{imp}(b)/\operatorname{imp}(a) \qquad \text{Equation 2:}$$

An exemplary product correlation table for storing the results of these computations is illustrated in Table 17.

TABLE 17

Product Correlation

| Product ID 1 | Product ID 2 | Forecast Date | Correlation |
| --- | --- | --- | --- |
| 1 | 2 | Jul. 1, 2006 | 35.4 |
| 2 | 1 | Jul. 1, 2006 | 100 |
| 2 | 7 | Jul. 1, 2006 | 26 |
| 7 | 2 | Jul. 1, 2006 | 100 |
| 5 | 7 | Jul. 1, 2006 | 3.6 |
| 7 | 5 | Jul. 1, 2006 | 100 |
| 5 | 2 | Jul. 1, 2006 | 0 |
| 2 | 5 | Jul. 1, 2006 | 0 |

The 3rd and 4th row show that 26% of the data segment represented by product 7 overlaps with the data segment represented by product 2 while 100% of product 2 overlaps with product 7. This indicates that, as found in the data, product 7 is a parent of product 2 when expressed as a hierarchy. The last two rows show that the correlation between the data segments represented by product 2 and product 5 is 0. This indicates that the two products are not directly correlated.

The inventor has generated a number of axioms or paradigms for better understanding efficient inventory management, such as may be implemented by an inventory management system 12. According to a first axiom addressing correlated products: given any product, the list of products to which the particular product is directly correlated is the list of products that have a correlation factor to the product that is non-zero. Of these, the supersets of the particular product are those products that the product has a 100% correlation to. The products that are a strict subset of the particular product are those products that have a 100% correlation to the product. The products that partially intersect with the particular product are those, which have a correlation greater than 0 but less than 100% with the first product, with the particular product having a correlation greater than 0 but less than 100% with a second or correlated product. Conversely, given any product, the list of products to which the product has no direct correlation is the list of products that have a correlation factor to the product of zero.

One of the uses of the product correlation data generated by the inventory management module 100 is to provide a listing of products that are similar to one another. For example, if a given product's availability was limited over a particular date range, this data can be used to show or identify products that target a similar segment of the inventory, which might have greater availability. Another use for the product correlation data is to define a special product type called a "distributed" product. Such a distributed product is not really a single product but is instead a collection of related product types. Using the product correlation data and the previously stated axiom, a collection of related products is built by finding all of the products that have a non-zero correlation relative to the base product of interest. There are several groups of related products that can be selected either individually or in combination. The groups are those products that are a strict subset of the base product, those products that are a superset of the base product, and those products that partially overlap with the base product. These groups of related products are determined using the metrics stated in the above axiom.

One significant use of a distributed product is for use in test marketing a set of ads for a CPC (Cost Per Click) product buy, e.g., for a product buy in which a clickthrough rate needs to be established. In this case, the inventory management module 100 determines one or more product segments that will produce the desired CPC goal while minimizing (or controlling) the cost of inventory to achieve that goal, as described below. In an exemplary implementation or operation of system 12, when a product is created for a distributed product, the quantity of inventory for that product buy is distributed in accordance with the relative quantity of forecast inventory for each of the related products in the set. The product buy is then internally implemented as separate allocations for the specific inventory quantities previously determined for each of the individual products that were in the selected set.

The system 12 is also effective for performing daily allocation of managed inventory as represented by available inventory representation 76. As part of such daily allocation, the inventory management module 100 receives the details of sales contracts from the order management system 80. This information includes among other things the information concerning the product being reserved, the total number of impressions to be allocated, and the contract start and end dates. Looking at the available impressions information 76 previously stored in the product daily summary table for the specified product and as is representatively illustrated in Table 12. The total number of available impressions over the specified period is compared with the total number of impressions contained in the sales contract. Under normal circumstances, if the number of contract impressions is not in excess of the total amount of available impressions, the allocation can go forward. In a method referred to as flighting, the inventory management module 100 looks at the information for each day in the product daily summary table and divides the total number of contract impressions into the total number of days to derive an optimal daily number of impressions to allocate. The module 100 attempts to create as even a distribution of daily impressions as possible within the constraints of the inventory available for that product on a daily basis.

After the number of impressions to allocate for each date in the contract period has been derived (referred to here as the daily allocation), the allocated impression numbers for the particular product in question are incremented in accordance with those numbers for each date in the contract period by the amounts specified. Correspondingly, the number of available impressions for the product is decremented by the same amount over the plurality of dates in the contract period in accordance with the same daily allocation. A simple example is illustrated in Table 18.

TABLE 18

Product Daily Summary Counts Showing Allocation of
100 Impressions Over Three Days

| Product ID | Forecast Date | Forecast Impressions | Allocated Impressions | Available Impressions |
|---|---|---|---|---|
| 1 | Jul. 1, 2006 | 552 | 100 | 452 |
| 1 | Jul. 2, 2006 | 563 | 100 | 463 |
| 1 | Jul. 3, 2006 | 575 | 100 | 475 |

Figure 17:
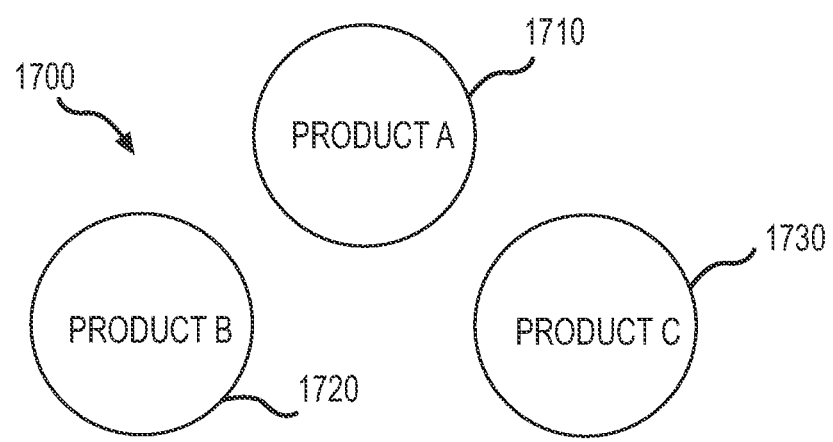
FIG. 17 illustrates a representation of an inventory in which the various products such as advertising impressions defined by a set of criteria or attributes do not overlap or are uncorrelated products.

In more traditional inventory models or systems such as the inventory environment 1700 shown in FIG. 17, the product availability is relatively simple to determine because the inventory is uncorrelated. Specifically, the three sets of inventory 1710, 1720, and 1730 are distinct and do not overlap. In this more traditional inventory context, the inventory level of each product 1710, 1720, and 1730 is independent of other products since quantity on hand of one product does not have any bearing or effect on the quantity of another product. The three products illustrated in FIG. 17 have no inventory in common nor do they have a relationship with any other product that, in turn, shares inventory with any of the three. Therefore, they are uncorrelated both directly and indirectly. For this situation, the available inventory of each product is equal to the initial quantity of inventory available less the quantity of inventory sold. Let the initial quantity of inventory available during a finite amount of time t, and referred to here as the forecast of product p, be represented as fcast(p). Further, let the quantity sold of product p for a finite amount of time t be represented as sold(p) and the available quantity remaining over finite amount of time t be represented as avail(p). Yet further, let product p be a product that does not have any inventory in common with any other product. Then the formula for product availability is:

Formula for Product Availability for Uncorrelated
Products $avail(p) = fcast(p) - sold(p)$  Equation 3:

In the case of multi-dimensional inventory environments in general and of advertising product sets in particular, the situation is much more complex. Since the product segments in multi-dimensional inventory environments typically overlap, it is preferable to take into account and potentially adjust the available inventory quantities of many of the other products to reflect the effect of such overlapping of segments. For example, it may be preferred that inventory management by the system 12 or other management tools adjust the available inventory quantities of other products to reflect the fact that the allocation of one product impacts the remaining quantity of inventory for other products that have inventory in common or that overlap.

Figure 18:
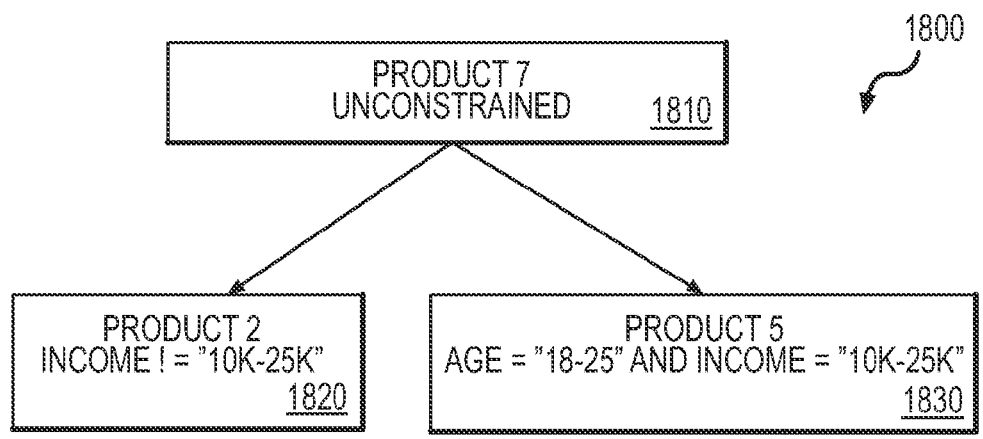
FIG. 18 illustrates an inventory in which the products have a hierarchical relationship as shown by the inventory representation or environment.

FIG. 18 illustrates a product availability environment or representation 1800 of a hierarchical inventory (as is often found in advertising inventory and the like). Hierarchical products 1810, 1820, 1830 are examples of correlated products as illustrated by the simple product hierarchy 1800 illustrated in FIG. 18. The three products 1810, 1820, 1830 shown have a hierarchical relationship in which products 2 and 5, which are useful for illustrating two sets of demographic criteria, have a child relationship to product 7. Product 7 (i.e., item 1810 in inventory 1800) represents unconstrained inventory similar to what is commonly referred to as "run of site" or "run of network" and can be viewed as the parent of both products 1820, 1830. Furthermore, the product segments or sets of products 2 and 5 are mutually exclusive (e.g., do not overlap if drawn in a Venn diagram as they do not have common inventory or impressions). The representation 1800 of inventory in FIG. 18 shows that inventory can, in some cases, be represented as a common data structure known as a tree.

Figure 19:
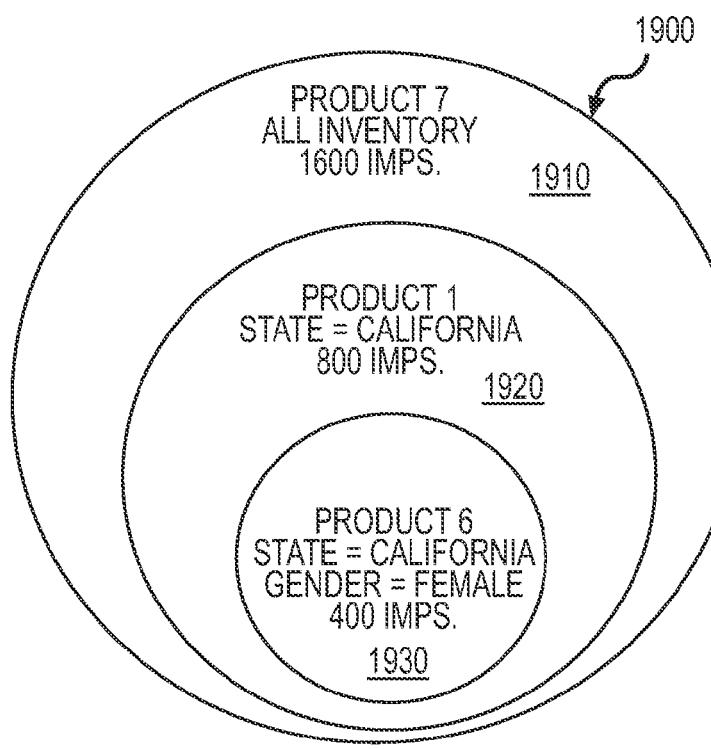
FIG. 19 illustrates a simplistic Venn diagram of an inventory or inventory relationship in which hierarchical relationships are shown with subset or segments within other segments.

Venn diagrams provide an alternative method of illustrating the relations of sets, which in this context is the equivalent of the segments of the data such as inventory data taken from historical log data 15 by data processing model and is discussed herein interchangeably as products. For example, FIG. 19 illustrates an inventory representation 1900 including three inventory segments 1910, 1920, and 1930 and their hierarchical relationship with a Venn diagram, e.g., FIG. 19 uses a Venn diagram to illustrate a multi-level hierarchy. The diagram of representation 1900 illustrates that Product 1 (or segment 1920) is the parent of Product 6 (or segment 1930) and Product 7 (or segment 1910), in turn, is the parent of Product 1 (or product segment 1920). The diagram 1900 also illustrates that the entire region that defines Product 1 (or segment 1920) is also common to Product 7 (or segment 1910). Similarly, the entire region defining Product 6 (or segment 1930) is common to Product 1 (or segment 1920) as well as being common to Product 7 (or segment 1910). In other words, the inventory of Product 6 is a subset of the inventory of Product 1, which in turn is a subset of the inventory of Product 7. Hence, allocating Product 6 to a contract (e.g., an advertising request) will affect the availability of inventory of Products 1 and 7 as allocating Product 1 will affect the availability of Product 7. In contrast, using the allocation techniques of managing advertising or other inventory described herein typically will result in better of allocation of Product 7 to limit the effect on inventory of Products 1 and 6 (i.e., by first allocating the non-overlapping portions). Similar allocation to control cannibalization is used when allocating inventory of Product 1 to limit allocation of inventory of Product 6.

Figure 20:
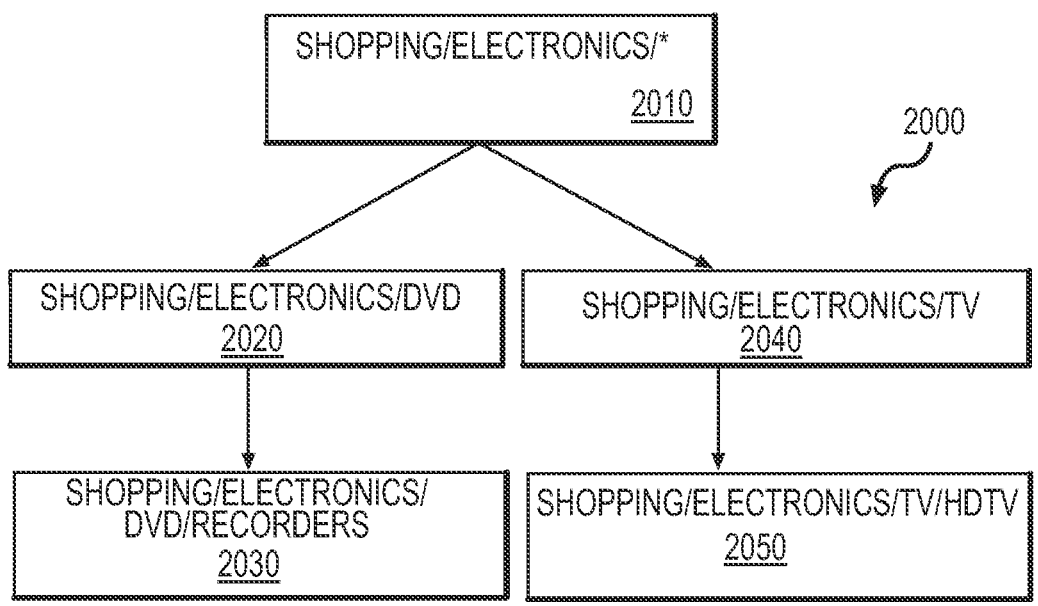
FIG. 20 illustrates an inventory or inventory representation similar to that of FIG. 19 but using a tree representation to illustrate the hierarchical relationships of the inventory segments or subsets.

Hierarchical relationships are often seen within the organizational structure of a Web site as illustrated in FIG. 20 in the form of a tree structure or tree representation of available inventory 2000 with product segments (such as sets of advertising inventory meeting one or more criteria or having one or more attributes) 2010, 2020, 2030, 2040, and 2050 arranged in a tree form. In this example, an electronic commerce site is shown that contains a general area of the site dedicated to electronics (i.e., a product segment 2010) under which there are two subcategories or product segments, one for DVD players (i.e., segment 2020) and one for televisions (i.e., segment 2040). Under the DVD area 2020, there is a further subcategory for DVD recorders (i.e., segment 2030) and under the TV area 2040 there is a subcategory for high definition televisions (i.e., product segment 2050).

Figure 21:
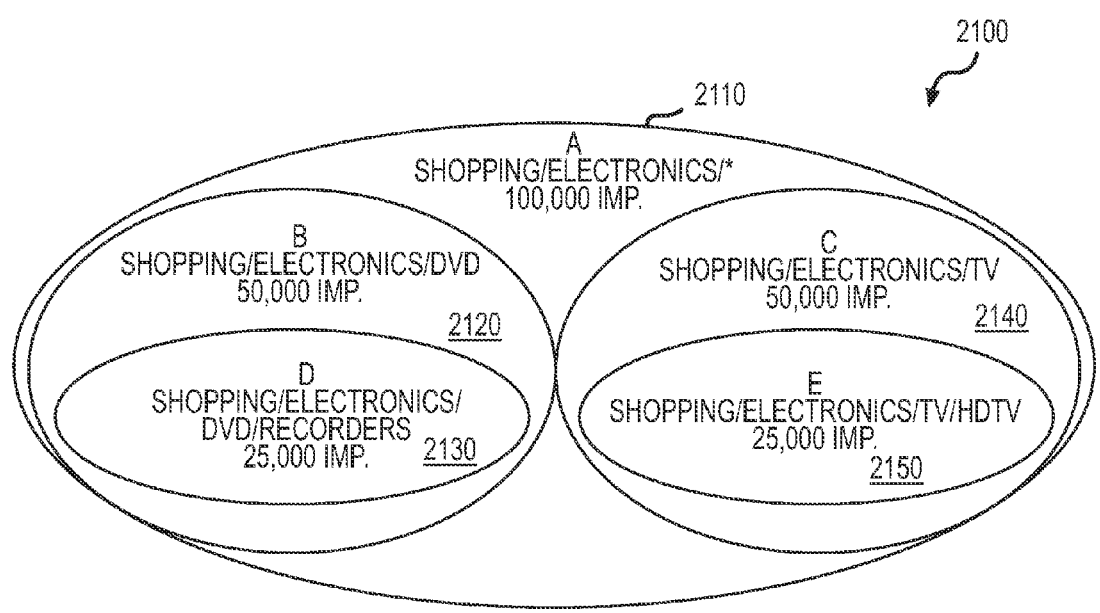
FIG. 21 illustrates an inventory or inventory representation similar to that of FIG. 19 for the inventory segments shown in FIG. 20 using a Venn diagram to show the hierarchical relationship and overlapping nature of the inventory that complicates allocation determinations by a management system or method.

The same set of inventory or inventory structure is shown using a Venn diagram in FIG. 21 with an inventory representation 2100 that includes segments 2110, 2120, 2130, 2140, and 2150. In this example, the top-level area of the site or upper most product segment 2110 has no actual inventory other than the inventory contained by the categories or segments 2120-2150 below it in the hierarchical relationship (i.e., segment 2110 has 100,000 impressions which is the total impressions available in segments 2120-2150). This might be the case in practice for a Web site or other inventory because either there are no advertisements being served in the top-level section of the site or because the product itself is a just a logical construct for sales purposes that is defined by the four other products 2120-2150 (e.g., for the purpose of being able to sell advertisements anywhere in the electronics areas of the site). In this example, each of the two second-level categories or segments 2120, 2140 has a daily forecast of 50000 impressions, with each of their subcategories or segments 2130, 2150 having a daily forecast of 25000 impressions. Therefore, the top-level category or segment 2110 has a total daily forecast sum of 100,000 impressions. The correlation factors that relate to this example are illustrated in the example data in Table 19.

TABLE 19

Product Correlations in a Site Hierarchy Example

| Product ID 1 | Product ID 2 | Forecast Date | Correlation |
|---|---|---|---|
| A | B | Jul. 1, 2006 | 1.00 |
| B | A | Jul. 1, 2006 | 0.50 |
| A | C | Jul. 1, 2006 | 1.00 |
| C | A | Jul. 1, 2006 | 0.50 |
| A | D | Jul. 1, 2006 | 1.00 |
| D | A | Jul. 1, 2006 | 0.25 |
| B | D | Jul. 1, 2006 | 1.00 |
| D | B | Jul. 1, 2006 | 0.50 |
| C | E | Jul. 1, 2006 | 1.00 |
| E | C | Jul. 1, 2006 | 0.50 |
| A | E | Jul. 1, 2006 | 1.00 |
| E | A | Jul. 1, 2006 | 0.25 |
| C | B | Jul. 1, 2006 | 0.00 |
| E | B | Jul. 1, 2006 | 0.00 |

Figure 22:
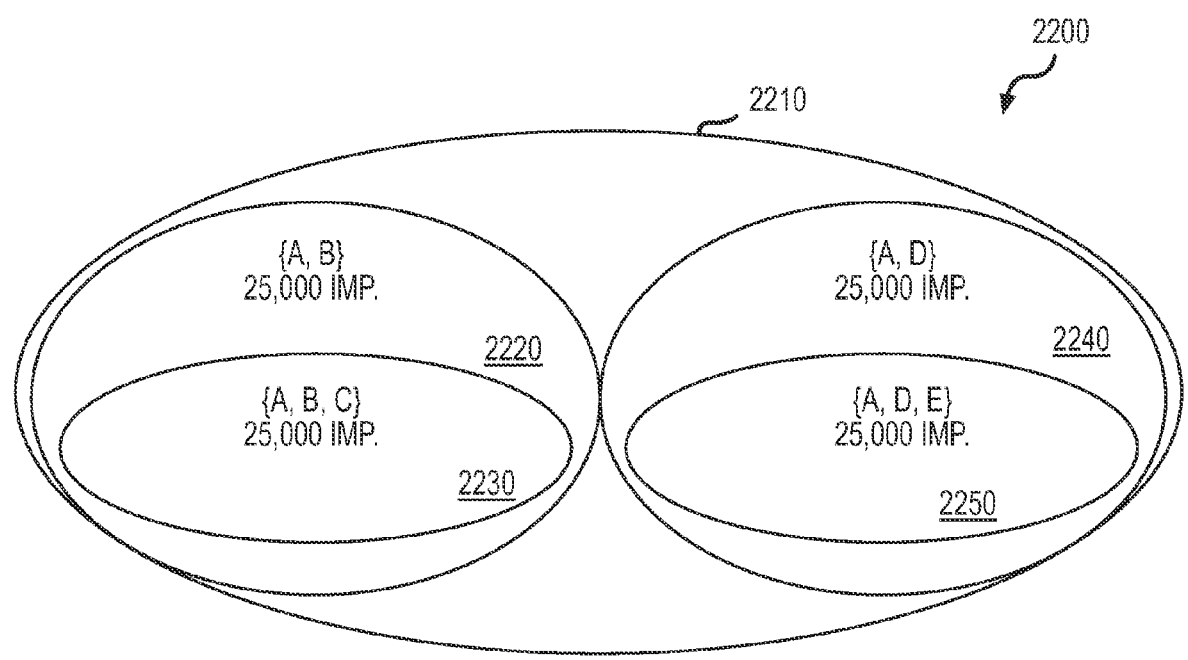
FIG. 22 illustrates another example of an inventory similar to that of FIG. 21 with correlation or relationships among the products or segments shown with a Venn diagram.

FIG. 22 shows the above relationship or inventory 2200 as represented by an exemplary method of the present invention. The region 2210 is divided into the four product segments 2220, 2230, 2240, and 2250. In this illustration, the product vector representation 2200 is shown as a list of product identifiers, not as a binary encoded, sparse representation. In this representation 2200, product identifiers that do not meet the definition of the product vector are not explicitly represented but instead the fact that their identifiers are not listed suffices to document the fact that their definitions are not satisfied by the respective region of inventory. For example, using the "!" character to represent exclusion, the region {A, B, C} could equivalently be represented in this particular five-valued hierarchy as {A, B, C, !D, !E}. Unlike the more conventional Venn diagram represented above, which is similar to representations of relational constraints, FIG. 22 illustrates that the present invention defines the representation of inventory space as discrete, mutually exclusive regions. Therefore the region represented by {A, B} shows an inventory value of 25,000 rather than 50,000 because it does not represent all the inventory for which products A and B are found, but rather the distinct region of inventory for which {A, B, !C, !D, !E} is true. Similarly, consistent with the definition of product A as described above, there is no region of inventory characterized solely with the single product identified here as A, rather the forecast and availability of the product segment of A is actually just a summary operation on the distinct regions that each contain the identifier for it. The majority of the exemplary methods of the present invention are based on operations on these discrete units of inventory.

Product availability performed by the inventory management module 100 by itself or in collaboration with other portions of the inventory management system 12 in FIG. 1 can be described using a correlation method. To compute the availability for any given product for any given time interval, subtract the quantity allocated for the given time interval from the initial forecast quantity for that specific product during the given time interval and additionally subtract the quantity of that product that is no longer available due to the cannibalization of that product by the allocation of other correlated products. To formalize this relationship for any product p, let the initial quantity of inventory available during a finite amount of time t (and referred to herein as the forecast) of product p be represented as fcast(p) and let the quantity sold of product p for a finite amount of time t be represented as sold(p). The consumption of product p as the result of the allocation of correlated product p1 during time t can be represented by cons(p, p1). The total quantity of product p that has been consumed as the sum of the result of the allocation of all products p1, p2 . . . pn that are correlated to product p over time t may be represented as cann(p) and referred to herein as the cannibalization of p, and, additionally, the available quantity remaining of product p over finite amount of time t may be represented as avail(p). Then the formula for computing the consumption of p by p1 is:

Formula for the Consumption of $p$ by $p1$
$$\text{cons}(p,p1)=\text{sold}(p1)*\text{corr}(p,p1) \quad \text{Equation 4:}$$

The formula for computing the cannibalization of p by all products p1, p2 through pn that are correlated to p is:

Formula for the Cannibalization of $p$
$$\text{cann}(p)=\text{cons}(p,p1)+\text{cons}(p,p2)+\ldots+\text{cons}(p,pn) \quad \text{Equation 5:}$$

The formula for computing the availability of p is:

Formula for the Availability of Product $p$
$$\text{avail}(p)=\text{fcast}(p)-\text{sold}(p)-\text{cann}(p) \quad \text{Equation 6:}$$

The above relationship is implemented in some cases using an exemplary method of the present invention for computing product availability (herein called the correlation method). An exemplary implementation process 2300 is now described with reference to FIG. 23. As shown, the inventory management module 100 of system 12 in FIG. 1 may implement the method 2300 by running a correlation determination method to establish product correlations at 2310. Then, at 2320, the module 100 may run a product determination on a segment expression of the allocated product to find a product identifier. At 2330, for each managed time period in the range specified for the allocation, the module 100 obtains the current count of remaining inventory for the segment prior to allocation and also obtains the quantity to allocate for each respective period. At 2340, the module 100 for each time period computes the new allocation as the quotient of the new allocation divided by the remaining inventory. At 2350, for each product vector that includes the product identifier of the allocated product, the module 100 multiplies its current inventory count by the allocation percentage. At 2360, for all other products that have identifiers on the product vectors for the allocated product, the module 100 updates their summary availability counts by summing up the counts on all of the product vectors associated with each. Then, at 2370, the module 100 saves the results to the data store 70 and/or returns to the calling method.

Figure 23:
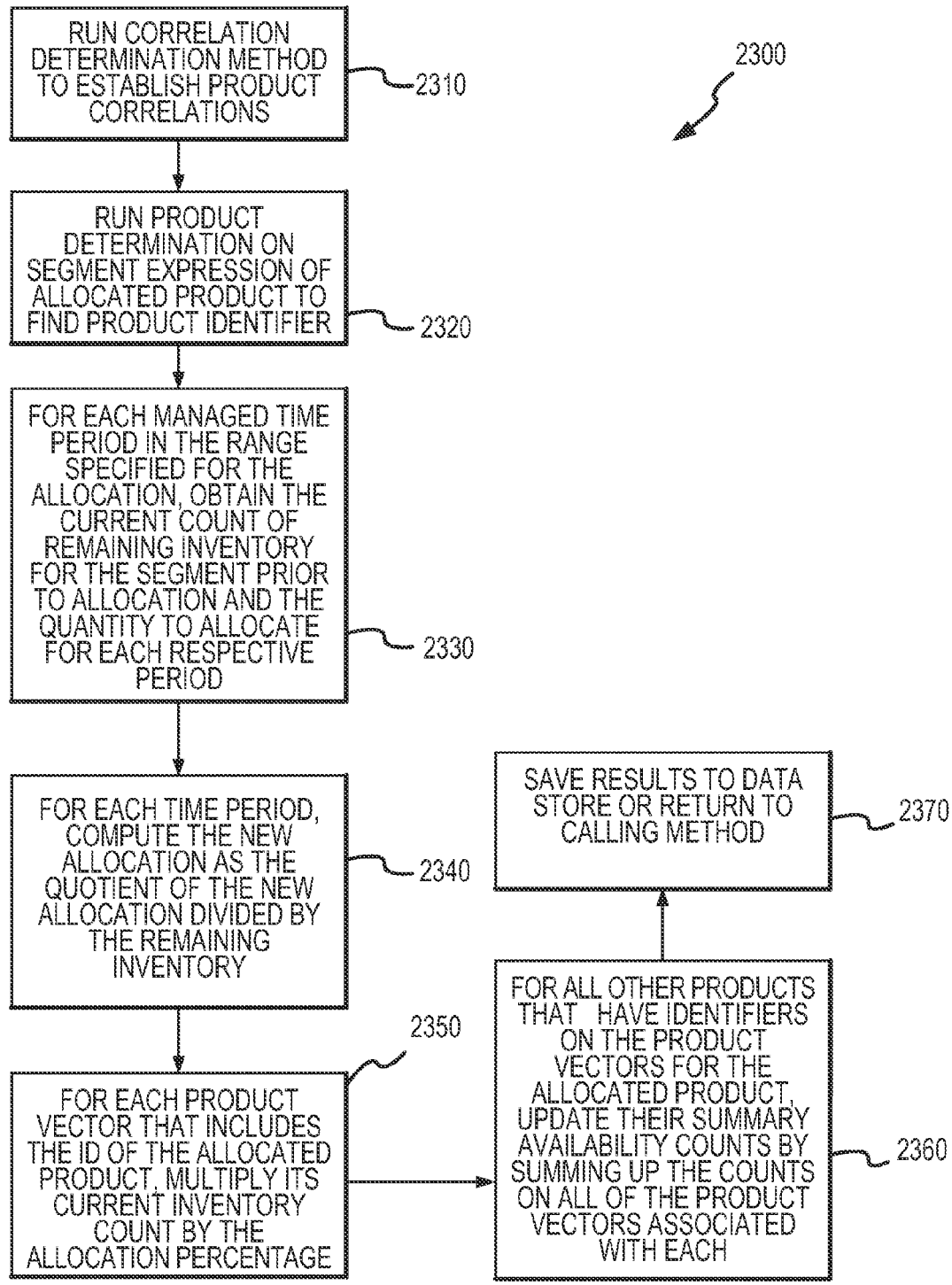
FIG. 23 illustrates a flow chart for an exemplary method of the present invention for computing product availability called the correlation method.

As shown in FIG. 23, having computed the correlations between products as described earlier, these correlation values are used to compute the effects of an allocation to a given product. For each managed time period in the range specified for the allocation, the current count of remaining inventory is obtained for the segment as exists prior to the allocation. Using the quantity to allocate for each respective time period, a quotient is computed as defined by the quantity to allocate divided by the current count of remaining inventory. This quotient is then used to proportionally decrement the remaining counts of each individual region of inventory as identified by its unique product vector by multiplying its original count of inventory by the above quotient. For the initial product, this has the same effect as simply subtracting the summary count for that product for the given time interval by the quantity to allocate for said interval. The summary counts for the other products that have their respective identifiers on the product vector of one or more of the allocated product's vectors are then summed again to update their respective availability counts.

An illustrative example at this point may be useful and can be constructed using the relations between a set of hierarchical products shown in FIG. 21 and the corresponding correlation data illustrated in Table 19. To provide a concrete example, assume that 50,000 impressions of product a have been sold and 25,000 impressions of product b have been sold. Further, assume that the availabilities of products a, b, c, d and e are to be calculated for a proposed sales contract. The calculation would be as follows.

Consumption from Product a
cons(b, a)=sold(a)*corr(b, a)=50,000*0.50=25,000
cons(c, a)=sold(a)*corr(c, a)=50,000*0.50=25,000
cons(d, a)=sold(a)*corr(d, a)=50,000*0.25=12,500
cons(e, a)=sold(a)*corr(e, a)=50,000*0.25=12,500
Consumption from Product b
cons(a, b)=sold(b)*corr(a, b)=25,000*1.00=25,000
cons(c, b)=sold(b)*corr(c, b)=25,000*0.00=0
cons(d, b)=sold(b)*corr(d, b)=25,000*0.50=12,500
cons(e, b)=sold(b)*corr(e, b)=25,000*0.00=0
Total Cannibalization
cann(a)=cons(a, b)=25,000
cann(b)=cons(b, a)=25,000
cann(d)=cons(d, a)+cons(d, b)=12,500+12,500=25,000
cann(c)=cons(c, a)=25,000
cann(e)=cons(e, a)=12,500
Product Availability
avail(a)=fcast(a)−sold(a)−cann(a)=100,000−50,000−25,000=25,000
avail(b)=fcast(b)−sold(b)−cann(b)=50,000−25,000−25,000=0
avail(c)=fcast(c)−sold(c)−cann(c)=50,000−0−25,000=25,000
avail(d)=fcast(d)−sold(d)−cann(d)=25,000−0−25,000=0
avail(e)=fcast(e)−sold(e)−cann(e)=25,000−0−12,500=12,500

This method provides a fast and convenient method to compute product availability but is not the only preferred method that may be implemented to practice the invention for some of the reasons explained below.

Available inventory may be allocated by the inventory management module 100 in a number of ways. For example, there are at least two differing allocation methodologies according to embodiments of the invention related to the accounting for cannibalization and, therefore, the accounting of availability for correlated products. These two general methodologies are embodied in the specific methods defined and described in the following paragraphs. Both of the two general methodologies and the specific methods that embody each of them take into account and model the effects of cannibalization as is preferred in methods of the invention. However, it is likely that the methodology termed "logically necessary allocation accounting" is the exemplary method that will produce higher yields of available inventory (e.g., better use of the available inventory to fulfill contracts so as to better control cannibalization).

The first allocation method is the general method of discretionary allocation for accounting for the consumption of related product segments. Discretionary allocation may be performed by the inventory management module 100 or other portions of the system 12. Discretionary allocation may be described by the following axiom. The available quantities of related product segments can be decremented as a result of an allocation of a given product segment in any arbitrary way, as long as it produces a consistent method of accounting for that consumption of the product in the product segments.

In contrast, the inventory management module 100 or other portions of the system may manage the available inventory 76 by performing a second allocation method labeled logically necessary or forced allocation. Logically necessary or forced allocation can be defined or described by the following axiom. As a result of an allocation of a given product segment, the amount of available inventory of directly or indirectly related product segments shall only be decremented by the minimum amounts that are logically necessary to provide for the allocation of the product. The end result of any method that implements this methodology will produce the maximum availability that is logically possible. The previously described and illustrated correlation method to compute product cannibalization and availability is an example of a specific method that embodies the general method of discretionary cannibalization accounting. However, the example allocation above can serve to illustrate both forms of allocation.

Specifically, the consumption of products b, c, d, and e as a result of the sale of product a are discretionary allocations. While the allocation of this method is done consistently based on the correlation of the product sets, none of the quantities allocated against each of these products to represent the cannibalization is logically necessary. For example, 50,000 impressions of the top-level product a were sold with 25,000 impressions each being allocated against both product b and c. However, while it is logically necessary that the 50,000 impressions sold of a be reflected somewhere in the product hierarchy below a, allocating those impressions evenly between b and c is a discretionary choice because, in fact, there are a vast number of different ways that the impressions can be distributed between products b and c in a manner that is consistent. For example, all 50,000 impressions could have been allocated to only product c.

For this reason, the correlation method of allocation is a method or subset of the general methodology of discretionary accounting. An exception would be if the definition of a product were explicitly intended to represent an average distribution of all related products. For example, product a could be defined as being an even distribution of all inventory under a, as opposed to a more typical definition of anywhere within the product space of product a. Additionally, the correlation method can be used to accurately mirror product cannibalization if the selection module 120 has a sub-optimal implementation that merely randomly and proportionally selects a product to fulfill ad calls from publisher systems 150 from the list of matching products that could possibly be used to fulfill the requests.

Conversely, the cannibalization of product a resulting from the sale of 25,000 impressions of product b is an example of logically necessary or forced cannibalization, due to the fact that it is logically impossible to take inventory from a set without taking away an equal amount of inventory from a set that fully contains it. This is self-evident by examining FIG. 21.

Figure 24:
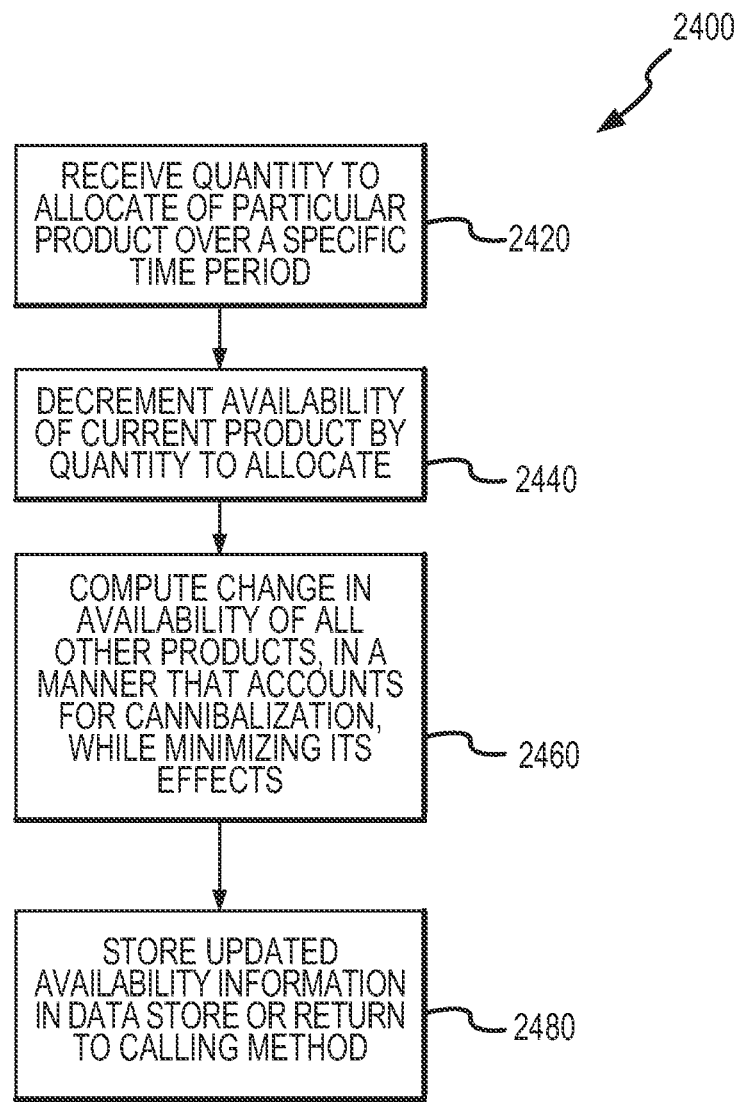
FIG. 24 illustrates a flow diagram for a general method of performing logically necessary allocation to calculate availability of inventory.

It should be noted that while both discretionary allocation methods and logically necessary allocation methods seek to account for the effects of cannibalization, discretionary methods, such as the correlation method, tend to do so by producing results that compute the average cannibalization on products, whereas logically necessary allocation methods seek to account for cannibalization in such a way as to derive the absolute minimum cannibalization. FIG. 24 illustrates generally a logically necessary allocation method 2400 according to an embodiment of the invention that may be implemented, at least in part, by the inventory management module 100 (and/or by selection module 120 as it implements allocation rules defined by module 100 or the like). At 2420, the module 100 receives a quantity to allocate of a particular product over a specific time period. At 2440, the availability of the current product is decremented by the quantity to be allocated. At 2460, the module 100 computes the change in availability of all other products in a manner that accounts for cannibalization while minimizing its effects. At 2480, the method 2400 continues with storing the updated availability information in data store 70 such as part of representation 76 and/or returning to the calling method.

Another method for determining cannibalization and availability for hierarchically defined products, referred to here as the hierarchical method, is now described. This method is a particular implementation of the forced cannibalization or logically necessary methodology. Like the previously described correlation method, it is a fast and convenient method for determining the availability on hierarchical products. However, since it uses only a forced cannibalization method, it yields significantly higher remaining product availabilities.

Figure 25:
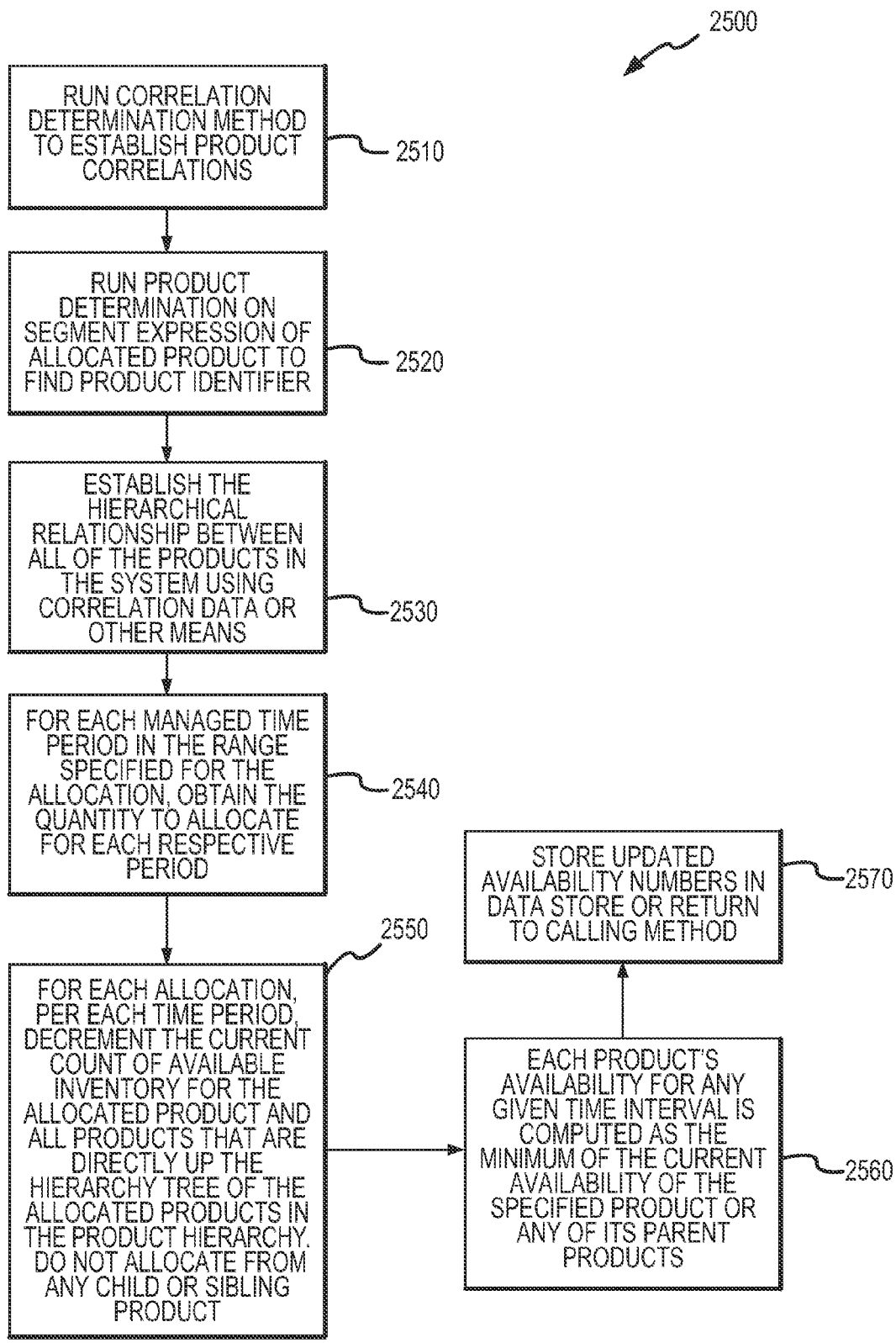
FIG. 25 illustrates a flow diagram for a hierarchical method of performing product availability determinations using forced cannibalization or logically necessary allocation techniques of the present invention.

FIG. 25 illustrates one useful hierarchical method 2500 for determining product availability (again as may be used or implemented by hardware/software run by inventory management module 100 or accessible by such module 100). At 2510, a correlation determination method is run to establish product correlations. At 2520, product determination is run on the segment expression of the allocated product to find its product identifier. At 2530, the module 100 or other modules act to establish the hierarchical relationship between all of the products in the system using correlation data or other techniques. At 2540, for each managed time period in the range specified for the allocation, the module 100 obtains the quantity to allocate for each respective period. At 2550, for each allocation for each time period, the module 100 decrements the current count of available inventory for the allocated product and all products that are directly up the hierarchy tree of the allocated products in the product hierarchy (but, typically, without allocating from any child or sibling product). At 2560, it is indicated that during the method 2500 each product's availability for any given time interval is computed as the minimum of the current availability of the specified product or any of its parent products. At 2570, the module 100 stores updated availability numbers in a data store such as store 70 and/or returns to the calling method.

The hierarchical method can be described further as working as follows to account for the cannibalization of other products following the allocation of inventory from a given product. First, using the correlation data (an example of which is illustrated in Table 19), the list of products that are the parents of a particular product are determined by selecting those products that have a correlation quantifier of 1.0 in relation to the product. For example, the parent products of product d are the products identified in the first column in Table 19 for all rows in which both the identifier in the second column is the one for product d, and the value of the last column, i.e., the correlation quantifier, is 1.0. Once a list of products has been determined using the product daily summary impression counts as illustrated in Table 12, for each time interval in the defined period, the value of the reserved impressions column for the product of interest is incremented and the cannibalized impressions columns of all of the products found to be the parents of that product are incremented by the exact amount that was allocated for the product for the time interval. This results in a corresponding reduction in the inventory availability values for the product of interest and all of its parent products. No adjustment is made to the availability of any other products in the hierarchy including children or sibling products. This is due to the fact that the only forced cannibalization arising from the allocation of a given product is the cannibalization of the parent products. While there is, in fact, cannibalization to be accounted for on the children of the product, exactly how that cannibalization will be distributed is not accounted for at this point in the allocation process.

Following the above allocation, the actual availability impression counts for each product are computed as follows: let the initial quantity of inventory available during a finite amount of time t (and referred to herein as the forecast) of product p be represented as fcast(p); let the quantity sold of product p for a finite amount of time t be represented as sold(p); let the available quantity remaining over a finite amount of time t be represented as avail(p) and cann(p) (referred to herein as the cannibalization of p during time t); and let remain(p) represent the total quantity of p remaining from the forecast of p after the effects of being sold or cannibalized. Further, let p be the product whose availability is to be determined, let p1, p2, . . . , pn be the products that are the parents of p, and let min( ) be a function with a variable number of arguments that returns the argument with the lowest numerical value. Then, the availability of product p is determined with the following formula where the expression remain(p) is defined as $$\text{remain}(p) = \text{fcast}(p) - (\text{sold}(p) + \text{cann}(p))$$

Formula to Determine Availability for Hierarchial Products avail(p)=min(remain(p),remain(p1), remain(p2), . . . remain(pn))  Equation 7:

There are a number of financial benefits of implementing logically necessary allocation during inventory management. For example, the hierarchical method or implementation of logically necessary allocation produces increased inventory yields over the correlation method and, therefore, greater revenue yield. The previous example is revisited below this time using the hierarchical method for comparison on the set of hierarchical products shown in FIG. 21 where 50,000 impressions of product a have been sold and 25,000 impressions of product b have been sold, and the availability of products a, b, c, d and e are to be calculated for a proposed sales contract for advertising inventory or advertising product. In this example, the calculation would be as follows:

Forced consumption from allocation of product a
cann(b, a)=0
cann (c, a)=0
cann (d, a)=0
cann (e, a)=0
Forced consumption from allocation of product b
cann (a, b)=25,000
cann (c, b)=0
cann (d, b)=0
cann (e, b)=0
Remaining Impressions
remain(a)=fcast(a)−(sold(a)+cann(a))=100,000−(50,000+25,000)=25,000
remain(b)=fcast(b)−(sold(b)+cann(b))=50,000−(25,000+0)=25,000
remain(c)=fcast(c)−(sold(c)+cann(c))=50,000−(00,000+0)=50,000
remain(d)=fcast(d)−(sold(d)+cann(d))=25,000−(00,000+0)=25,000
remain(e)=fcast(e)−(sold(e)+cann(e))=25,000−(00,000+0)=25,000

Available Impressions Using Hierarchical Method
avail(a)=min(25,000)=25,000
avail(b)=min(25,000, 25,000)=25,000
avail(c)=min(25,000, 25,000)=25,000
avail(d)=min(25,000, 25,000, 25,000)=25,000
avail(e)=min(25,000, 50,000, 25,000)=25,000

These results can be compared to the results of allocation of inventory using the previously described allocation method (i.e., the correlation method).
Product Availability—Correlation Method
avail(a)=fcast(a)−sold(a)−cann(a)=100,000−50,000−25,000=25,000
avail(b)=fcast(b)−sold(b)−cann(b)=50,000−25,000−25,000=0
avail(c)=fcast(c)−sold(c)−cann(c)=50,000−0−25,000=25,000
avail(d)=fcast(d)−sold(d)−cann(d)=25,000−0−25,000=0
avail(e)=fcast(e)−sold(e)−cann(e)=25,000−0−12,500=12,500

In this simple example, two of the five products have an additional 25,000 impressions available for sale, while a third product has an additional 12,500. It should be considered that typically products that are lower in a hierarchy (i.e., have more attributes defining them or are "more multi-dimensional" that causes them often to be better suited for targeted advertising) command a higher CPM rate or will generate more revenue based on a CPC or CPA basis due to the fact that they are more targeted and scarcer. To compare the likely difference in revenue on a subsequent purchase, assume that products b and c have a 50% premium and products d and e have a 100% premium compared to product a. Further, it can be decided to use a base CPM price of $100 for product a for illustration purposes and assume that the number of potential product buys for any of the individual products is equal but not guaranteed. Then, due to the fact that the correlated method will show no availability for 2 of 5 products in this example, as opposed to the hierarchical method which makes all five products available including many impressions from the higher priced set of products, the average increase in potential revenue for a subsequent product buy would be an average return of $1,750 for the first method versus $4,000 for the second as illustrated in Table 20. This corresponds to an increase in revenue in excess of 200%. Assuming that there is always a buyer for the full quantity of all products, the maximum revenue that can be generated from the correlation quantifier method would be to sell all the 12,500 impressions of product e for $2,500 plus the remaining 12,500 impressions of product c for $1,875 for a total of $4,375. Using the same assumption with the results of the hierarchical method would result in the sale of 25,000 impressions of either product d or e for total of $5,000, which translates into a 14% revenue increase.

TABLE 20

Revenue Comparison Between Two Methods

|  | Product A | Product B | Product C | Product D | Product E | Average |
|---|---|---|---|---|---|---|
| Correlated Quantifiers | $2,500 | $0 | $3,750 | $0 | $2,500 | $1,700 |
| Hierarchical Method | $2,500 | $3,750 | $3,750 | $5,000 | $5,000 | $4,000 |

The inventory allocation methods of the present invention are also useful for addressing a common advertising inventory environment in which the sets or segments are not fully hierarchical but are made up of partially overlapping sets. Strict product hierarchies represent only a comparatively simple subset of general domain of overlapping product sets. In a hierarchy, the cannibalization of a given product segment is either imposed by products which are strict subsets or supersets of the product creating a simple set of relations between products. But, when the product segment definitions are less constrained and potentially involve any arbitrary number of variables in combination, the relations between the product sets becomes significantly more complex. However, it is this domain that is the one that is most commonly encountered in contemporary advertising inventory environments.

Figure 26:
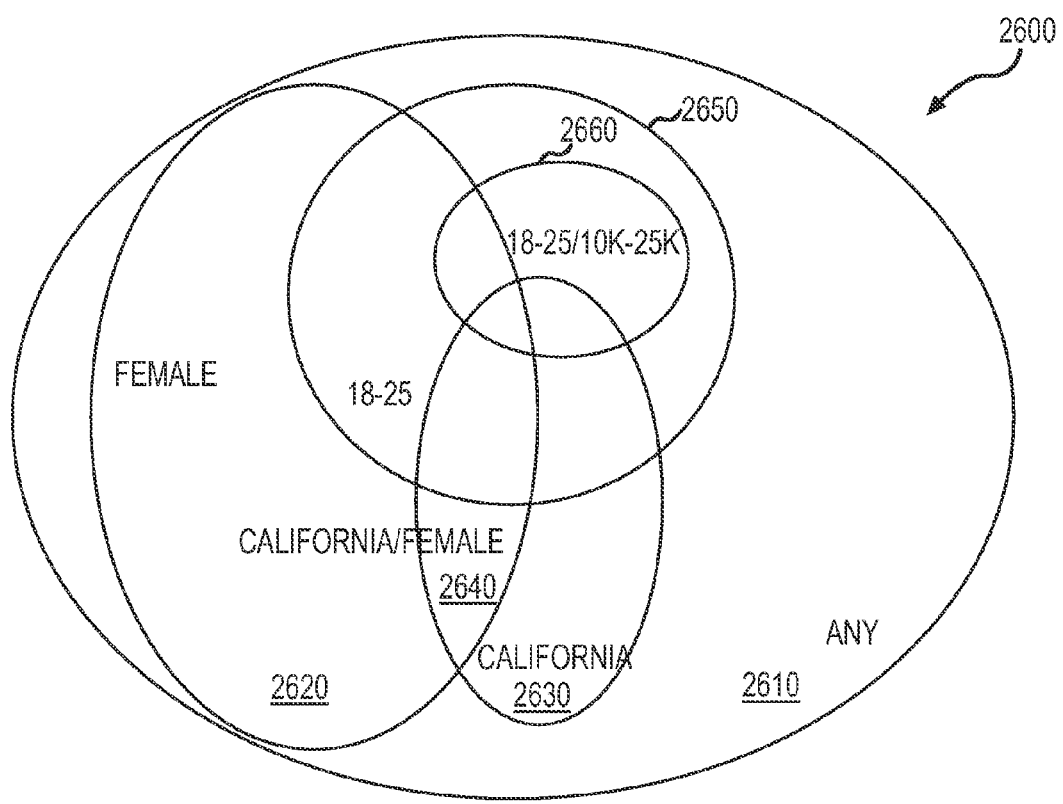
FIG. 26 illustrates a Venn diagram-type representation of non-hierarchical, overlapping sets or segments of inventory.

To illustrate a very simple example, consider the seven products enumerated in Table 1 and their logical set relations as illustrated in FIG. 26. In this set of products there are both hierarchical relationships as well as partially overlapping ones. Specifically, the representation of inventory 2600 includes a plurality of product segments 2610, 2620, 2630, 2650, and 2660 that are each segments of inventory that are defined by a set of attributes or criteria. The inventory 2600 further includes overlapping sets or segments such as set/segment 2640 that includes inventory or advertising products that fit in more than one segment. As the number of attributes and the number of combinations is increased, the relationships between the products become even more complex. These overlapping sets can be managed effectively using the overlapping set methods of inventory management.

Figure 27:
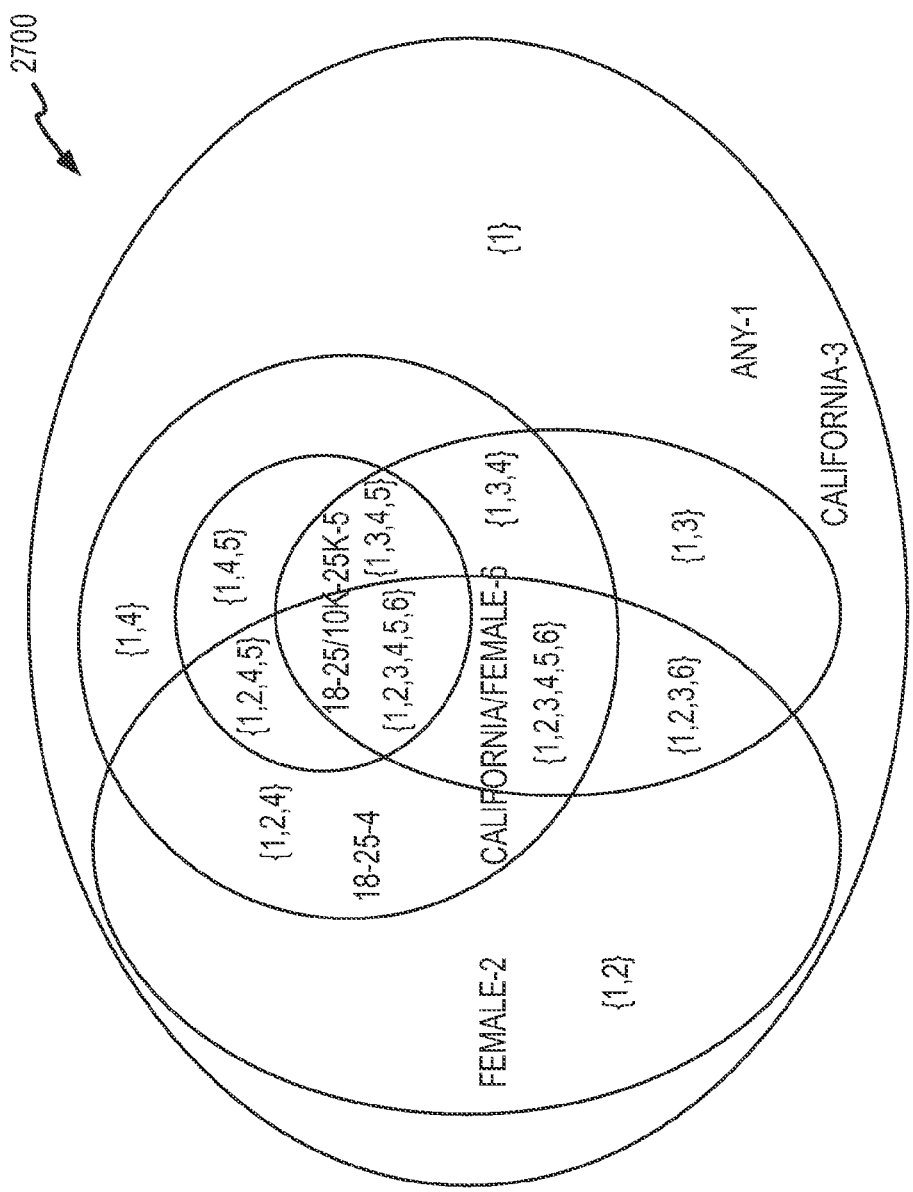
FIG. 27 illustrates a Venn diagram-type representation of the inventory shown in FIG. 26 with the representation modified to provide an encoded representation of each unique region of the inventory (e.g., including identifiers for overlapping or intersecting portions between two or more segments)

FIG. 27 provides an encoded representation 2700 showing the inventory of products as illustrated earlier in FIG. 26. In representation 2700, the inventory is represented as individual regions of inventory space with each region uniquely identified by their respective product vectors and represented as a set of corresponding identifiers. As has been noted earlier, in an exemplary implementation of the present invention, the notion of a given product is represented and managed as an arbitrary set of one or more of the sub-regions of inventory as defined by a unique product vector identifier as shown here for illustration purposes, each of which are associated with a corresponding count of inventory over a given time interval. Thus, when referring to an operation on a given product, the operation often operates on a set of these regions and, thereby, impacts the forecast or availability of a given product as an aggregate function on each of these regions. It will be apparent to those skilled in the art that while the present invention defines the inventory being represented by the set of defined product segments matching each region, and herein called the product vector, the set of products composing that vector for any given time period could also be limited to just those on which an allocation is required for the given time period.

Regardless of how a product vector is represented, certain relationships between their respective inventory regions can be established by examining the product vectors. One aspect that can be observed is the total number of products that the given region could potentially be allocated against, which is referred to herein as the cardinality of the product vector. For example, referring again to FIG. 27, the region identified with the vector {1, 3} has a cardinality of 2, while the region identified with {1,2,3,6} has a cardinality of 4. One important aspect of cardinality is that, from a perspective of global product preservation (and, therefore, maximizing the global count of available inventory across products), it is generally better to allocate to a region of lower cardinality rather than a higher one because less product segments are consumed in total by doing so. For example, if allocating inventory for product 3 in an inventory topology that only contained the regions {1, 3} and {1,2,3,6} it would be preferable to allocate it to the inventory region of {1,3} since such an allocation would preserve the inventory of products 2 and 6. However, allocating to the region with the lowest cardinality does not usually by itself guarantee maintaining the maximum availability for all individual products. For example if allocating for product 3 in a topology of the two regions {1,3,5} and {1,3,4,6}, an allocation to the first region, which has a lower cardinality, would result in a lower availability for product 5 than allocating to the second region.

A second aspect or inventory relationship that can be observed is that of the subset and superset relations that can be established by comparing the set of product identifiers on each vector. Looking at the first two vectors or regions of {1, 3} and {1,2,3,6}, it is obvious that the first vector represents a subset of the products represented by the second vector, whereas this was not the case with the second vector pair examples of regions {1,3,5} and {1,3,4,6}. This leads to several important observations. First, as shown by the first example, if given the choice of allocating inventory for a given product against a region of inventory that is a product subset of another, an allocation against the subset region will always be optimal. Second, we can use the subset and superset relation to build a graph structure on the regions in order to arrange the daily aggregated forecast vector information in a way that serves the purpose of optimal inventory allocation.

Figure 28:
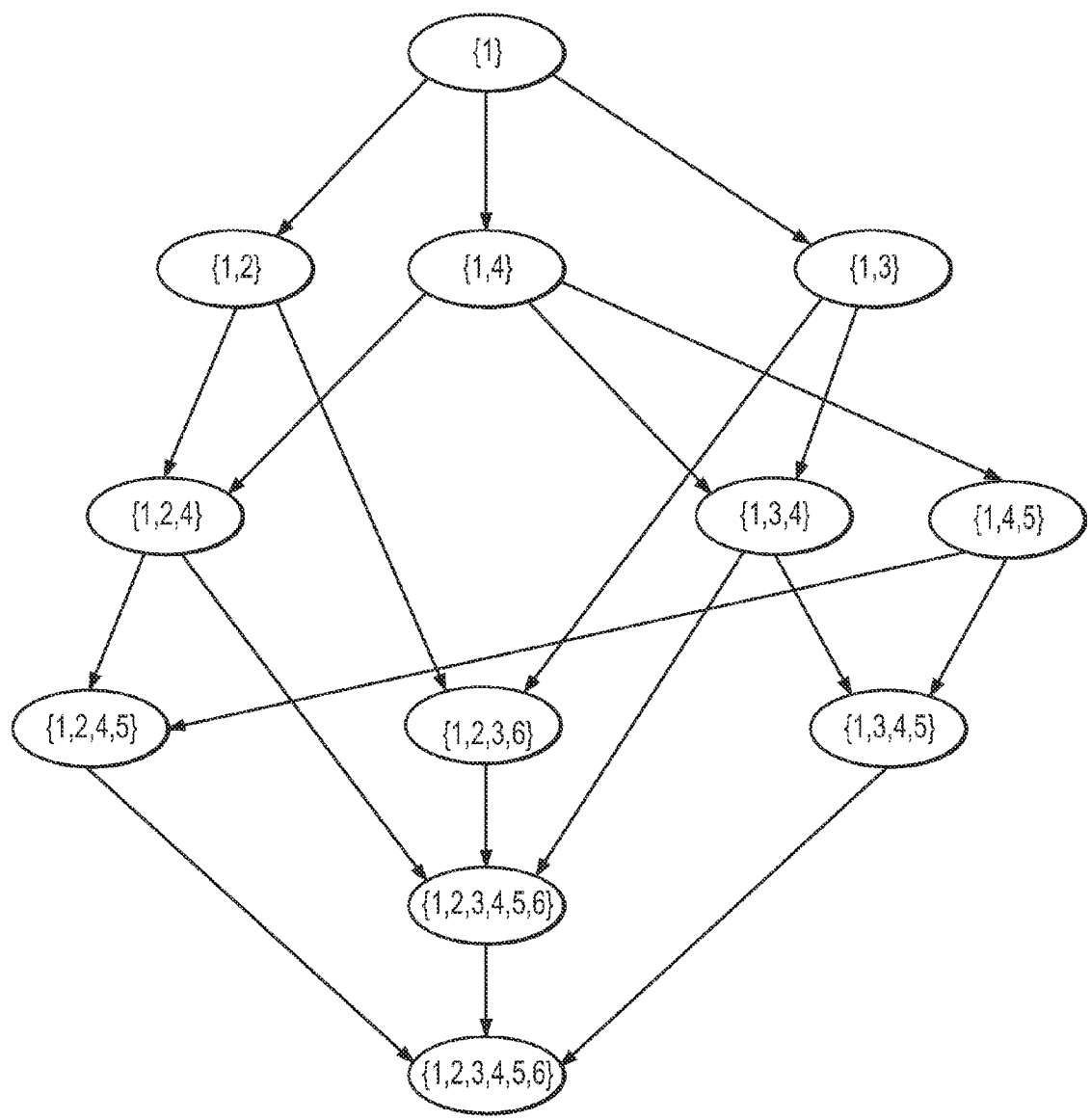
FIG. 28 illustrates a directed acyclic graph representation of the inventory topology shown in FIG. 27.

FIG. 28 shows the same inventory topology 2700 provided in FIG. 27 but this time represented as a directed acyclic graph, also referred to as a DAG, with each inventory region represented as a node in the graph with its respective product vector identifier and, as illustrated here, an implied count of inventory of 1 at each node. The graph is formed by arranging each node, e.g., such as with lowest cardinality nodes appearing physically higher up in the graph. Each node has a directed edge, which connects each node to its corresponding set of product subset nodes, thereby limiting the edges to those that connect to the node that is the direct subset of the first node with no intervening subset nodes in between. The edges of the illustrated graph can be traversed in either direction depending on purpose. In a preferred embodiment of the present invention, the graph is traversed top down for allocation purposes starting with the set of nodes with the lowest cardinality.

Figure 29:
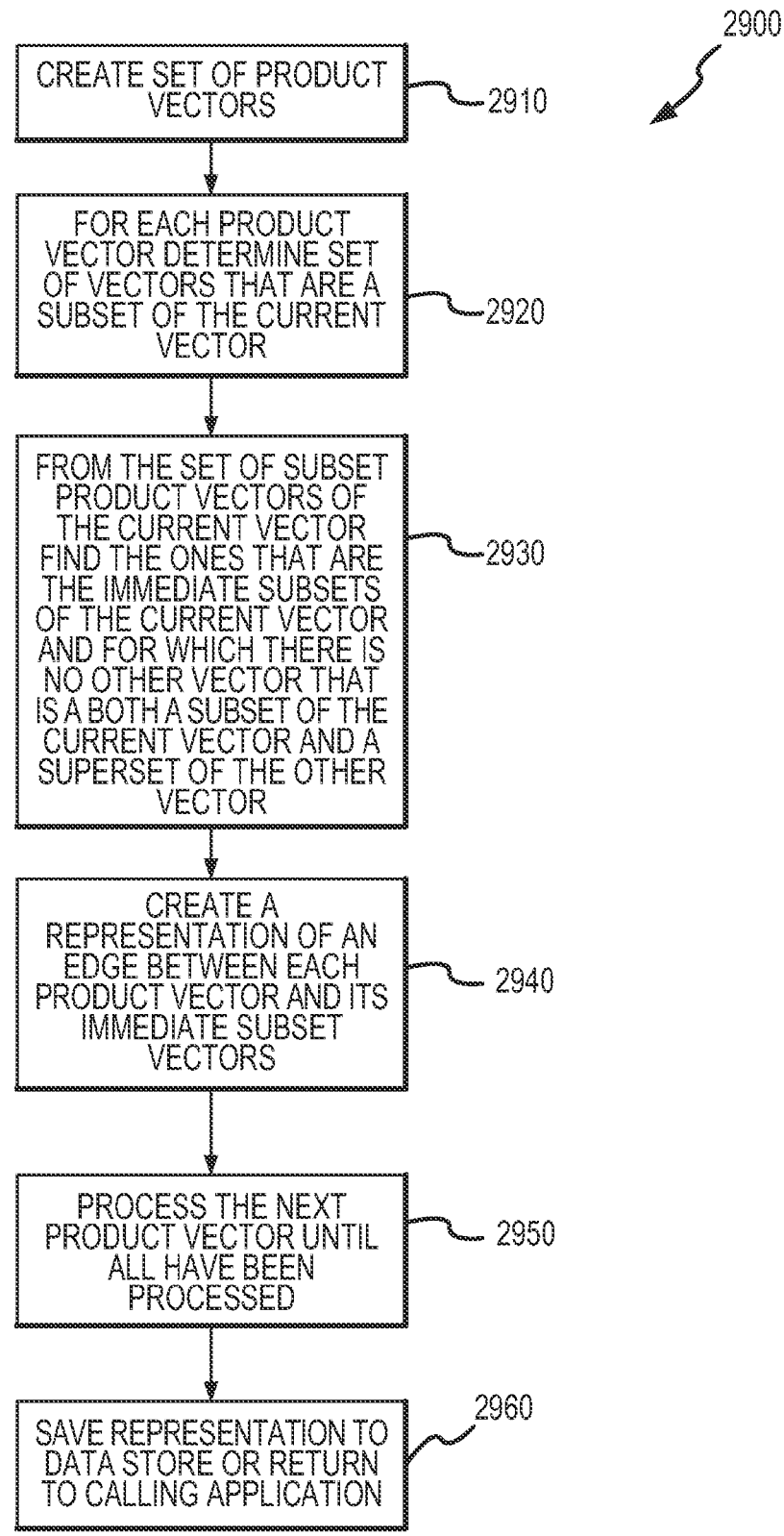
FIG. 29 illustrates a flow chart of one method of generating a directed acyclic graph representation of an inventory topology such as that shown in FIG. 28.

FIG. 29 illustrates a method 2900 of forming such a representation that starts at 2910 (such as by running software or the like on module 100) by creating a set of product vectors. Then, at 2920, for each product vector, the set of vectors are determined that are a subset of the current vector. Then, at 2930, the method 2900 includes from the set of subset product vectors of the current vector finding the ones that are the immediate subsets of the current vector and for which there is no other vector that is both a subset of the current vector and a superset of the other vector. At 2940, a representation is created of an edge between each product vector and its immediate subset vectors. At 2950, the next product vector is processed until all product vectors in the set have been processed, and at 2960 the representation such as the graph of FIG. 28 is saved in the data store 70 and/or the method 2900 returns control to the calling application or method.

Figure 30:
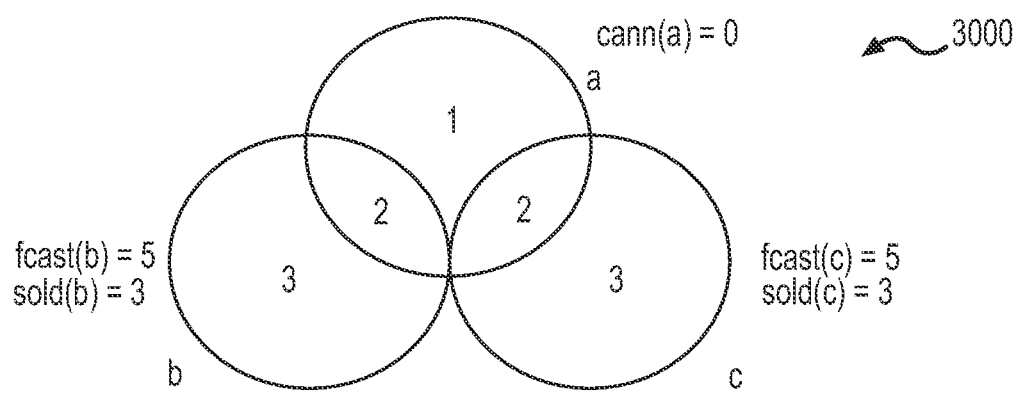
FIG. 30 illustrates an inventory representation or state showing logically necessary consumption of overlapping product segments.

The general set or overlapping sets method of computing product availability is similar to the hierarchical method of computing product availability in that it is also a method that adheres to the general method of logically necessary allocation for accounting for the consumption of related product segments. Its principles are illustrated here by way of the following examples and axioms. Consider a very simple product set of only three overlapping products as is illustrated in FIG. 30 with inventory representation 3000. Each of these products is intentionally shown to have a very small forecast in order to make a few observations about the dynamic aspects of overlapping inventory and the principles of this method. For the sake of clarity, these points are made with respect to the availability of product a, but any of the other products could be used to make the same observations. As illustrated in FIG. 30, product b and product c each have forecasts of 5 impressions of which 3 impressions have been sold. For both product b and product c, it is possible to satisfy the allocation of the 3 impressions without allocating any of the inventory required by product a. This is possible considering b and c both individually as well as concurrently. Therefore, the cannibalization in the overlapping sets methods of inventory allocation of the inventory of product a is 0.

Figure 31:
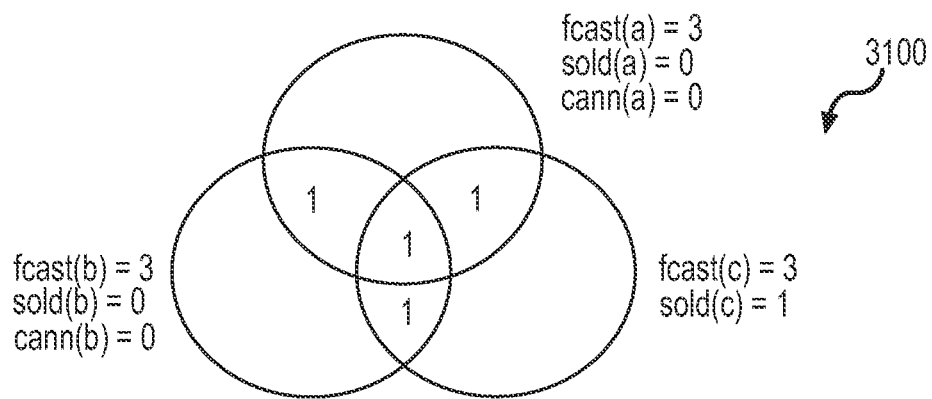
FIG. 31 illustrates an inventory representation or state showing non-discretionary allocation assignment of inventory from overlapping product segments.

This implementation of the logically necessary consumption inventory management method may be described by the following axiom. The availability of a product is only decremented when it is logically impossible to satisfy the allocated inventory for related products without doing so, and even then only by the amount logically necessary. As illustrated in the inventory representation 3100 shown in FIG. 31, all the inventory of each of the products overlaps with at least one other product. Product c has 1 impression sold. It is impossible for that impression to be allocated without cannibalizing either product a or product b by 1 impression. However, choosing either one for allocation would be discretionary and, therefore, would violate the method of logically necessary allocation, since logically neither product a nor product b needs be consumed. Therefore, the cannibalization of product a and product b is 0.

Another axiom for understanding implementations of logically necessary allocation may be stated as follows. Even if it is logically necessary that the product availability of one or more larger sets of products be decremented as a result of the allocation of a given product, then as long as it is not logically necessary to take from any one product or combination of products, the availability of those products is unchanged. This axiom or functional process of an inventory management system of the invention may be understood better with reference to the next example illustrated in FIG. 32 with the inventory representation 3200. As shown, product b has a forecast of 5 impressions with 4 impressions allocated, which results in a consumption of 1 impression from a. The factor which logically necessitates the cannibalization of b onto the inventory of product a is the relationship between the amount of inventory allocated to b in relation to the amount of inventory for b which is outside of the set of inventory shared with a. The region of inventory that does not include inventory belonging to a is also known in set theory as the compliment of a, written here as a'. The cannibalization of product a is the amount of inventory allocated for product b subtracted by the amount of inventory that includes b but not a that is in excess of 0. The situation regarding c is similar with c consuming 2 impressions from a.

Forced allocation methods for inventory allocation can further be defined by an axiom regarding individually intersecting products. Specifically, for a given product (consumed product) that overlaps with one or more other products (consuming products), each of which overlap with no other product other than the consumed product, the cannibalization can be determined by the sum of inventory allocated for each consuming product, taken individually, in excess of that product's inventory outside the set of the consumed product. Using the symbol "|" to represent the set operator "union", the symbol "&" represent the set operator "intersection" and also letting the "'" represent the "compliment" of a set and max( ) be a function that returns the maximum of its arguments.

Further, letting consumption of product p1 on product a as relates to the previous axiom be defined as:

$$cons(p1)=\max(sold(p1)-fcast(p1 \& a'),0)$$

and the formula for total consumption on a from products p1, p2, ... pn as:

Cannibalization Formula for Axiom on Individually Intersecting Products $cann(a)=cons(p1)+cons(p2)+...+cons(pn)$   Equation 8—

This formula, however, only applies to the previously described data sets where the consuming products do not overlap with any other product segment other than the one of interest, which is not usually the case in most inventory domains.

Figure 33:
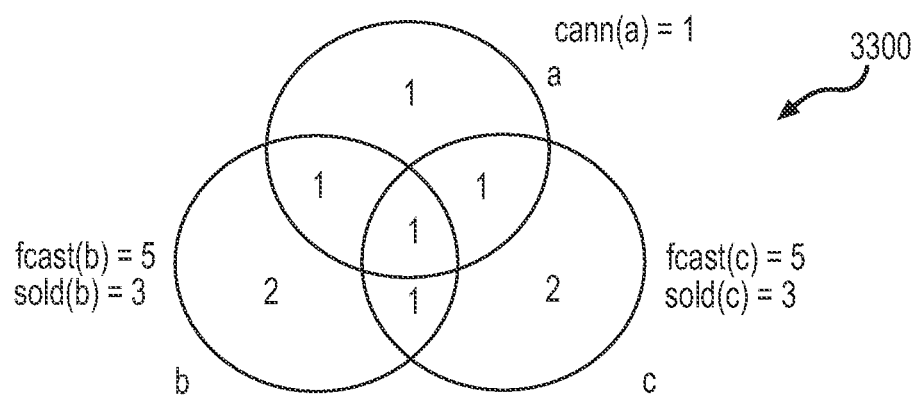
FIG. 33 illustrates an inventory representation or state showing allocation issues for multiple intersecting products from overlapping product segments.

In the inventory representation 3300 of FIG. 33, three products are shown that each have the identical forecast and allocated inventory numbers as the products illustrated in FIG. 30. However, in the example in FIG. 30, products b and c did not have any overlapping inventory, or in the parlance of set theory, b and c did not intersect, whereas they do in the example of FIG. 33. Taken together, while collectively b and c have a total of 6 impressions allocated, they have a total of only 5 impressions between them which are outside of the segment of inventory of a. Therefore, this allocation state logically necessitates that an impression be allocated from a. For both product b and product c, while it is possible to satisfy the allocation of each of their 3 impressions individually without impacting any of the inventory required by product a, it is not possible to do so when considering products b and c concurrently since the total amount of inventory allocated for these two products is in excess of the inventory common to both that exist outside of the inventory included in a.

With this in mind, it may be useful to consider the following axiom relating to multiple intersecting products. For a given product (consumed product) whose inventory intersects with one or more products (consuming products) some or all of which have inventory which intersects with other products, it is not sufficient to consider the intersection of the consumed product with the consuming products individually because the intersection of each of the consuming products with other products can impact the consumption of the consuming products and, therefore, their consumption of the consumed product and its subsequent availability. The cannibalization formula for the example shown in FIG. 33 may then be:

Cannibalization Formula for Allocation Example of FIG. 33 $cann(a)=\max((sold(b)+sold(c))-fcast((b|c) \& a'),0)=6-5=1$   Equation 9— where the expression $fcast((b|c) \& a')$ is the count of inventory which lies in the set of either b or c and not within the set of a.

However, although Equation 9 frequently returns the correct result, it does not work in all cases. This is illustrated in the inventory representation or allocation state 3400 shown in FIG. 34, which has the identical product segments as the previous example and results in the same consumption of a. However, the total amount of inventory allocated to products b and c together is 1 less than before and, as a result, the previous formula would not give the correct result or the more preferred result. This is due to the fact that in this example the limiting condition results from the allocation of product c not the combination of b and c together as was the previous case. In a real world example, with large numbers of intersecting products, this constraint can come from one of many possible combinations of products depending on the amount of allocation on each.

The above example leads to the following axiom for use in defining how to perform logically forced inventory allocation. When considering the effects of cannibalization on a given product (consumed product) whose inventory intersects with one or more products (consuming products) some or all of which have inventory which intersects with other products, there can be a single product, or combination of products, or multiple combinations thereof, which together form the constraining sets which effect the availability of the consumed product. This principle is significant from the perspective of logically necessary allocation.

Additionally, it is important to consider the effects of allocations that are in excess of the expected inventory. This can frequently occur due to errors in forecasting the future inventory at levels that prove to be too high, which can result in sales commitments for the forecast inventory that cannot be fulfilled. In this common situation, if negative levels of inventory are to be represented, it is important that this is represented properly. In particular, the effect of cannibalization on any given product has an upper bound. Returning again to the example in FIG. 32, the number of impressions allocated to c was 5 resulting in 2 impressions of a consumed. If the quantity of inventory allocated to c was any value in excess of 5, the cannibalized inventory could still not be in excess of 2, i.e., the amount of inventory of a that intersects with c. However, if the direct allocation of c was in excess of the forecast of c then the availability of c could be reasonably represented as the resulting negative value. Similarly, in the example in FIG. 33, if the total amount of inventory allocated to b and c is equal to or greater than the number of impressions in common to both, the maximum amount of cannibalization is the 3 impressions common to both within the set of a.

Figure 35:
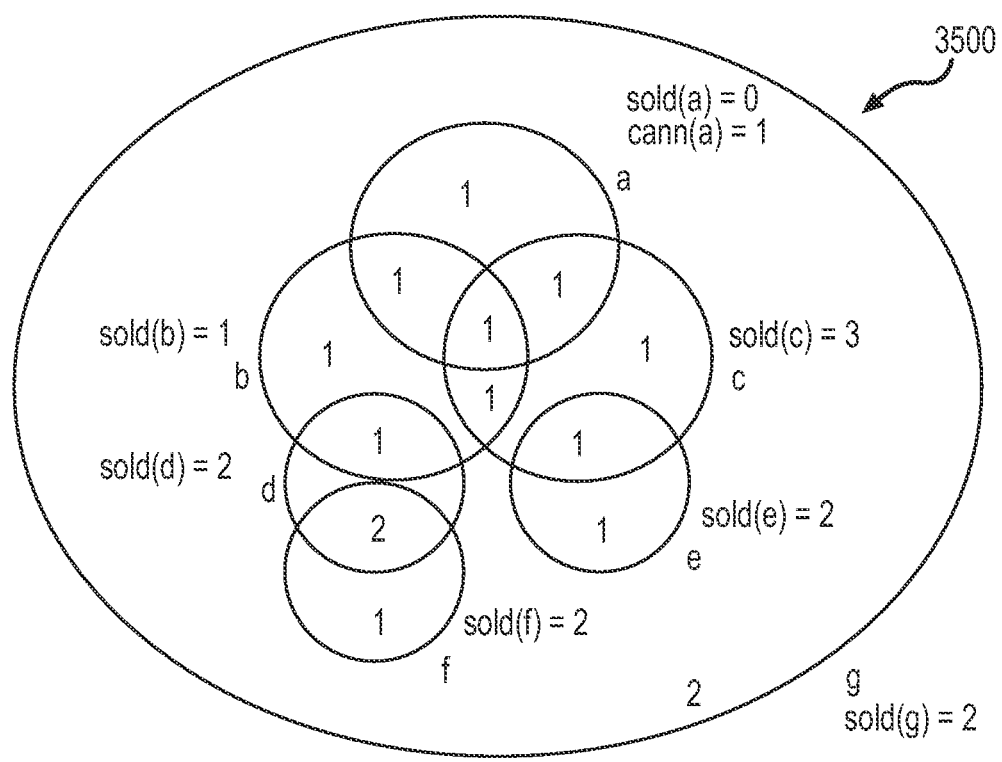
FIG. 35 illustrates an inventory representation or state showing scope of cannibalization in an overlapping product segments environment.

These two examples lead to the following axiom for better understanding application of a logically forced allocation method. The upper limit of cannibalization on a given product, by a single product or set of products, is bounded by the amount of inventory in common between them. This axiom may be understood with consideration of the example illustrated by inventory representation or state 3500 of FIG. 35. FIG. 35 shows how products that do not overlap can be a factor that should be considered in cannibalization of available inventory. Particularly, product c has 3 impressions allocated and has 3 impressions that do not intersect with a. In lieu of any other factors, it would not consume any of the inventory shared with a to fulfill a contract for 3 sold impression. However, product e, which does not have any inventory that overlaps with a and is therefore only indirectly correlated with a, does intersect with b which consumes 1 of its impressions, causing a cascading effect, which, in turn, consumes 1 impression of the inventory shared between b and a. This kind of effect can occur between products that are separated by many intermediate product sets. Another example from FIG. 35 shows the cascading effect off onto d and, in turn, onto b consuming 1 impression. However, its consumption on the inventory of product b does not impact the availability of either product a nor product c due to the fact that there are sufficient impressions remaining in the inventory of product b.

Hence, another axiom describing implementation of logically forced allocation may be the following. In addition to the products that intersect with a given consumed product, even products which have no inventory in common with the consumed product can potentially impact the availability of the consumed product due to the cascading effects on adjacent products, which in turn, intersect with the consumed product and impact its availability. In another example from FIG. 35, product g, which is the superset of all the other products, would consume inventory from a only at the point where it has consumed all available inventory in a', since that would be the threshold where it was logically necessary for it to do so. However, that threshold is directly related to the allocations of all of the illustrated products. In this example, due to the effects of all of the allocations of all the other products, if g had 1 or more impressions sold, it would then consume from a.

All of the above observations and axioms serve to illustrate that in order to determine the availability of a given product using the method of logically necessary allocation, it is necessary or at least preferable to examine the forecast and prior allocations of all the products, whether directly or indirectly related to the given product. Further, since the forecast and allocation levels for each product will typically be different across all of the days represented in the system, this computation needs to be done for all time periods of interest.

This leads to a description or axiom on availability as a global function. The consumption of a product (consumed product) and, therefore, its availability, is a function of its intersection with other products (consuming products) in conjunction with the intersection of each of the consuming products with each other, whether directly or indirectly related, and the existing allocations against those products, taken both individually and as a whole, across the plurality of days of interest. The previous examples have shown only very small product sets. In a large commercial environment, the number of products can easily number in the thousands. These large numbers of products or inventory segments of advertising impressions produces or can result in a complex mixture of cascading cannibalization effects which result from all of the dynamic relations illustrated above and which impact the available inventory between the product sets.

With the previous examples and axioms/descriptions of logically forced allocation in mind, it may be useful now to consider two more axioms or descriptive phrases. First, for any method that adheres to the general method of logically necessary allocation and that seeks to determine product availability, it is necessary or at least preferable for that method to examine all products that are directly or indirectly related, taking into account the forecast, the intersection, and the previously allocated amounts of each product's inventory. According to the principle of logically necessary allocation, any implementing method should ensure that the effects of cannibalization be limited to the logically minimum amount required to satisfy the allocations previously made to the other products. Second, the cannibalization of a given product (consumed product) is determined by finding the total amount of inventory allocated for all other products that are directly or indirectly related to the consumed product (consuming products) and determining the amount of that allocation which is in excess of the total amount of available inventory to concurrently satisfy the individual allocations for each of the products, as can be done outside of the set of a. This value is bounded by the consumption attributed to the total amount of available inventory than can be used to satisfy any remaining product allocation for each of the consuming products, inside of the set of a. Taking the forecast inventory value of the consumed product and subtracting from it the total amount of inventory directly allocated for it, in addition to the cannibalization value determined above, the value for availability is then determined.

Figure 32:
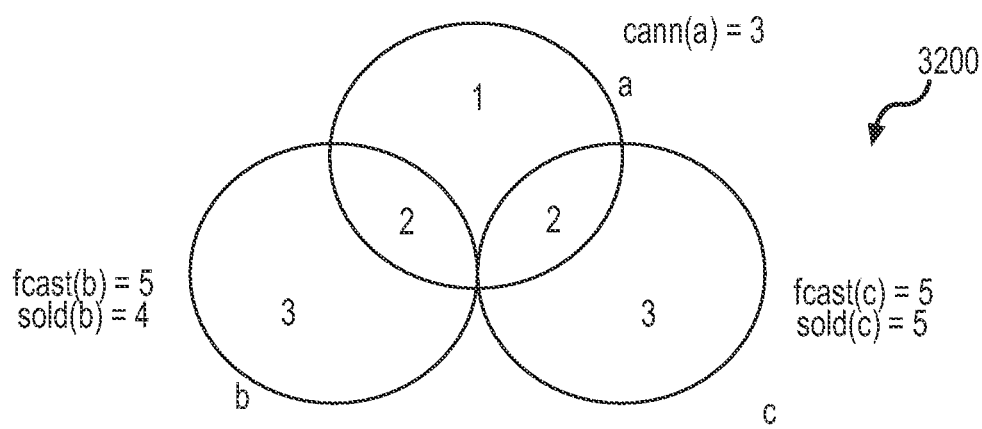
FIG. 32 illustrates an inventory representation or state showing individually intersecting products or inventory in overlapping product segments.

Revisiting the example in FIG. 32, one can see that for product b there are 3 impressions available in a' of the 4 impressions allocated, and the 1 impression still required is available in the set of a. Similarly, for product c, that results in 2 impressions consumed from product c and the one from product b. Looking at the example in FIG. 33 one can see that there are one 5 impressions in a' of the 6 required and that the additional one required is available in a. Looking at the example in FIG. 34 one can see that the allocation of one impression of product b can be totally satisfied in a' while only 3 of the 4 required for product c are available in a'.

Figure 34:
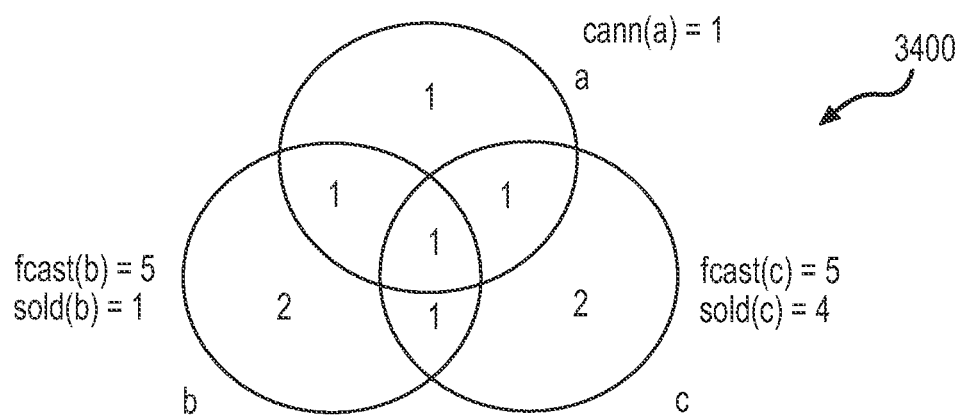
FIG. 34 illustrates an inventory representation or state showing allocation of product or inventory from overlapping product segments considering constraining sets.

Revisiting Equation 9, it was shown that this equation did not produce the correct or best result in the example given in FIG. 34.

$$cann(a)=\max((sold(b)+sold(c))-fcast((b|c)\ \&\ 0)=5-5=0$$

in which, the actual cannibalization was 1, resulting from the constraining relation on c. This is because the value of the expression, fcast((b|c) & a') is 5, reflecting the 2 impressions matching c, 2 impressions matching b, and the 1 impression that could match either. However, including the 2 impressions matching b gives an incorrect or less than optimal result in the context of cannibalization since only 1 impression was required to satisfy the allocation on b, the second matching impression is irrelevant in the context of the availability of a and therefore should not be counted.

A solution useful within the present inventive systems and methods is to modify the expression fcast((b|c) & a') such that the number of impressions that match any given product are limited to the number to the number of impressions allocated for that product. In this way, it correctly functions as intended to return the number of impressions for the various allocated products that can be allocated without cannibalization a. With this modification, this function would return the correct value of 4 for the example given in FIG. 34, with Equation 9 now returning the correct or more optimal result.

This leads to a general equation for cannibalization for products p1, p2, . . . pn, General Equation for Logically Necessary Allocation Equation 10—

Let fcast(p1|p2| . . . |pn) represent a function that, when applied to a plurality of multi-dimensional inventory, returns the total count of inventory which will satisfy the conditions of at least one of the products p1, p2, . . . pn. Further, let the count of matching inventory that matches the conditions of a given product pn and for which the count is credited to product pn be limited to the number of impressions allocated for that product. When this condition is met, the equation provides the correct result:

$$cann(a)=\max((sold(p1)+sold(p2)+\ldots+sold(pn))-fcast((p1|p2|\ldots|pn)\ \&\ a'),0)$$

It is useful to note that for every region defined by the intersection of the sets in any of the example Venn diagrams of the figures there is a 1-to-1 correspondence with every row in the daily aggregated forecast vectors for any given date being examined. In this regard, the count of inventory on the corresponding record represents the amount of inventory present for that region of the diagram. For example, if a product vector was encoded so that the bits for products, a, b, and c are the only ones set, then this record represents the count of the intersection of those products (a & b & c) for the given time interval.

Despite the inherent complexity of the inventory management and allocation problem, the daily aggregated forecast vector data structure provides a foundation for using the above equation for determining product availability using exemplary methods of the invention, which are described below. One embodiment of a method for determining product availability, which is referred to as the aggregated forecast vector method, is described below in the context of computing the availability for a single day. However, it should be understood that the process is repeated for each date in a plurality of dates for which availability is to be computed. In this description, the availability of product p is being determined, with an arbitrary consuming product represented as product pn. Using the product daily summary counts data which, in the exemplary implementation could be stored as illustrated in Table 12, the forecast and reserved (allocated) counts for the given date are obtained and stored in an in-memory data structure such as an array. In this stored data structure, forecast (pn) and sold(pn) is initialized with the forecast and allocated values for product pn, respectively. This is done for all products p1 through pn that are directly or indirectly correlated with p.

Next, the daily aggregated forecast vectors for a given time period are examined, which in the exemplary implementation might be stored as illustrated in Table 11. During this scanning, the process involves examining only those records for which the identifier for product p is not found in the product vector and then indicating that this unit of inventory belongs to the set p'. For each matching record, the count of inventory associated with that record is obtained and the product vector is examined to identify every product associated with this record. For each product found in the product vector of the matching record, the following formula is then used to compute a weight:

$$\text{weight}(pn) = \min(\text{sold}(pn), \text{forecast}(pn))/\text{forecast}(pn)$$

The weight for each of the products is then compared, and the product with the highest weight is selected. If more than one product is tied with another for the highest weight, one of those is selected at random. Then, both the values for sold(pn) and forecast(pn) for the selected product is decremented by 1, while only the value for forecast(pn) is decremented for the remaining products. The value of the count of inventory for the matching forecast record is correspondingly decremented as well. This process continues until the value for the count of inventory for the record reaches 0, at which point the process is repeated on the next record, starting again with the count of inventory of the next record, while maintaining the decremented values of sold(pn) and forecast (pn) for the consuming products. The method of decrementing the above values by 1 is for illustration purposes only. It is recognized that for reasons of efficiency, the above counts can be decremented by a value greater than 1 or non-integer value using various methods that will be apparent to anyone skilled in the art.

This process terminates if either the weight value of all products reaches 0, indicating that all consumption has been accounted for and the cannibalization of the product being examined is 0, or all of the aggregated forecast vector records have been visited. If the latter case, this indicates that there is cannibalization to be accounted for so the process is repeated once again. This time examination is of only those records for which the identifier for product p is found in the product vector, indicating that this unit of inventory belongs within the set p. The above process of generating and comparing weights and decrementing the values for sold(pn), forecast (pn) and the count of inventory is as previously described. One additional counter, cann(p) is created for the product being analyzed which is initialized to 0 and incremented by 1 each time the count of inventory is decremented by 1. As with the first pass, the process terminates when either all of the weight value of all products reaches 0, indicating that the cannibalization of the product being examined has been accounted for, or all of the aggregated forecast vector records have been visited. If any of the consuming products still has a remaining positive value for sold(p), this indicates that they are oversold, but their cannibalization with respect to product p will have been accounted for.

The value of cann(p) now represents the logically necessary cannibalization for product p. This number is then stored to represent the cannibalized inventory for the product. For performance reasons, subsequent availability lookups for the product are obtained by reading the appropriate row in this table for the product, with the value for product availability returned using the expression:

$$\text{avail}(p) = \text{fcast}(p) - (\text{sold}(p) + \text{cann}(p)).$$

This method is applied, in turn, for each date of interest and for each product of interest to determine its availability over time. Since this method implements the method of logically necessary allocation, its benefits over discretionary allocation schemes will be similar to what was described when comparing the correlation method to the hierarchical method. While this method produces greatly improved availability numbers, it is not guaranteed to do so with complete 100 percent utilization. However, the results of this method can be improved by imposing an order on the processing of the daily aggregated forecast vectors by ordering the processing using a top-down traversal of the DAG described earlier.

The DAG traversal starts from an initial set of nodes, performs the above evaluation and allocation, using the edges from the set of nodes on the current level to select the next set of higher cardinality nodes at the next level. For example, using the data as illustrated in FIG. 28, the traversal would start with the node with the vector {1} perform the necessary processing, followed by processing the nodes with vectors {1,2}, {1,4}, and {1,3}, followed by the nodes {1,2,4}, {1,3,4}, {1,4,5} and {1,2,3,6}, and so forth. Summary product inventory forecast information can be represented at each node showing the total inventory available for the specific products represented on that node and the summary count of inventory, organized by product, for all the inventory below the node on any path beneath the given node which can be used to make the allocation decision. These counts are specific to the set of paths beneath the node and so are only used in the context of decision making at a particular node. For example, assuming that all the nodes in FIG. 28 represent a single unit of inventory, the node with the vector {1,3} has 5 units of product 1 and 3 at below it, 2 units of product 5 below it, 3 units of products 2 and 6 below it and so forth.

In a preferred embodiment of the present invention that fully implements the principle of logically necessary allocation, availability is calculated using the principle of constraining sets as described earlier (herein, referred to as the constraining set method for determining availability). This method is believed to determine the maximum product availability, independent of any arbitrary assignment on any of the individual regions of inventory. It is based on the previously described notion that, as represented herein, a product can be treated as a collection of each of the distinct regions of inventory that are associated with it.

Figure 36:
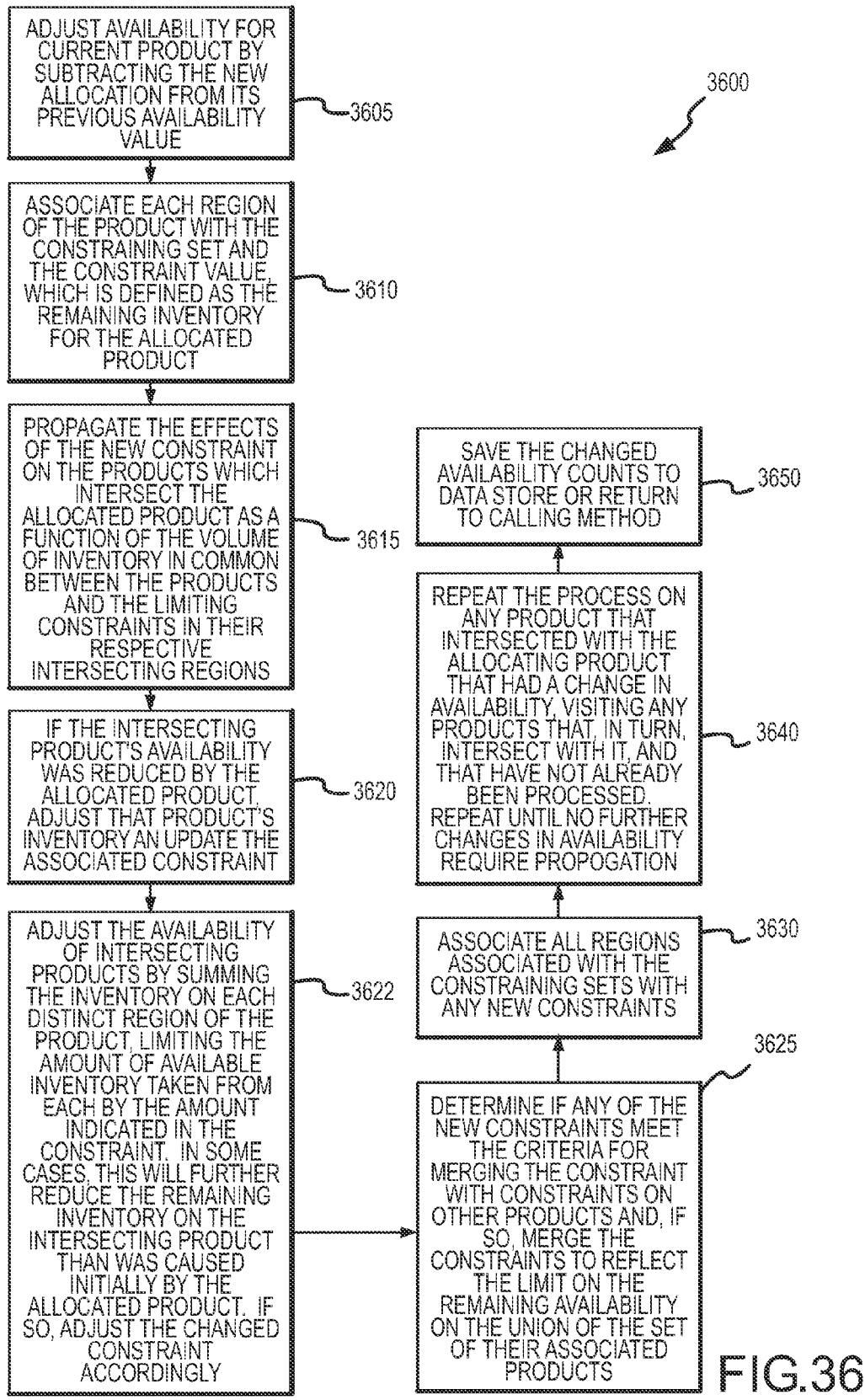
FIG. 36 illustrates a flow diagram of one embodiment of a constraining set method of determining product availability such as may be carried out by operation of the inventory management module shown in FIG. 1.

FIG. 36 illustrates one embodiment of a constraining set method 3600 of determining product availability, e.g., by operation of the inventory management module 100 or another component of the system 12 shown in FIG. 1. At 3605, the method 3600 includes adjusting the availability for the current product by subtracting the new allocation from its previous availability value. At 3610, each region of the product is associated with the constraining set and the constraint value, which is defined as the remaining inventory for the allocated product. At 3615, the effects of the new constraint are propagated to the products that intersect the allocated product as a function of the volume of inventory in common between the products and the limiting constraints in their respective intersecting regions. At 3620, if the intersecting products availability was reduced by the allocated product, the method 3600 includes adjusting that product's inventory and updating the associated constraint. At 3622, the availability of the intersecting products is adjusted by summing the inventory on each distinct region of the product including limiting the amount of available inventory taken from each by the amount indicated by the constraint. In some cases, this may further reduce the remaining inventory on the intersecting product than was caused initially by the allocated product, and in these cases, the changed constraint is adjusted accordingly. At 3625, the method 3600 continues with determining if any of the new constraints meet the criteria for merging the constraint with constraints on other products. If so, the constraints are merged to reflect the limit on the remaining availability on the union of the set of their associated products. At 3630, the method 3600 includes associating all regions associated with the constraining sets with any new constraints. At 3640, the process is repeated on any product that intersected with the allocating product that had a change in availability including visiting any products that, in turn, intersect with it and that have not already been processed. This is repeated until no further changes in availability require propagation. At 3650, the changed availability accounts are stored to the data store 70 and/or control is returned to the calling method.

When computing the amount of available inventory for a product and thereby across the set of the regions for the product, the amount of inventory that each region or collection of the regions can contribute is bounded by the lesser of either the original volume of inventory for said region or the bounds of the most constraining set of available inventory associated with it. Therefore, the amount of available inventory at the product level is computed by taking into account these two limiting factors, as they apply to the complete set of regions that make up the product.

Figure 37A:
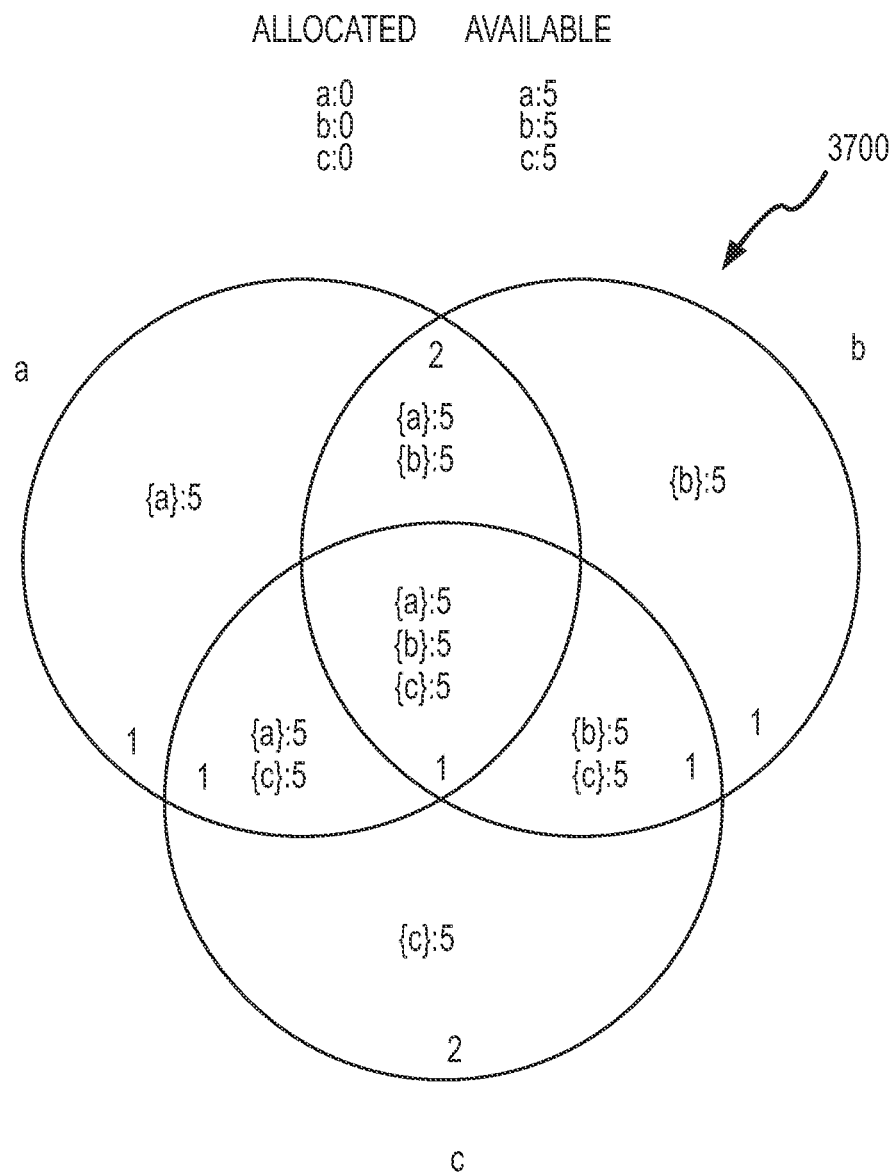
FIGS. 37A-37H illustrate a series of Venn diagram representations of an inventory topology or state during application of a constraining set method to determine product availability according to the invention.

This method is now described and illustrated by way of example using a series of Venn diagrams to represent the regions of inventory. FIG. 37A illustrates with graph or representation 3700 three symmetrically overlapping products with 5 of the 7 distinct regions representing 1 unit of inventory and the remaining 2 regions having 2 units of inventory each. This provides each product a, b, and c a forecast count of 5 units of inventory for the time period being evaluated. For visual clarity, the product vectors for each region have been omitted (but would be considered by the system to represent and process the inventory regions).

Also illustrated in each region is the set of constraints associated with each product represented on each region. At this point of the example shown in FIG. 37A, there have been no allocations made to any of the products such that the inventory 3700 is fully unconstrained and, therefore, each constraint reflects the full forecast of 5 for each associated product.

Figure 37B:
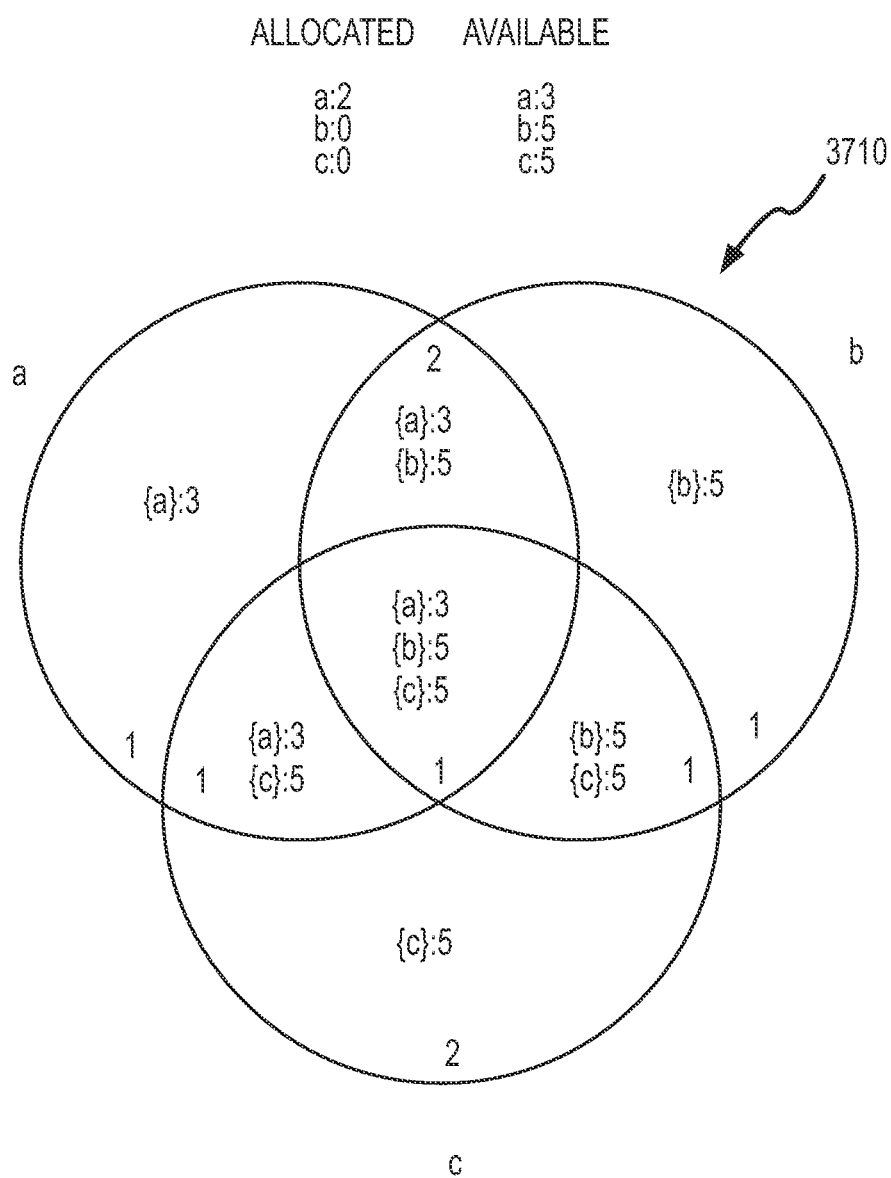

In the representation or graph 3710 of FIG. 37B, an allocation of 2 units of inventory has been made against product a. Following the allocation, each separate region that contains the product a is associated with the current maximum constraint, which at this level of allocation is now 3, i.e., the count of remaining impressions for product a. At this point, the availabilities of the other two products are calculated by taking into account the constraint information. Looking first at product b, it can be seen that due to the new constraint on a, both of the regions that together form the set (a & b) (where '&' represents the set intersection operator) have a new constraint on them of 3. However, since the volume of (a & b) is itself 3, the new constraint does not affect the remaining volume of inventory; and, therefore, the availability of b is unchanged. Similarly, the availability of c also remains unchanged.

Figure 37C:
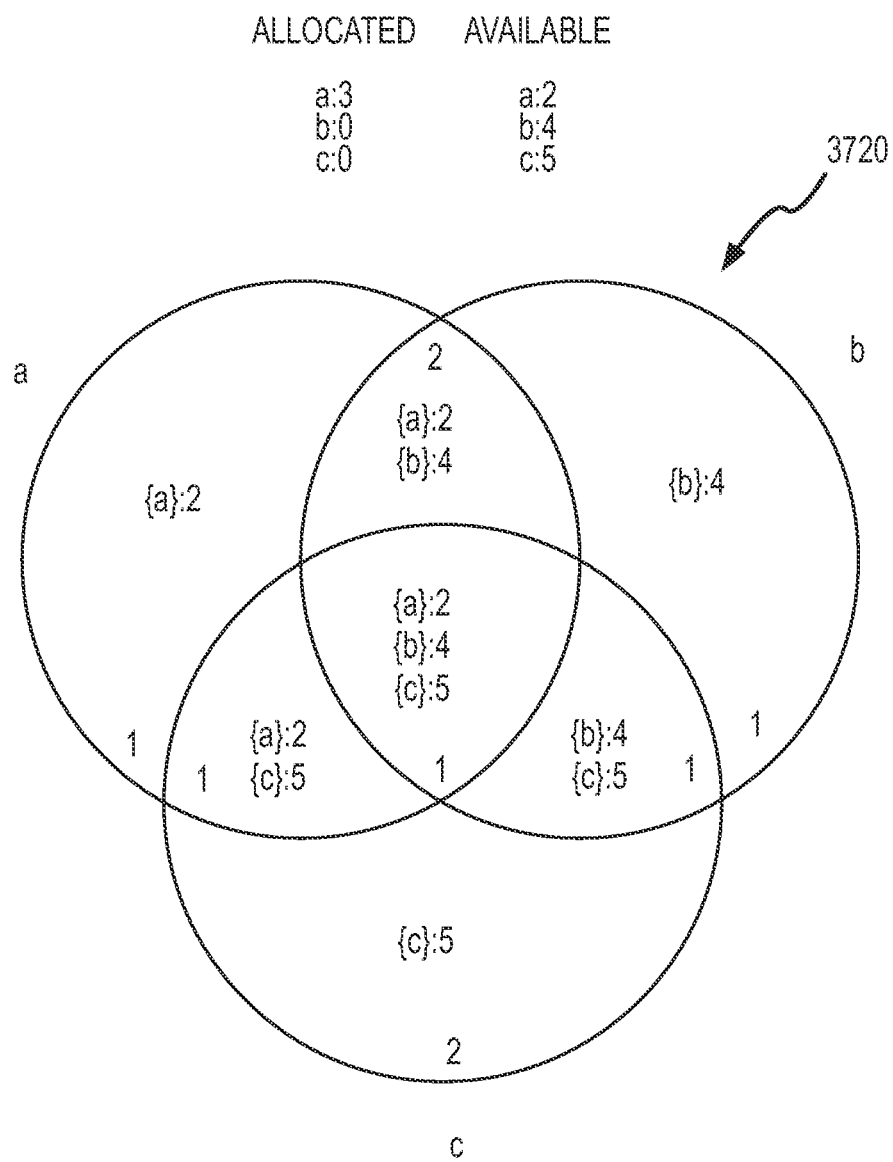

In the representation or graph 3720 of FIG. 37C, an additional allocation of 1 is made against product a leaving a constraint of 2. Now the region of (a & b), which has an initial volume of 3, is bounded by the constraint of 2 upon it. This causes a decrease in the availability of b of 1, leaving b with a new constraint of 4, which is associated with all the regions of b. In the case of product c, however, the region (a & c) has an initial volume of 2, which is not limited by the constraint of 2 on a, leaving the availability of c unchanged.

Figure 37D:
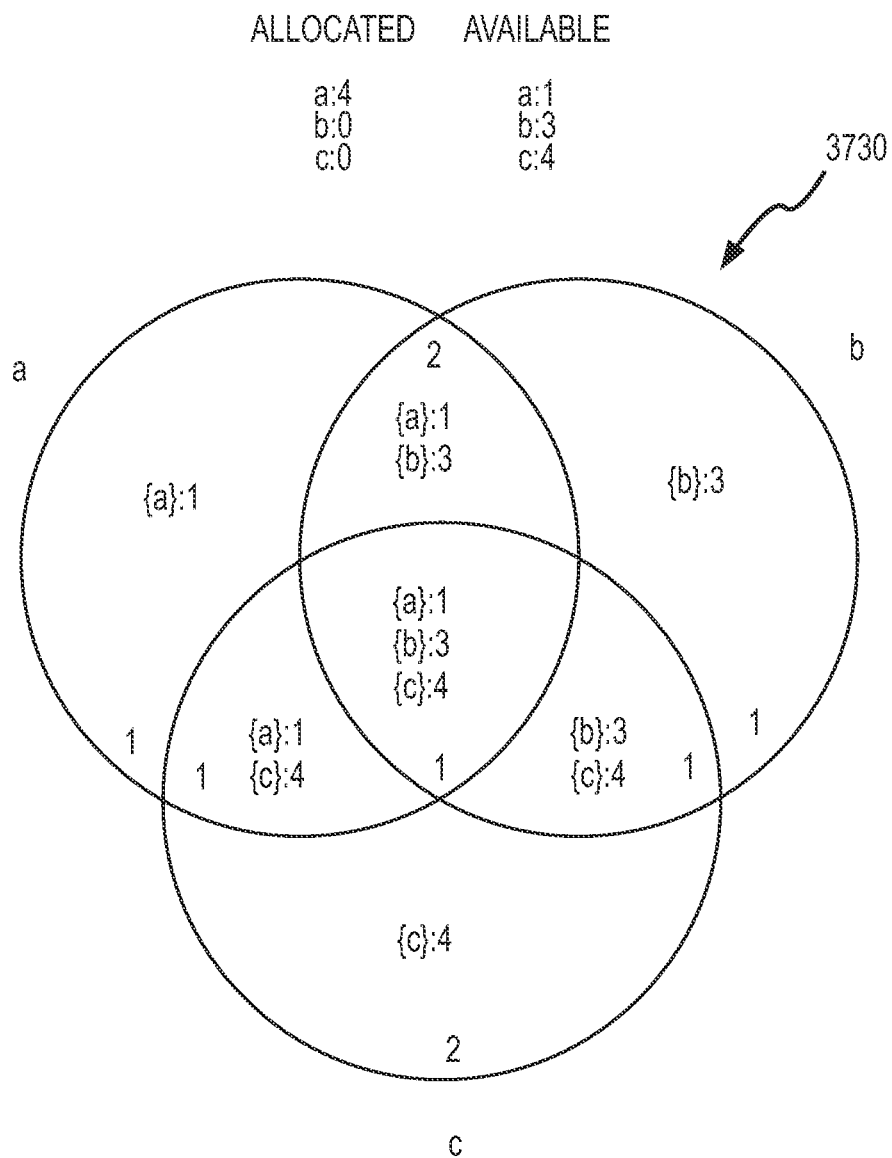

The representation or graph 3730 of FIG. 37D shows the effects of an additional unit of allocation against a, resulting in a remaining constraint of 1 on a. This forms a constraint on the set (a & c) of 1, which is 1 unit less than 2, the initial volume of (a & c), thereby reducing the availability of c by 1 to 4, which is associated with all the regions of c. Similarly, the new allocation to a imposes an additional constraint on the set of (a & b), causing a reduction in the availability of b as well. In each case, the reduction in the availability of b and c are due to the limiting constraint on regions of a.

Figure 37E:
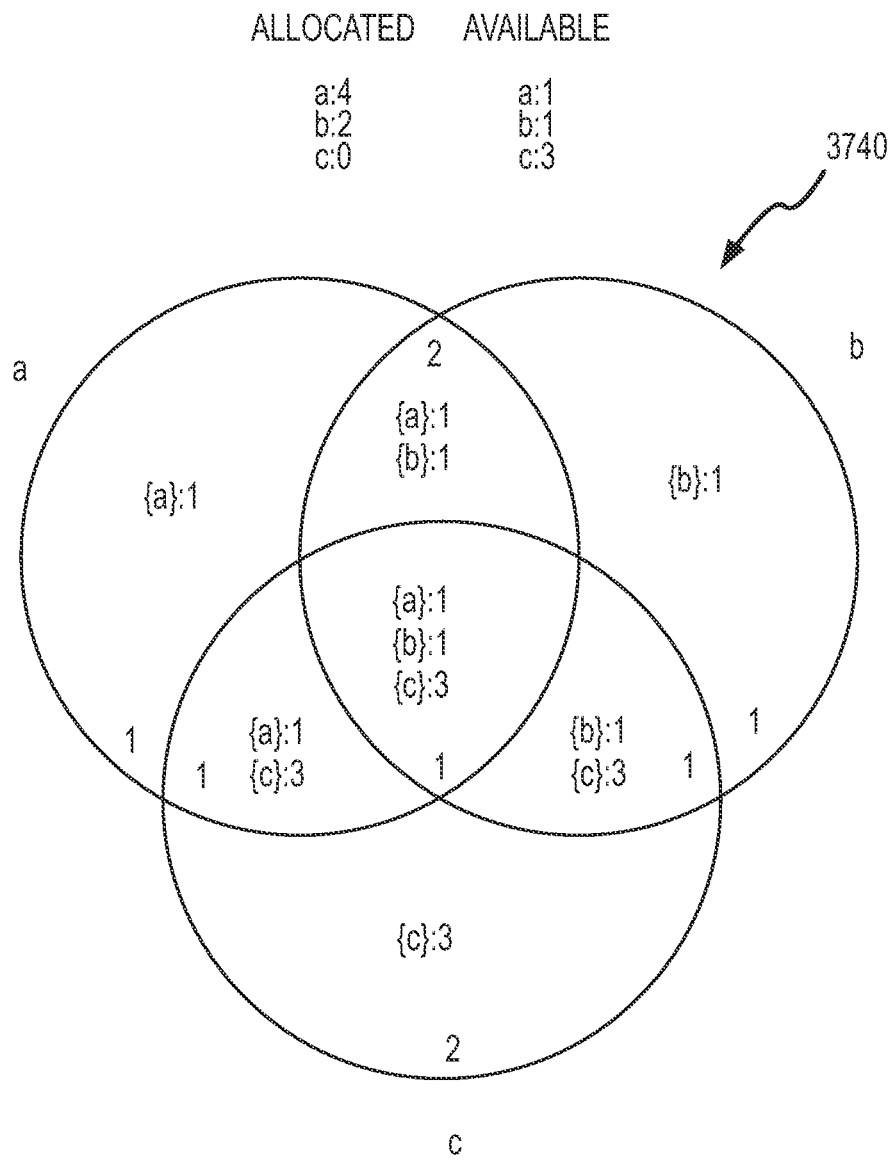
Figure 37F:
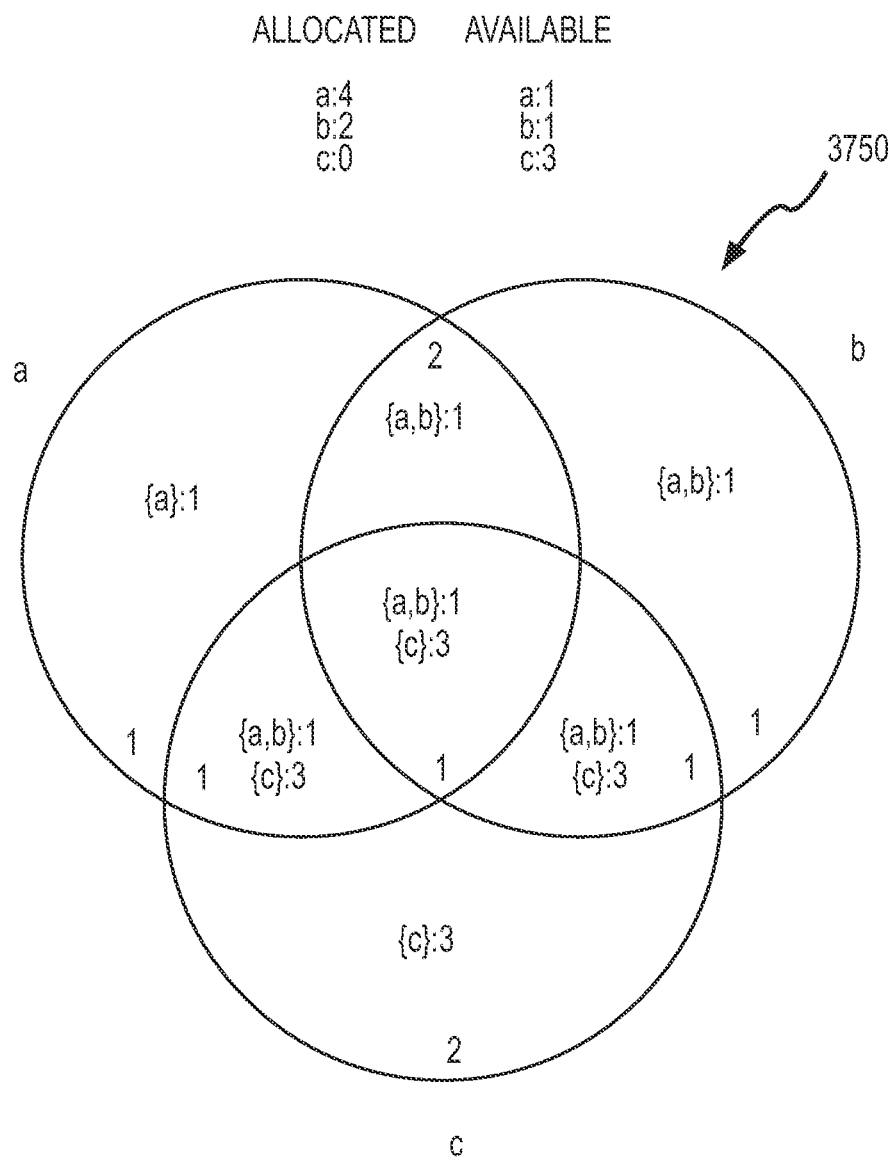

In the representation or graph 3740 of FIG. 37E, an allocation of 2 is made from product b producing a constraint on b of 1. Looking at c, it can be seen that the region (b & c) now has a constraining limit of 1, reducing its initial volume of 2 and correspondingly reducing the availability of c to 3. Looking at the effect on a, the region (a & b) now reflects the constraint of 1 from the allocation on b, however since this region was already limited by the constraint of 1 on a, the availability of a is unaffected. Each of the distinct regions that make up the larger region (a & b) has equal constraints on their individual terms. Additionally, the constraints on each term are below the level of the original volume of their intersection (a & b). Whenever a region is bounded by a constraining limitation and all of the regions that comprise it contain constraints on each of the corresponding terms of the greater region, such that each individual constraint is equal to or is less than the volume of said region, it is an indication that the individual products are constrained between themselves, thereby the constraint is now on the union of the products. In this case, the constraint on the set (a+b) (where '+' represents the set union operator) is now the more constraining relation than the constraint on each individually, so the constraint is updated and is applied to all the regions of a and b as is illustrated in FIG. 37F with graph or representation 3750. From the perspective of c, only 1 unit of inventory is available from any of its regions that are in common with either a or b.

Figure 37G:
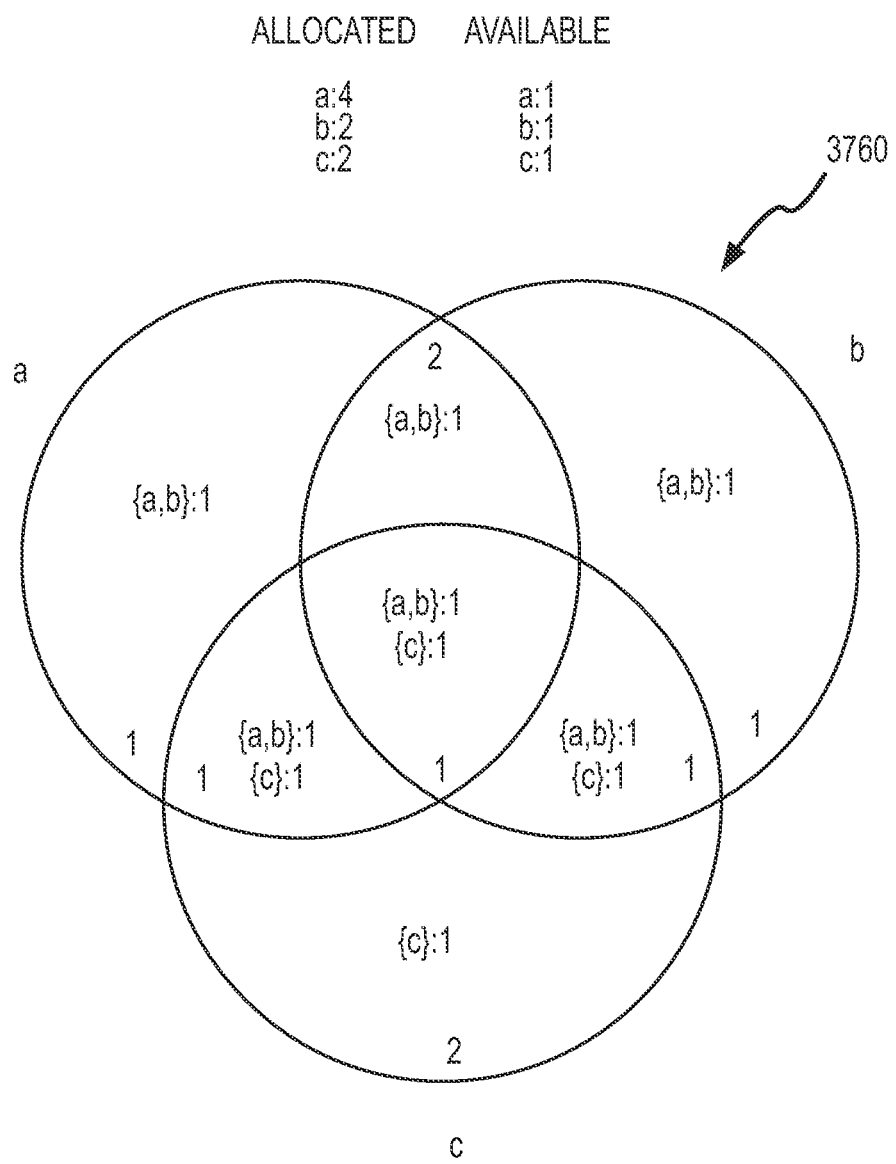

In the graph or representation 3760 of FIG. 37G, an allocation of 2 units is made on c resulting in a constraint of 1 on c. Similar to the previous figure, the region (a & b & c), which in this particular case is a distinct region of inventory itself, now has a constraint of 1, which is equal to the constraints on all of its individual terms and equal to its original volume of inventory. As illustrated in the graph or representation 3770 of FIG. 37H, the constraints are merged and applied to all regions of a, b and c. At this point, the effect on allocating 1 unit of inventory from any of these 3 products will result in no inventory remaining on the other two.

Figure 37H:
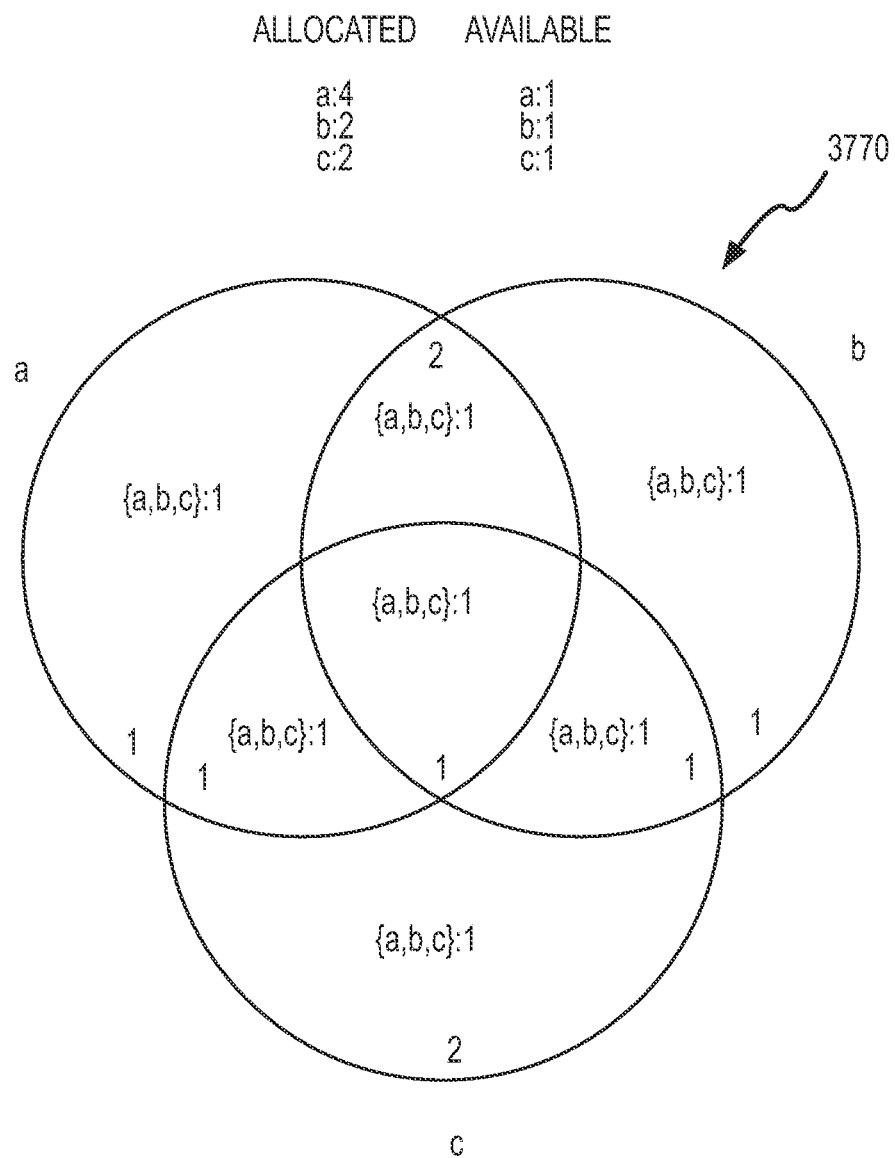

Once the constraints, resulting an allocation are propagated and possibly merged as described above, the remaining inventory on any arbitrary subset of the individual regions can be fully known by limiting the volume of inventory available in the larger region as dictated by the lesser of the volume of inventory on each individual region and the associated constraints of the larger set. So, for example, if the region of interest was the universe of these three products, its availability can also be known. Referring back to FIG. 37F, the inventory remaining across all inventory space is limited to 1 unit from the collective regions of the union of a and b and the 2 unconstrained units of inventory on the region containing only the product c. As illustrated in FIG. 37H, there would only be 1 unit available in total.

As was illustrated above, following an allocation to a product, the availability of the products that directly intersect the allocated product is updated if necessary. For any product whose availability was reduced as a result, the method must be applied on any new product regions not yet visited that intersect with the affected product. For products that were not affected, there is no need to look at their intersecting neighbors. It will be apparent to one skilled in the art that while the above method has been illustrated using an operation against a Venn diagram, the same methodology could be expressed as an allocation against a graph with vertices, with the regions of inventory with additional vertices representing constraints on regions. Additionally, since Venn diagrams are visual representations of set theory, the same methodology could be expressed in the form of set expressions. Similarly, since set theory is isomorphic to Boolean algebra, the above method could be cast in terms of the expressions of Boolean algebra. Since the constraining set method is a general method for computing availability that can be applied to the domain of overlapping sets, it will work equally well for all inventory domains, including hierarchical and non-overlapping sets.

Figure 38:
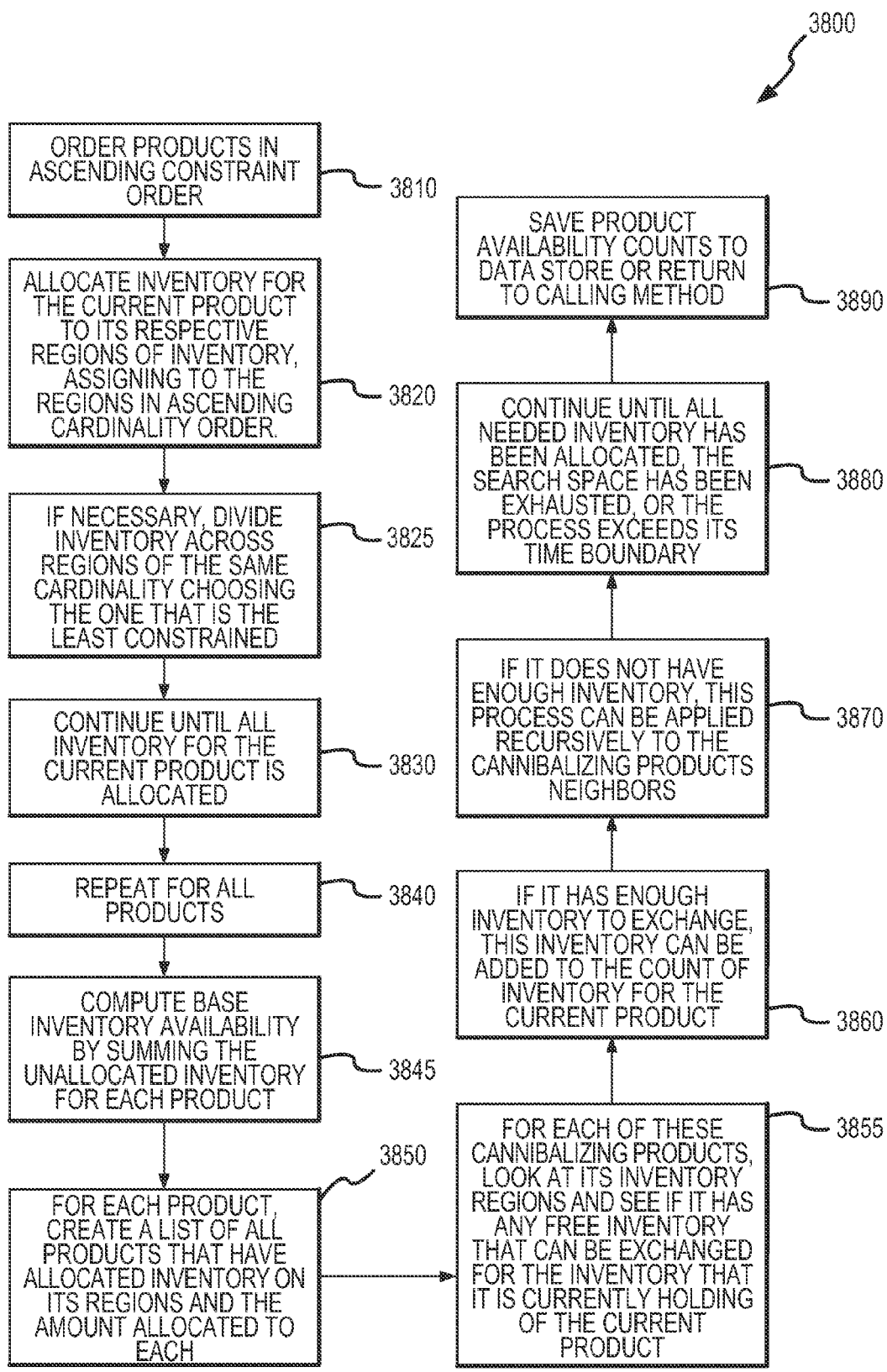
FIG. 38 illustrates a flow diagram of another product availability determination method that employs the lowest cardinality assignment technique of the present invention.

Another preferred method of determining product availability is termed the lowest cardinality assignment method with an exemplary implementation shown in the method 3800 of FIG. 38. As shown, the method 3800 includes first ordering products in ascending constraint order at 3810 and then at 3820, allocating inventory for the current product to its respective regions of inventory, e.g., by assigning to the regions in ascending cardinality order. At 3825, if necessary, the inventory is divided across regions of the same cardinality choosing the one that is the least constrained. At 3830, the method 3800 continues until all the inventory for the current product is allocated and the process is repeated at 3840 for all products. The module 100 or another component performing the operation 3800 continues the process by computing the base inventory availability by summing the unallocated inventory for each product. At 3850, the method 3800 includes for each product creating a list of all products that have allocated inventory on its regions and the amount allocated to each. At 3855, the method 3800 continues for each of these cannibalizing products by looking at its inventory regions and determining whether it has any free inventory that can be exchanged for the inventory that it is currently holding of the current product. At 3860, if it has enough inventory to exchange, this inventory can be added to the count of inventory for the current product. At 3870, when the cannibalized product does not have enough inventory, the process is applied recursively to the cannibalizing product's neighbors. At 3880, the method continues until all needed inventory has been allocated, the search space has been exhausted, or the process exceeds its time boundary. At 3890, the product availability counts that have been determined are stored to data store 70 and/or control is returned to the calling method.

As will be obvious to anyone skilled in the art, each of the methods described in the present invention will differ in the amount of time to compute the desired results. Nowhere is this more true than in the calculation of product availability for overlapping sets. Since inventory systems are frequently constrained by the available time to perform an operation, e.g., depending on the required transaction rate, it is desirable to provide an alternative embodiment that is optimized towards performance while increasing the amount of available inventory provided. As discussed with reference to FIG. 38, one such an alternative embodiment is the lowest cardinality assignment method, which is described in more detail below and which may be selected to calculate availability with a method that is optimized for performance rather than just for yield. It was noted earlier that the correlation method for calculating availability was a discretionary method of inventory calculation that was wasteful and, therefore, provided lower availability counts on average, and thereby not the preferred embodiment, however it had the benefit of being very simple and fast to compute. The lowest cardinality assignment method is also in the group of discretionary methods and, therefore, cannot guarantee the maximum levels of availability but will run in similar speed to the correlation method while producing significantly higher levels of product availability. Further, it can be tuned to increase the level of availability by running a second phase of processing, which will approach and often achieve maximum availability bounded only by the execution time it is allowed to run in.

Cardinality is herein defined as it pertains to a discrete region of inventory, as the count of products associated with the region. It is noted that, in general, making an allocation to a region of inventory that is eligible for the product but that has the lowest available cardinality is preferable to doing so on one with a higher cardinality because, while it does not guarantee the highest remaining availability for every individual product, it does produce the lowest consumption on the remaining products when taken globally. Therefore, it has the heuristic of making an allocation that roughly approximates one that would benefit each individual product.

In a typical implementation of the lowest cardinality assignment method (such as shown in FIG. 38), product allocations are processed in an order of decreasing constraints such that the most constrained products are processed first. Ranking the product constraints can be done using different methods. For example, they can be processed in order of increasing forecast, such that the scarcest products are processed first, or in an ascending order of number of unallocated units of inventory remaining. Alternatively, the product allocations may be processed in an ascending order of the quotient derived by dividing the remaining impressions on a product by the base forecast quantity for that product. As a further alternative, various traversals on the DAG that were previously described can be used to order the assignment. A preferred embodiment of the present method allocates the products in order of increasing forecast using the structure of the DAG on the subset of nodes in the DAG for the product being allocated to order the traversal.

Once a product processing order is established, a greedy algorithm allocates inventory to each product in turn by allocating inventory to the region of inventory in order of ascending cardinality. When encountering regions with the same cardinality and when the remaining quantity of inventory is less than the total quantity of available inventory on the nodes at that cardinality, allocation is either split between the set of regions or allocated to the node that appears to be the least constrained, e.g., based on the collective demand on all the products contained on that node. After all inventory has been allocated, this first phase of the method is complete. The base count of available inventory is computed by simply summing the remaining unallocated inventory on each node and aggregating the sum by product.

The allocation at the end of this phase of this method is not an optimal allocation for many of the products. This is true because in a moderately constrained environment there will typically never be a single allocation that will maximize the availability of all products concurrently. However, this discretionary assignment will be a reasonably close approximation to maximum availability for most of the product set and will support very high transaction rates.

The optional second phase of the algorithm iterates through all of the products in turn, with the order of operations not being significant, and attempts to take the current assignment, which is already close to being optimal, and modify it to the benefit of the product being examined. In this second phase of the method, first, the inventory regions of the product of interest is searched to obtain the list of other products that has inventory assigned to the product of interest. If there is no other product that has allocated inventory on regions of the current product, then the current assignment is optimal for the current product and the next product is examined. However, in a more typical case, there will be a set of other products that has allocations on the regions of the product of interest. For each of these, the count of inventory allocated to the cannibalizing product is summed and the inventory regions of the other product are examined for unallocated inventory that can be exchanged with the cannibalizing inventory. Each additional unit of inventory that is found that could potentially be freed up in this manner is added to the current count of available inventory for the product. This process continues until all of the products that are consuming inventory on the product of interest have been processed or until the routine exceeds some predetermined time interval.

Note that this second phase of the method is recursive in nature for the following reason. If the cannibalizing product has sufficient inventory to exchange to eliminate the inventory it is occupying on the product of interest, the method does not need to look further. However, if the desired inventory was not found, the same algorithm can be applied recursively to the cannibalizing product to see if it can first free up the desired quantity of inventory before allocating it, in turn, to the product of interest. This search can go on until all inventory is found, all search space is exhausted, or a predetermined time interval is reached. The optimal or preferred allocation results of the second phase of this method is not used to modify the base assignment derived in the first phase but is used to determine and optionally store the maximum availability numbers for the product set. For performance reasons, the different sets of optimal allocation assignments, for each product can be stored for later use if such an assignment is ultimately made.

While methods have been described above that pertain separately to partially overlapping and hierarchical data sets, these methods can be combined without compromising the integrity of the counts or violating the principle of logically necessary allocation. For example, if an allocation is made to an overlapping data set, which itself is fully contained within a parent product, for example run-of-network, the hierarchical availability method can still be applied to the parent product. Conversely, if products within the same overlapping data set are strict, undivided subsets of the overlapping segments, then their availability can be managed by the simpler methods of hierarchical availability. This can be very useful for common situations such as if the time interval for the main inventory regions is based on a single day and time slices, also referred to as day parts, of a given overlapping product is to be allocated. Further, while the present invention has provided several methods for the computation of maximum product availability, consistent with the realities of product cannibalization it should be apparent to one skilled in the art that various implementations that are related to those described are considered within the scope of this invention.

Additionally, in regard to product availability and allocation advice, while the above methods are designed to report the maximum available quantity of a given product segment, it may not always be in the interest of the owner of the inventory to allocate the full amount possible. For example, this may be the case since allocating the full amount of a given will also correspond to cannibalization of other products, some of which may be more valuable per unit of inventory. Fortunately, the product vector structure provides the ability to report information, which shows the effects of making additional allocations on the product. So, for example, an inventory management system, such as system 12 in FIG. 1, may be adapted in some cases to report that while a certain quantity of product p are available that the effects of making such an allocation would have the side effect of cannibalizing various quantities of other products with potentially higher historical average values. This information may also be presented along with historical percentage sold of those products such that an informed decision could be made as to whether it was in the interest of the inventory owner to sell all of the available product.

Note that the majority of operations in an inventory management system are usually product lookups. In a typical embodiment, the inventory management module 100 satisfies lookups for defined products by reading a small amount of data directly from the product daily summary counts data. The availability calculation methods described above are generally only executed following the allocation of additional inventory for a product.

Searching of an inventory can be limited to a portion of the inventory or inventory representation by considering inventory subpopulations. For example, although it is necessary to apply the above algorithm for all products directly or indirectly related to the product of interest, it is not necessary to analyze unrelated products. The full population of products and inventory data in the system can be subdivided into subpopulations. Each of these individual subpopulations will represent disjoint sets, meaning that there are no intermediate products that intersect with one or more products from both disjoint sets. Therefore, since there is no inventory in common to either subpopulation, it is not necessary to analyze any data outside of the subpopulation being recalculated.

The divisions that can partition the population into subpopulations will differ between data domains. However, likely candidates for such divisions are any scalar attributes that are common to all products that take on a non-null value. The higher the cardinality of the partitioning attributes the greater the benefit. In the domain of Internet advertising, a reasonable attribute might be one identifying the location and/or placement of the ad to be displayed or the unit format for the advertisement. In an exemplary implementation of the present invention, these attributes are separated out from the rest of the attributes that define the product with respect to representing and identifying the product solely by encoding it in the product vector, and are instead stored as a scalar attribute of the record, which in turn is used to logically or physically partition the data into separate subpopulations of the inventory. For example, if 5000 products were defined in the system, using a bucket size of 400 operating on an inventory sample of 2M records, then a partitioning key with 20 different values would, on average, limit the operations to examining 250 different products against a sample size of 100K records. It should also be noted that overlapping product sets could be represented as a data structure constructed as a graph, just as it was shown for hierarchical products being represented both as a tree and a Venn diagram or as the DAG representation of overlapping products. Because of this it is also acknowledged that anyone skilled in the art could restate the above methods in terms of representing the problem space as a graph, performing analogous operations on them to accomplish the same goals. In the case of identifying disjoint sets, this is accomplished, for example, by finding different disjoint sets of graphs within the product sets for which there was no connecting path between the individual graphs.

It should be noted that with many methods that implement logically necessary allocation there is no notion of prioritizing the cannibalization of different product types. For example, an allocation method might conceivably rank products in order of scarcity to force the cannibalization of lower ranked products first. However, this is generally unnecessary when using logically necessary allocation-based methods since no product will ever be cannibalized unless it is impossible to avoid doing so. Beyond that notion, however, in some inventory environments there is the strict notion of product preservation in which inventory for a specific product is strictly prohibited from being consumed as a side effect of the cannibalization by other product allocations and may therefore only be consumed by explicit allocation of the preserved product. This is typically done to explicitly preserve relatively scarce, high-valued products. This has the effect of fully preserving the inventory for the preserved product at the cost of reducing the availability of other directly and indirectly correlated products. Some embodiments or implementations of the inventory management module 100 provide this capability using the following method or similar methods.

Each product has an attribute referred to herein as horizon. This represents the number of days past the current date where the product is not available for consumption by the cannibalization of other products. For example, if the horizon value for the preserved product is 14 and the date being examined is 15 days after the present date, none of the preserved product's inventory is available for consumption by other products. Once the current date is within the horizon period, the preserved product's remaining inventory is available to other consuming products so that it does not go unused. The methods previously described for computing product forecasts and availability can be configured to take this into account. For example, when computing the forecast for a given product on a given date, any inventory for that product which intersects with the inventory of a preserved product for dates beyond the current day plus the preserved product's horizon will not be available to the first product. This is reflected in values for the affected products in the daily summary inventory counts as shown in Table 12 as a lowering of the forecast and availability for the affected product. This is accomplished by the following method.

When the records of the daily aggregated forecast vectors illustrated in Table 11 are examined to determine a product's forecast, the other products that are present on the record are examined to see if one or more are preserved products that are within their horizon period. If this is the case, the inventory on the record is not available for the product whose forecast is being determined. Similarly, when computing availability, records that meet these criteria are not available for the allocation of any product sold inventory unless it is the inventory of one of the preserved products on the record. Looking at the diagram in FIG. 33, it can be seen that for a given date if the inventory for product c is preserved, the forecast for products a and b are each reduced by two. This preserves the inventory for product c at the expense of reducing the availability of each of the other products. If both products b and c were preserved, the forecast of product a is reduced by 80%, illustrating that this mechanism should normally be used sparingly for special, high-valued products. In this situation, the inventory that is common to both b and c would be unavailable to either product b or c since each would preclude the other from making the intersecting inventory available to the other. Therefore, to resolve this situation, depending on the business rules defined in the system configuration, the inventory management module 100 either makes the inventory available to the highest valued intersecting preserved product or to either preserved product that requires it.

The inventory management system 12 is also responsible for performing contract allocation or assisting in fulfillment of contracts and updating the inventory representation 76 accordingly. Periodically, the inventory management module 100 synchronizes with the delivery system 130 via the selection module 120. This module 120 is responsible for identifying the set of products whose criteria can be satisfied by the attributes present in the ad call 152, selecting which product 152 to serve, and after having selected the product to select a particular product buy, and therefore the corresponding ad campaign, which the delivery system 130 can use to select the associated media to display. The inventory management module 100 synchronizes directly with the product determination module 25 via the attribute bitmaps 60. The structure and content of the attribute bitmaps 60 is as described previously as it pertained to the data processing module 30, which results in similar product identification behavior. This provides synchronization between the definition of the product set and the method of product identification as it is processed and loaded into the inventory management module 100, as well as the real time product identification that is done at the time an inventory request is received by the delivery system 130.

Figure 39:
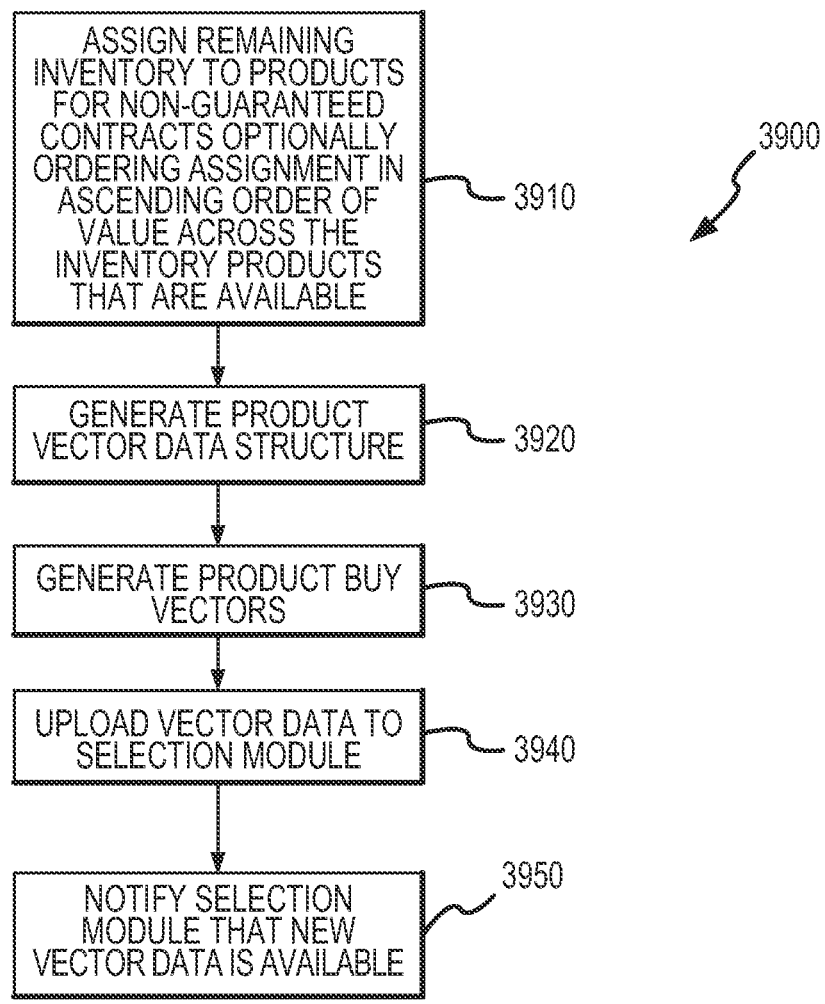
FIG. 39 illustrates a flow diagram of a method of generating product vectors such as those shown in FIG. 1 for use by a selection module.

The inventory management module 100 also synchronizes directly with the selection module 120 via the product vectors 90 and the product buy vectors 110. These vectors are used by the selection module 120 as a look up mechanism to determine the frequency to select a given product from a list of eligible products and the frequency to select a product buy from a list of eligible product buys for the selected product. FIG. 39 illustrates a representative method 3900 of generating product vectors (such as vectors 90 in FIG. 1). With the inventory management module 100 or other component of system 12, the method 3900 begins at 3910 with assigning remaining inventory to products for non-guaranteed contracts optionally ordering assignment in ascending order of value across the inventory products that are available. At 3920, the product vector data structure is generated, and at 3930, the product buy vectors (such as vectors 110) are generated. The module 100 at 3940 acts to upload vector data to the selection module 120 and then notifies the selection module 120 that new vector data is available at 3950.

When a delivery request is processed, the product determination module 25 generates a product vector, which is used by the selection module 120 as a lookup key into the product vectors 90. This lookup returns a collection of product identifiers, specific to the combination of eligible products as represented in the product vector, with one element each in the collection for every eligible product represented. Each collection element will contain a product identifier and a corresponding quantity of inventory for that product that has been allocated to the segment of the inventory that is associated with that combination of products. The relative quantities of each of the eligible products are used to select a particular product in accordance with the relative amount of inventory allocated to each. For example, if a given region of the inventory with the vector representing products a, b, and c represented a total quantity of inventory of 1000 with 600 allocated to a, 300 allocated to b, and 100 allocated to c, these quantities are used to select product a 60% of the time, product b 30% of the time, and product c 10% of the time. For convenience of illustration, the quantities can be scaled such that they sum to 100, which would result in the values 60, 30 and 10, respectively. The selection module 120 takes the selected product and uses the product buy vectors 110 to select a particular product buy and associated campaign, which is returned to the delivery system 130.

Figure 40:
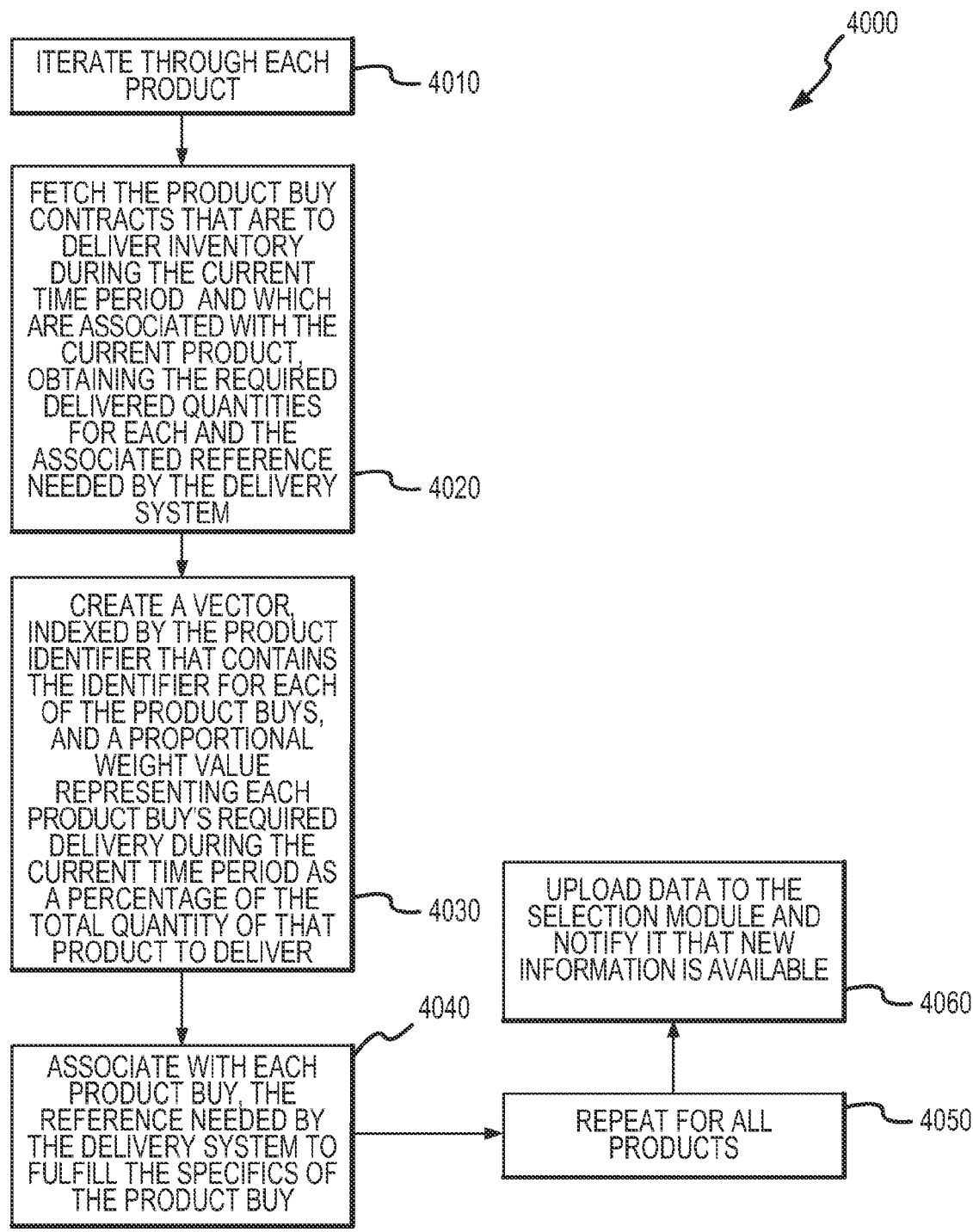
FIG. 40 illustrates a flow diagram of an exemplary method of generating product buy vectors, such as those shown in the system of FIG. 1.

The product vectors 90 and the product buy vectors 110 are periodically generated by the inventory module 100. An exemplary method 4000 of generating product buy vectors 110 is shown in FIG. 40. At 4010, the module 100 iterates through each product and at 4020 it fetches the product buy contracts that are to deliver inventory during the current time period and which are associated with the current product. This typically involves obtaining the required delivered quantities for each and the associated reference needed by the delivery system 130 such as by ad server 132. At 4030, the module 100 creates a vector that is indexed by the product identifier that contains the identifier for each of the product buys. The module 100 further creates a proportional weight value representing each product buy's required delivery during the current time period as a percentage of the total quantity of that product to deliver. At 4040, the module 100 associates with each product buy the reference needed by the delivery system 130 to fulfill the specifics of the product buy. At 4050, the method 4000 includes repeating the prior steps for all products and at 4060 the data is uploaded to the selection module 120 and notifying the module 120 that new information is available.

It may be useful at this time to provide additional description of the methods of generating product buy vectors 110. As previously noted, for any given date, the records in the daily aggregated forecast vectors illustrated in Table 11 represent all the distinct combinations of products found in the historical log data 15, which are referred to here as the distinct regions of the inventory. It was also described that there is an exact one-to-one correspondence between a record in that data structure and one of the sets of distinct regions of a Venn diagram representing all the products and their corresponding intersections. The quantity of inventory on each record, therefore, represents the expected quantity of inventory for that particular region. Since a given product segment will typically span many segments of the data and a typical segment of the data will represent the intersection of a number of products, there are a great number of ways that product inventory can be distributed across these segments. The method described in this embodiment seeks to distribute the inventory in an even manner across segments of the data for the purpose of supporting an even delivery schedule over time while minimizing the error introduced by the difference between the distribution of the inventory data compared with the expected distribution derived from the historical log data 15. When the inventory module 100 is synchronized with the selection module 120, the allocated quantities for all the products in the system are associated with each of the applicable product vectors 90 using the following method.

Allocation can be done in three steps. First, the allocations are made for all guaranteed inventory. Second, allocations are made as is possible for all auctioned contract inventory, and third, allocations are made on preemptible contract inventory, including non-guaranteed allocations to other distribution channels. Using the product daily aggregated forecast information, the contract information, and the contract daily allocation detail information, which in the exemplary implementation could be stored as illustrated in Table 11, Table 22, and Table 21, respectively, the forecast and reserved (allocated) counts for the current date are obtained and stored in an in-memory data structure such as an array. In this data structure, for each product p1 ... pn, the forecast (pn) and sold(pn) is initialized with the forecast and allocated values for product pn, respectively. This is done for all products p1 through pn. Note that the value of sold(pn) is the quantity of inventory allocated for product n for the current time period from all guaranteed inventory contracts for product n as well as any auctioned contracts for product n, which have a bid price is greater than the minimum eCPM price for that product as described later.

TABLE 21

Contract Allocation Detail

| Product Buy ID | Campaign ID | Delivery Date | Quantity |
| --- | --- | --- | --- |
| 1 | 1 | Jul. 1, 2006 | 600 |
| 1 | 1 | Jul. 2, 2006 | 550 |
| 1 | 1 | Jul. 3, 2006 | 592 |

All of the guaranteed inventory contract data and applicable auctioned contract data is retrieved and sorted in ascending order first by product type then by eCPM price retrieving the product buy identifier, the campaign identifier, and the reserved quantity for the current date. For each retrieved contract record, an additional variable (referred to here as the allocated quantity) is created and initialized to 0. This contract information is collectively referred to here as contract vectors, the use of which is described later. All of the records for the daily aggregated forecast vectors for the current day are then examined in an ascending sorted order using the inventory quantity on each record as the sort key. It is processed in that order because it is desirable to assign as much of the guaranteed inventory as possible to those inventory regions most commonly found to, thereby, reduce the error introduced by allocating inventory to comparatively rare product combinations which may not occur again. For each record, the count of inventory associated with that record is obtained. The product vector is then examined to identify every product associated with this record. For each product found to be present in the product vector of the matching record (referred to here as an eligible product), the following formula is then used to compute a weight:

$$\text{weight}(pn) = \min(\text{sold}(pn), \text{forecast}(pn)) / \text{forecast}(pn)$$

The weight for each of the eligible products is then compared, and the product with the highest weight is selected. If more than one product is tied with another for the highest weight, one of those is selected at random. Then both the values for sold(pn) and forecast(pn) for the selected product is decremented by 1, while only the value for forecast(pn) is decremented for the remaining eligible products. The allocated count in the collection of the contract vectors associated with the first matching contract for the product, which still has a value of reserved(c)−allocated(c)>0, is then incremented by the same amount. The value of the count of inventory for the matching daily aggregated forecast record is correspondingly decremented as well. Additionally, the allocation count for the product pn that is associated with the record is also incremented by 1.

This process continues until the value for the count of inventory for the daily aggregated forecast record reaches 0 or there is no eligible product with remaining inventory to allocate. At this point, the process is repeated on the next record starting again with the count of inventory of the next record while maintaining the decremented values of sold(pn) and forecast (pn) for the products. The method of decrementing the above and of the values by 1 is for illustration purposes only. It is recognized that for reasons of efficiency that the above counts can be decremented by a value greater than 1 or non-integer values using various methods that will be apparent to anyone skilled in the art. Depending on the percentage sold of a given product in relation to its forecast or its cannibalization from other intersecting products, it is possible at any point in the above algorithm for a product to have a weight equal to 1. Once this is the case, every inventory segment for which the product is eligible will be allocated to that product. It is also possible that more than one eligible product on a given daily aggregated forecast record reaches a weight of 1, which indicates an oversold condition for guaranteed inventory.

The above method allocates inventory to eligible contracts in order of ascending eCPM value. Ordinarily, this order has no impact since the inventory management module 100 attempts to manage contracts and inventory such that all contract allocations are delivered. However, in this situation, one of the two or more eligible products is selected so the selection is done in a way to optimize revenue while minimizing the number of contracts that fail to deliver. Using the aforementioned sort order, the inventory module 100 will then distribute the remaining inventory to the product buys that are competing for the same inventory explicitly to those product buys and corresponding to their products that have the highest eCPM to optimize revenue.

The first iteration of the process terminates when either all of the records for the daily aggregated forecast vectors for the current day have been visited or all reserved inventory of the guaranteed and applicable auctioned contracts have been allocated. The process is then repeated, this time retrieving all of the contract and contract details for the auctioned contracts that have not been accounted for in the previous step with the contracts sorted in order of ascending eCPM. Like the previous step, the daily aggregated forecast vectors are scanned including examining only those vectors that have a remaining inventory count greater than 0 and identifying the eligible products on each that are associated with contracts that still have remaining inventory to allocate. The weights of each eligible product are computed by selecting the one with the highest value as described above. If more than one product has a weight of 1, inventory is allocated to the contract for one of the eligible products with the highest eCPM value. This iteration of the process also terminates when either all of the records for the daily aggregated forecast vectors for the current day have been visited or all reserved inventory of the auctioned contracts have been allocated.

Finally, the above process is repeated again, this time retrieving all of the contract and contract details for the preemptible contracts. The contracts are sorted on the sort key specified in the system configuration as is described later. If more than one product for a preemptible contract has a weight of 1, inventory is allocated to the contract to the eligible contract that ranks first based on the chosen sort key. If more than one preemptible contracts are defined as exclusive, with an associated weight given to each, as described later, the remaining inventory is divided among them in the corresponding ratios. This last iteration of the process should terminate with the entire forecast inventory allocated to one of the various contracts. If the entire inventory has not been allocated, the inventory management module 100 returns a warning to the order management system 80.

Figure 41:
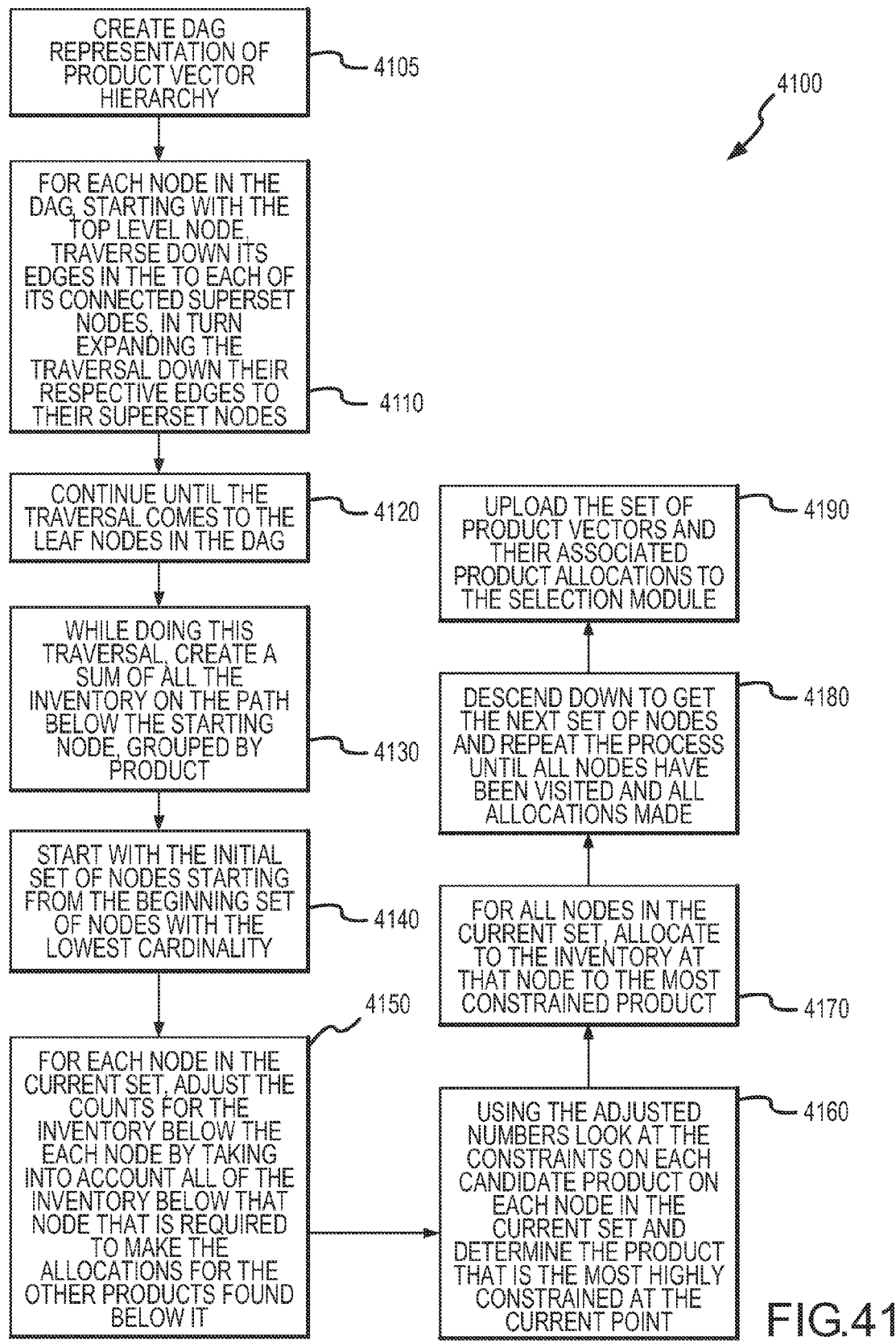
FIG. 41 illustrates a flow diagram of an exemplary method of assigning product vectors using a DAG.

Prior to product selection synchronization, delivered count data is used to update the delivered counts for the current time period for each product buy. These delivered counts are applied against the quantity given in the contract allocation detail, which results in a reduced quantity to allocate against the daily aggregated forecast vectors, for each respective contract, for that day. FIG. 41 illustrates an exemplary method 4100 of assigning product vectors using a DAG of product vectors as described earlier. In the method 4100, at 4105, a DAG representation is created for the product vector hierarchy. At 4110, for each node in the DAG and starting with the top level node, the method 4100 includes traversing down its edges in the DAG to each of its connected superset nodes in turn expanding the traversal down their respective edges to their superset nodes. At 4120, the method 4100 continues until the traversal comes to the leaf nodes in the DAG. At 4130, while doing the traversal, a sum is created of all the inventory on the path below the starting node with a grouping by product. At 4140, it is stressed that the method 4100 starts with the initial set of nodes starting with the beginning set of nodes with the lowest cardinality. Then, at 4150, for each node in the current set, the method 4100 includes adjusting the counts for the inventory below each node by taking into account all of the inventory below that node that is required to make the allocations for the other products found below it. At 4160, the method 4100 includes using the adjusted numbers to look at the constraints on each candidate product on each node in the current set and determining the product that is the most highly constrained at the current point. Then, at 4170, for all nodes in the current set, the method 4100 includes allocating to the inventory at that node to the most constrained product. At 4180, the method 4100 includes descending down to get the next set of nodes and then repeating the process until all nodes in the DAG have been visited and all allocations are made. The set of product vectors and their associated product allocations are then uploaded at 4190 to the selection module 120.

The product vectors 90 and the product buy vectors 110 are then generated from output of the above method. During the previously described process, every time an allocation for a specific product was made against a daily aggregated forecast record the corresponding counter variable for the allocated product was incremented. The product vectors 90 that are created for the selection module 120 include the product vector from the daily aggregated forecast vectors, which is used as a lookup key, and each associated eligible product and the allocation associated with it, if any, from the above process.

For example, assume that products a, b, and c were the all the eligible products on a given inventory region that had a total inventory count of 1000 and, therefore, the product vector contained an identifier for products a, b, and c. Then, if the allocations to these products were 600, 300 and 100 respectively, the associated product vector entry would capture this information which is illustrated here as a physical record, with products encoded in a left-to-right binary string, with the following logical structure: [111000000000000]→a: 600,b:300,c:100. For convenience of illustration, the quantities can be scaled such that they sum to 100, which in this example would result in the values 60, 30 and 10. In this case, the values are interpreted as the percentage of time the corresponding product is to be chosen when this particular combination of eligible products is found. Illustrated this way, the above product vector would have the following logical structure: [111000000000000]→a:60,b:30,c:10.

The selection module 120 takes the returned vector and selects a product using the following method that is illustrated by example. Each of the products is given a range of numerical values corresponding to the percentage assigned to each. Using the example vector, product a could have the range 1-60, product b the range 61-90, and product c the range 91-100. The selection module 120 then randomly selects a numerical value between 1 and 100, selecting the product whose range the randomly selected number falls into. For example, if the selected number were 88, product b would be selected.

Additionally, since it is possible for the product determination module 25 to encounter a product combination never seen before in the historical log data 15, a default vector is built to handle this case. For each product, a weight is computed by dividing the count of sold inventory for the product by the count of forecast inventory for the product, resulting in a real number ranging between 0 and 1, in which the product with the highest number will be the one requiring the highest percentage of matching inventory. When the selection module 120 encounters this situation, the default vector is used to look up the weights for the eligible products and each of the weights is scaled so that they sum to 100. Each product is then assigned a prorated range on the number scale. The selection module 120 then randomly selects a number between 1 and 100 and chooses the product whose range includes the randomly selected number. The inventory module 100 takes the entire set of product vectors and the product allocation for each (collectively the product vectors 90) and delivers them to the selection module 120 via a configuration file or some other means of data transfer such as can be identified by anyone skilled in the art.

It is also preferable that the system 12 performs campaign selection synchronization. As described above, when contract inventory is allocated from a given contract to the corresponding product vector, the allocated count for the contract is incremented. The contract vectors are the end result of this process and include a product identifier, a product buy identifier, a campaign identifier, and an allocated quantity of inventory for that product buy for each of the allocations for all contract types including guaranteed, exclusive, auctioned, and preemptible. To create the product buy vectors 110, the contract vectors are sorted according to product type and a collection of product buys, if formed, organized by product. Each entry in the product buy vectors 110 includes a product identifier, which will be used as a lookup key, and a collection of one or more product buy records each with a campaign identifier and a quantity of allocated inventory. For example, if there were three product buys pb1, pb2, and pb3 for product a for quantities 1000, 3000, and 6000 respectively, then in an exemplary implementation, the corresponding entry in the product buy vectors 110 would be logically represented with the following logical structure: a→pb1:1000,pb2:3000,pb3:6000.

For convenience of illustration, the quantities can be scaled such they sum to 100, which in this example would result in the values 10, 30, and 60 respectively. In this case, the values are interpreted as the percentage of time the corresponding product buy and campaign are to be chosen given the selection of the given product. Scaled in this way, the product buy vectors 110 would be logically represented with the following logical structure: a→pb1:10,pb2:30,pb3:60. Once a given product is selected, the selection module 120 chooses a product buy using the same selection methodology as was illustrated above for selecting a product. The selected product buy is then used to look up the campaign identifier or whatever reference is needed by the delivery system 130 to select the appropriate media or redirect the ad call 152 to another distribution channel. This information is then returned to the delivery system 130 for it to act on.

The product buy vectors 110 are delivered to the selection module 120 via a configuration file or some other means of data transfer such as can be identified by anyone skilled in the art. When the product determination module 25 is first initialized, it loads the attribute bitmaps 60 into memory where it is used to quickly build product vectors. Similarly, when the selection module is first initialized, it loads the information from the product vectors 90 and the product buy vectors 110 into memory where they are used to first select a product from the list of eligible products and then a product buy from the list of eligible product buys for that product.

According to some embodiments of the invention, the distributions of inventory and contract fulfillment may be handled through broadcast distributions. If the delivery system 130 is a set-top box that is part of a cable or satellite based broadcasting system, the interaction between the selection module 120 and the delivery system 130 is logically identical or similar to that described above for Internet advertising with delivery system 130 includes an ad server 132. However, it is not necessary to provide the full set of product vectors 90 or product buy vectors 110 to each individual set-top box (to each delivery system 130). Unlike an Internet based server dedicated to the task of selecting and delivering advertisements and which can receive an inventory request from any client location, a set-top box is a delivery module that is associated with certain target demographics that are bound to the installed location.

For example, set-top box is likely to have an identifier that the broadcast network can associate with the subscriber address and, therefore, derive the geographical data and other attributes such as imputed values for household income. Further, the log records for each box could potentially be uploaded to the broadcaster so that program-viewing history is established and the attributes associated with program history and the associated viewer demographics. To the degree that products are associated with information that is derived solely from the set-top box identifier, only the product vectors 90 containing products that could ever be eligible on a given set-top box need be uploaded to the box. This is equally true for any campaign vectors 110 that are based on those products. For example, there is no point in uploading product vector and campaign data for a product that is defined for the San Francisco market to a set-top box that is located in Denver. So that these vectors can be split accordingly, the inventory management module 100 can record in the product attribute mapping structure the attributes which are directly associated with the set-top box.

Figure 42:
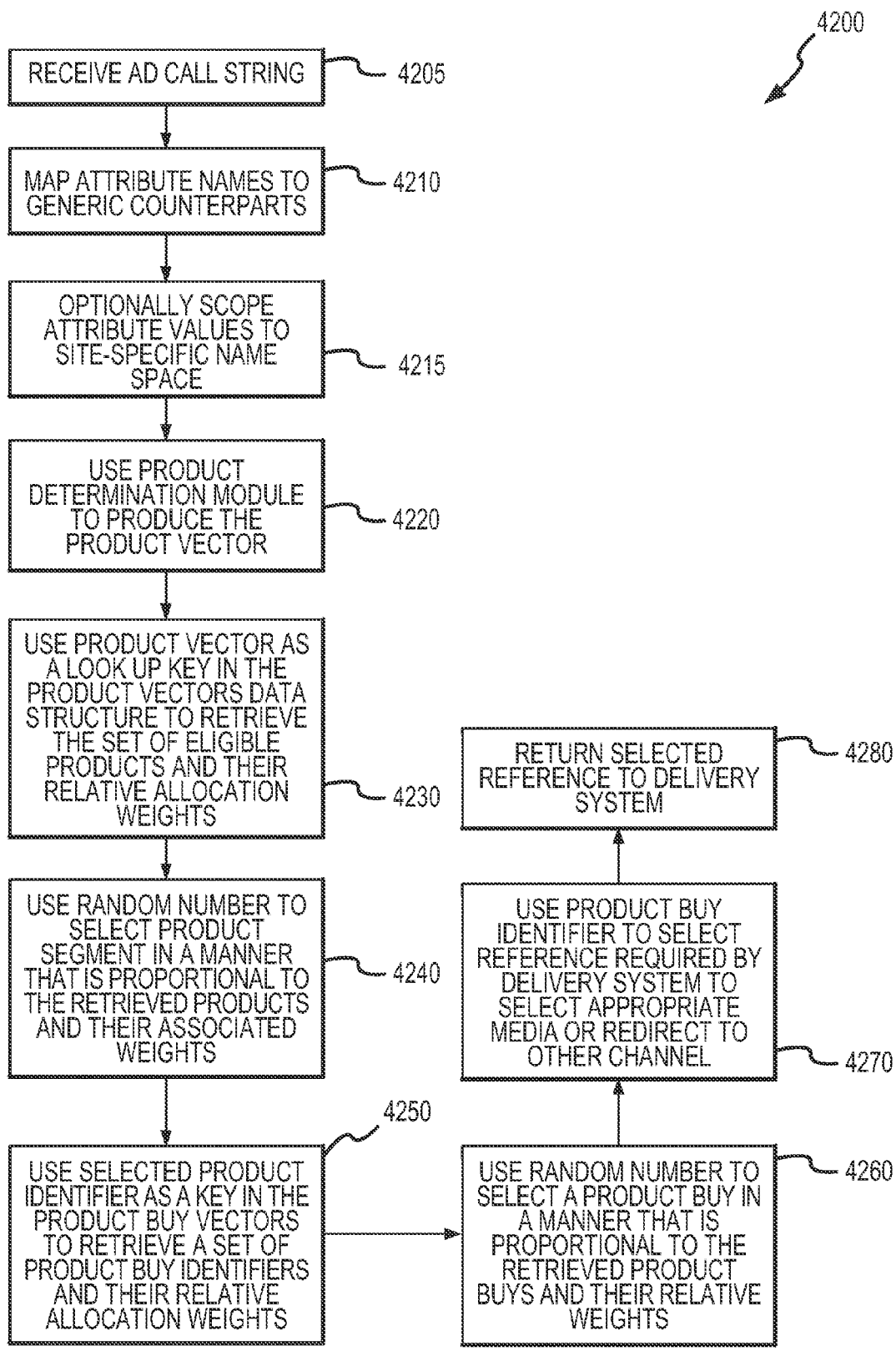
FIG. 42 illustrates a flow diagram of a method performed at least in part by a selection module according to the invention for actual advertisement selection and delivery to the publisher system requesting an advertisement or ad.

According to another aspect of the invention, the delivery system 130 and the selection module 120 are the modules responsible for the actual advertisement selection and delivery to the publisher system requesting an ad in real time. A selection method 4200 performed by the selection module 120 is shown in FIG. 42. At 4205, an add call string is received and at 4210 the attribute names are mapped to their generic counterparts. At 4215, the module 120 acts optionally to scope attribute values to site-specific name space. At 4220, the product determination module 25 may be used to produce the product vector, and then, at 4230, the product vector is used as a look up key in the product vectors data structure to retrieve the set of eligible products and their relative allocation weights. At 4240, a random number may be used to select product segments in a manner that is proportional to the retrieved products and their associated weights. At 4250, the selected product identifier is used as a key in the product buy vectors to retrieve a set of product buy identifiers and their relative allocation weights. At 4260, the method 4200 includes using a random number to select a product buy in a manner that is proportional to the retrieved product buys and their relative weights. At 4270, the method 4200 continues with using the product buy identifier to select the reference required by the delivery system 130 to select the appropriate media or to redirect to another channel. At 4280, the method 4200 ends with returning selected reference to the delivery system 130.

Figure 43:
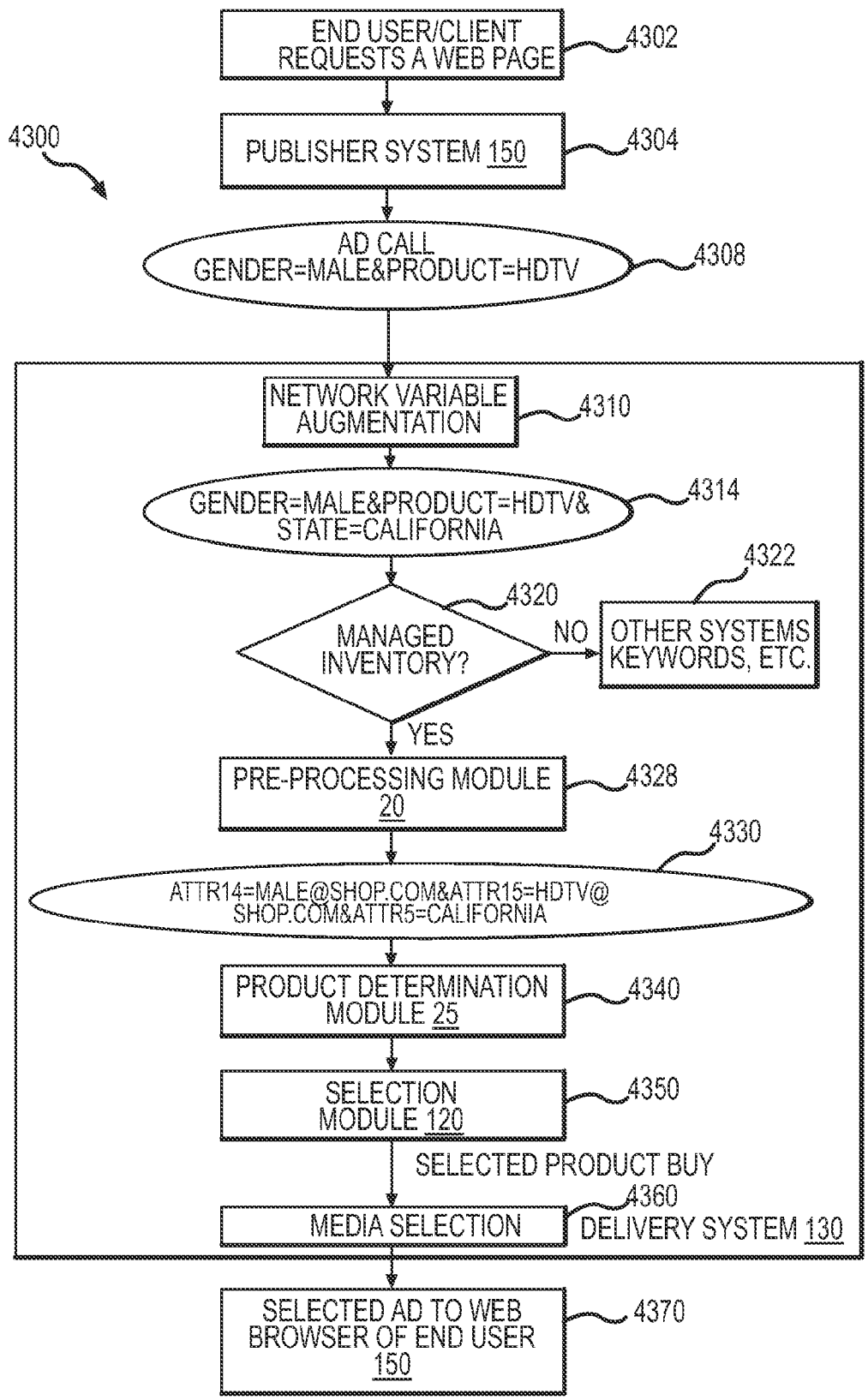
FIG. 43 is a flow chart showing a representative product selection method performed according to an embodiment of the invention.

Further, regarding selection and delivery, the delivery system 130 can be or include an Internet based server 132 dedicated to the task of selecting and delivering advertisements, a set-top box that is part of a cable or satellite based broadcasting system, or any kind of device or software program fully or partially dedicated to the fulfillment of product allocations within the inventory module. The process used by the delivery system 130 and the respective modules to select an advertisement in response to a request is now described and illustrated in FIG. 43 (with FIG. 43 combining process steps with functional blocks from the system 10 of FIG. 1 for ease of explanation).

The process 4300 performed to select an advertisement starts at 4302 with a Web page being requested from a publisher system 150 by an end user or client device linked to the network or Internet. If data is available, the publisher system 150 retrieves at 4304 any stored attributes that were previously associated with the end user. Optionally, the values are encoded as described previously. At 4308, these values are merged with the other attributes of the ad call such as the site and page location information and passed to the delivery system 130 from the publisher system 150. If additional attributes are available in the domain of the delivery system 130, the ad variables are further augmented with those values at 4310 and as shown at 4314. The ad call is then examined at 4320 to determine if it is to be handled as a part of the inventory under management by the present invention. If it is not, such as might be the case if the request had search terms, it is handed to an alternate system at 4322. Otherwise, at 4328, the information is handed to the preprocessing module 20.

The preprocessing module takes the attribute names and maps them to their generic counterparts as shown at 4330. In this case, two of the attributes are site-specific and one is at the network level. Since different sites with different attribute meanings share the same attribute positions for site-specific attribute, the attribute values are appended with the site name to avoid any data collisions. The output of the preprocessing module 20 is then handed to the product determination module 25 as shown at 4340. Using the attribute bitmaps that were previously loaded into memory, the lists of attributes and values are then used by the product determination module 25 in step 4340 to determine the set of products that the attributes could potentially satisfy, as previously described. The attribute bitmaps 60 and the product determination module 25 are identical or similar to their counterparts being used for the data processing module 30, resulting in a synchronized and uniform product identification process at all levels in the present invention. The product determination module 25 produces the product vector, as previously described, which is then returned to the selection module 120 at 4350.

Using the product vector as a lookup key, the selection module 120 in 4350 retrieves the set of weights associated with the distinct set of eligible products represented in the product vector. If no match was found based on the lookup key, the set of default weights is used. Each of the weights is associated with one of the eligible products and is interpreted as the percentage of inventory to be allocated for the corresponding product. For example, if their were three products a, b, and c with weight values of 50, 40, and 10 respectively, then during step 4350 product a should be selected 50% of the time, b should be selected 40% of the time and c should be selected 10% of the time.

The method for selecting the product is now described by example. Each of the products is given a range of numerical values corresponding to the percentage assigned to each. For example, product a may have the range 1-50, product b the range 51-90, and product c the range 91-100. The selection module 120 then randomly selects a numerical value between 1 and 100, selecting the product whose range the randomly selected number falls into. For example if the selected number were 88, product b would be selected. Once product selection is done in 1550, the product buy, which is ultimately associated with an ad campaign, is chosen as part of step or method 1550. Using the product identifier as a lookup key into the product buy vectors 110, a set of product buy identifiers with associated weight values is returned. The interpretation of the weights, and the method to select one is as described above for selecting a particular product from a list of product and is used to select a given product buy. Each product buy entry in the product buy vectors 110 also contains a identifier for the associated ad campaign or any other value that can be interpreted by the delivery system 130 to select the appropriate ad media to display or to perform the desired action such as a redirect to another distribution channel. The delivery system 130 takes the campaign identifier, and uses it to select at 1560 the appropriate media to display or perform the alternative action, which in turn is returned at 1570 to the publisher system 150 or end user system making the ad call.

During operation, the inventory management module 100 stores the contract and product buy information. An illustration of how the contract data may be stored is shown in Table 22. Each entry represents an individual product buy of a given quantity of inventory for a particular defined product over a plurality of days. The purchase is in support of a given ad product buy, with details of the product buy represented in other data structures. Additionally, the delivery metric, contract type, and context are specified, and these are described below.

TABLE 22

| | | | | | | | | |
|---|---|---|---|---|---|---|---|---|
| | | | Contracts | | | | | |
| Product Buy ID | Product ID | Quantity | Charge | Start Date | End Date | Metric | Contract Type | Context |
| 1 | 3 | 50,000 | $4,000 | 070106 | 093006 | CPC | Auctioned | Contract |
| 2 | 7 | 2,000,000 | $9,600 | 070106 | 101506 | CPM | Guaranteed | Proposal |
| 3 | 5 | — | $7,400 | 070106 | 070706 | CPC | Exclusive | Hold |

The delivery metric represents the delivery terms of the contract and means by which its fulfillment is measured. The CPM (cost per thousand) metric is the most straightforward, in which the specified quantity represents the number of ad impressions associated with the product buy that are to be displayed in accordance with the target segment over the period specified. The CPC (cost per click) metric specifies that a specified quantity of responses in the form of end users clicking on the advertisement (clickthrough) resulting from the display of the advertisements is to be generated during the period specified.

Further, the inventory management module 100 manages the CPC metric by internally translating the number of clickthroughs to the equivalent number of impressions (referred to here as effective CPM (eCPM)). In order to accurately provide this translation, the ratio of clickthroughs to displayed advertisements is first determined by the following or other useful methods. Prior to the start of the actual CPC contract, the set of advertisements associated with the product buy are served for a limited test period on a CPM basis and delivered in accordance with the product intended for the product buy. The specified product can be any product managed by the system. However, the product type will typically be a "distributed" product described earlier and which is ideally suited for test marketing. Each time one of these ads is displayed, the product buy identifier associated with the test product buy is written to the logs by the delivery system 130 along with the all the other normally logged attributes. When an end user clicks on one of these ads, the product buy identifier is also logged by the delivery system 130 along with the other normally logged attributes of the clickthrough log record.

An additional function of the data processing module 30 is to generate an aggregated summary of clickthrough records. An example of the summary data is illustrated in Table 23. Note that for test product buys utilizing a distributed product there can be multiple products associated with a particular product buy. Data is computed by performing an aggregate count of ad display and clickthrough records grouping on the combination of product buy and product for each date and producing a clickthrough rate for each by dividing the count of clickthrough records into the count of displayed records. Additionally, the cost to the publisher per generated click is determined by comparing the average historical CPM and CPC price associated with that product with the quantity of inventory allocated for that product on the test product buy and divided by the number of clickthroughs generated.

TABLE 23

Clickthrough Summary

| Product Buy ID | Product ID | Date | Served | Clicks | Rate | Cost Per Click |
|---|---|---|---|---|---|---|
| 44 | 3 | 062606 | 90,345 | 1,243 | 0.014 | $0.21 |
| 44 | 6 | 062606 | 7,876 | 130 | 0.017 | $0.35 |

For each product associated with the product buy, the inventory module 100 populates the CPC summary data using the following information which is computed using the combination of the contract, the clickthrough summary, and the product daily summary information, and which is illustrated in Table 24.

TABLE 24

CPC Summary

| Product Buy ID | Product ID | Quantity | Start Date | Earliest End Date | Inventory Cost |
|---|---|---|---|---|---|
| 44 | 3 | 1,000,000 | Jul. 1, 2006 | Sep. 30, 2006 | $7,840 |
| 44 | 6 | 1,000,000 | Jul. 1, 2006 | Oct. 14, 2006 | $10,200 |
| 44 | 7 | 1,000,000 | Jul. 1, 2006 | Aug. 14, 2006 | $4,550 |

The anticipated number of eCPM impressions that are required to satisfy the contract is taken from the clickthrough summary and compared with the product availability data. Starting from the contract start date, the earliest contract completion date is determined based on the total availability of the product going forward in time from the contract start date until the expected number of impressions is reached. For each product, the average CPM price is determined using past contract data. The total inventory cost to satisfy the product buy via a given product is then found by taking the average CPM price and multiplying it by the anticipated number of impressions from the clickthrough summary that are expected to achieve the CPC goal.

Regarding product optimization, the inventory management module 100 presents a report of the above information to an end user via the order management system 80 and the client computer 140 so that a product can be selected. The system will recommend the product from the CPC summary data that has an end date equal to or greater than the end date in the proposed CPC contract and that has the lowest inventory cost. Under normal circumstances, this produces the desired number of clickthroughs at the lowest available cost. Once a product is selected and a product buy using the CPC metric is created, the inventory management module 100 translates the quantity of clicks specified in the contract to the equivalent number of displayed ads, which is then used internally by the system to manage both CPC and CPM contracts in the same manner.

Preferably, the inventory module 100 supports three different contract types: guaranteed, exclusive, and auctioned. The guaranteed contract type uses all of the methods previously described to allocate inventory for the product in accordance with the product availability. Newly created guaranteed contracts normally should not allocate inventory in excess of the shown availability for the product. However, the inventory management module 100 also maintains a variable at the product level and system-wide levels which permits a configured amount of overbooking. For example, if this variable is set to 2% for a given product, the system allows the product to be booked to a level 2% beyond the expected forecast. Once inventory is allocated for a guaranteed contract that inventory, both consumed directly and as a side effect of the cannibalization of that product buy on other products is no longer available to other contracts.

Exclusive contracts do not specify a number of impressions but instead allocate the entire amount of available inventory for the specified product for the duration of the contract period. Internally, the exclusive contract type is just translated into a normal guaranteed CPM contract, where the daily inventory is allocated to the remaining available inventory. Preemptible contracts are one of two contract types that utilize non-guaranteed inventory. The preemptible contract type does not allocate inventory and therefore does not impact the availability of inventory for other contract types. Based on the ranking of a preemptible contract relative to other preemptible contracts, if there is sufficient inventory available for the specified contract at the time that the product buy vectors 110 are generated for the selection module 120, then an amount is allocated to that specific contract that is the lesser of the amount specified in the contract or the remaining available inventory for that product. Since the inventory is not held for preemptible contracts that could impact fighting of deliverable inventory, a daily maximum quantity (optionally unlimited) should be specified in addition to the quantity specified over the life of the contract. The ordering criteria for preemptible contracts is configurable to reflect the business rules of the organization and can also be optionally utilize a priority attribute so that one contract can preempt the other, otherwise they are prioritized in ascending order based on the configured priority keys. Preemptible contracts are suitable for handling remnant inventory that remains unsold at the time of contract delivery, and which is being redirected to an alternate inventory delivery system. Additionally, if the remnant inventory for a product is to be divided among two or more preemptible contract allocations, a value for the percentage to allocate to each can be specified in the respective entries in the contract information so that the remaining inventory can be divided accordingly. Alternatively, the inventory module, when generating the product vectors for the selection module, can use its knowledge of inventory, the current and historical eCPM rates of the preemptible allocations, to allocate inventory to the competing preemptible contracts in a manner that results in the highest value while working within the constraints of available inventory and the limits of the contract quantities.

Auctioned inventory contracts have elements in common to both the guaranteed and preemptible contract types. The normal behavior for an auctioned contract is identical to a preemptible contract, in which the priority relative to other auctioned contracts for the same product is the bid price. However, unlike preemptible contracts, auctioned contracts can optionally allocate inventory depending on the system configuration. When an auctioned contract is created, a bid price for that contract is included in the contract information, along with the other contract attributes, like the quantity and specified product. The bid price of the contract can be updated manually through the order management system 80, or via an automated bid management system. Additionally, in the product definition table, each product in the system has an optionally configurable minimum eCPM price. If the system is so configured, and if the value of bid price for a contract is equal to or greater than the minimum eCPM price, then the product buy will allocate inventory, as will other product buys for the same product that are over the product's eCPM price until the product is fully allocated for a given day. Allocating inventory to an auctioned product buy does not guarantee that any individual contract will ultimately get the inventory since other contracts may subsequently be made for a higher price, preempting the first contract, however it will prevent the inventory from being consumed by product buys for other products. An alternative configuration does not use the minimum eCPM price to control allocation but instead uses it as a minimum acceptable contract bid price.

Regardless of whether the product buy allocated inventory or not, at the time product buy vectors 110 are generated for the selection module 120 for auctioned contracts, the inventory for a given product buy is allocated in a priority based on the bid price. Since cannibalization is a factor that will potentially affect the available inventory for the auctioned and preemptible products, the inventory management module 100 will allocate inventory to auctioned campaigns in order of highest bid to lowest bid, regardless of the specified product, ensuring that higher valued inventory is never consumed by lower valued inventory. At the time of generating the product buy vectors 110 for the selection module 120, guaranteed product buys are allocated first, followed by auctioned, and finally preemptible contracts.

At any given time, the inventory management module 100 may be adapted to produce a report showing the quantity of inventory that currently can be expected to deliver for any given auctioned or preemptible contract. Since preemptible contracts do not allocate inventory, the quantity of available inventory that can be used to deliver to a preemptible contract is determined using the methods for availability described earlier, however the count of previously allocated inventory consists of all allocations from guaranteed, exclusive, auctioned, and any preemptible contracts that have a rank preceding the contract of interest. As was noted above, within the domain of auctioned contracts, all contracts are sorted and prioritized by ascending eCPM rate, so that the effects of cannibalization are taken into account in a way that will maximize revenue. Additionally, the inventory management module 100 can report on the availability of a certain product, at a certain bid price, by considering all allocations from guaranteed contracts plus the existing allocations from those contracts for the product with a bid price equal to or greater than the given bid price, less the effects of cannibalization on the product of auctioned contracts for other products that have a bid price equal to or greater than the given bid price.

Contracts also have a context attribute that can take on the value of contract, proposal, or hold. Normal sales contracts, which are the standard contract context, originate from a signed insertion order, which depending on contract type, allocate inventory and, as previously described, are handled for delivery by the selection module 120 and delivery system 130 once the contract is in effect. Additionally, the system supports a proposal context for contracts. Proposals are used for sales purposes and capture the particulars of the intended contract as previously described. However, regardless of contract type, proposals do not allocate and hold any inventory. Therefore, the availability of inventory within the system is not changed from the perspective of product availability lookups for other proposals or contracts.

For insertion orders containing multiple product buy proposals it is necessary to simulate the effects of the cannibalization of inventory by all the products within the order because each product can potentially consume inventory needed by the other, and so it is necessary to see if all of the product buys can succeed concurrently if the order is executed. This is accomplished by combining the inventory allocated by each product proposal within the order with all of the inventory allocated from existing contracts in the system that have allocated inventory, and then recalculating the availability counts for the product using the methods previously described, and returning the results to the order management system 80 and the client computer 140. If any product in the system, which before the order had a positive value for availability, has a negative availability value as a result of the allocation within the order, the proposed order cannot be executed.

Another contract context type is inventory hold. This is available to support sales personnel being able to hold a quantity of inventory in anticipation of a particular contract that is pending. This contract type holds inventory like a normal contract except that is has an expiration date associated with it, which will cause the inventory to be released on that date. Additionally, if for some reason the hold order was still in effect during the contract period, it will not cause an allocation of inventory to be made against the product buy vectors 110.

It should be noted that the inventory management module 100 is preferably able to combine any combination of contract metric, type, and context. For example, it can manage a proposal for an auctioned, CPC contract, which is accomplished by combining the related methods described above. Additionally, the inventory management module 100 can convert contracts from one type into another. For example the system can convert a hold order to a contract, a proposal to a contract, if the inventory is still available, a CPC contract to CPM, or an auction to a guaranteed inventory contract.

Since the inventory data can originate from a variety of sources and be accessed by a variety of users, the inventory management module 100 allows inventory to be assigned to a given sales channel, for the purpose of being able to limit the what inventory is available to different users of the system. For example, if the inventory under management represented a network of sites, some of the sites may have site-specific products and relationships with customers for those specialized products and desire to utilize their in-house sales staff to do so at a potentially higher effective CPM than might be possible in the network. However, these same sites may not have a sufficiently large customer base and sales force to sell the site's entire inventory and desire to allocate a portion of that inventory to the sales force and customer base of the associated network. Further, sales personnel of the site should only be able to report on and directly sell inventory pertaining to their own site, and not be able to access or sell inventory allocated to the network.

Sales personnel that are employed by the network need to have an accurate view of the network inventory available to them in the aggregate, some or all of which may be sourced from a combination of complete or partial allocations from sites participating in the network. These users need to be able to define products that span the network inventory independent of the originating sites, yet that accurately reflect the availability of the inventory available to them. Further, if the quantity of inventory allocated to the network is limited by some quantity or percentage, the characterization of the allocated inventory should not be limited by some arbitrary means of allocation. Additionally, sales personnel employed by the network may have a demand for a certain product and may want to determine the availability of inventory, not currently allocated to the network, for which they can negotiate for and potentially gain sales access to for sales purposes.

The present invention provides a solution for these problems using the following methods. Each user of the system connects to the inventory management module 100 via the order management system 80. The order management system 80 associates each user with a site attribute. The user accounts for sales personnel that are associated with individual sites have this attribute set to the site they are employed by, while network users have this attribute unset, or set to some value that the system will interpret as the user being a network user. When the order management system 80 makes a request to the inventory management system 100 for a product's forecast, allocated, or available quantity, the user's site attribute is included in the request. If the user's site information is specific to an individual site, then only the inventory associated with that site is returned. If the user is a network, user then the full global view of product definitions and inventory across all the sites of the network is returned. Further, requests to allocate inventory are similarly limited according to the site attribute. In some environments this functionality may be unnecessary in which case all users have the site attribute unset, effectively disabling this capability.

An additional mechanism is used to allow individual sites allocate a certain portion of the site's inventory to the network while not imposing any arbitrary constraint on the characterization of the allocated inventory. For example, assuming a given site allocated 100,000 daily ad impressions of the site's 1,000,000 impressions to the network. If the allocation were done by randomly selecting and marking 100,000 impressions of the site's inventory for allocation to the network, a discretionary allocation would have been made, violating the method of logically necessary allocation, since the composition of the allocation would have been preordained, reducing the availability of most products by 10% even though none would have been explicitly allocated. Such behavior is to be avoided. Therefore the inventory management module 100 uses a variant of the "inventory hold" contract type to manage this in a manner consistent with the previously described methods.

By default, a site user can sell that site's entire inventory and a network user has access to and the ability to sell the entire inventory across the network, including inventory specific to an individual site. In order for a site to limit a fixed quantity or percentage of the site's inventory, a special kind of inventory hold contract, referred to here as an allocation contract, is used to limit the quantity of inventory available to both the site and network users. Similar to a hold contract, this contract has the effect of limiting the available quantity of inventory remaining in the system, preventing sales personnel of the site from selling that inventory directly. When an allocation contract is made, the inventory management module 100 also creates a reciprocal contract, referred to here as such, which the system automatically defines for a quantity to represent the remaining portion of the site's inventory that the site has not allocated to the network.

The scope and visibility of these two complimentary contracts differs depending on if the user is a site user or network user. The site-level users will have visibility to the allocation made by the allocation contract causing that inventory to be unavailable to them, but will not be effected by the reciprocal contract. Conversely, network sales personnel will see the effects of the reciprocal contract, but not be affected by the allocation contract. All inventory operations including forecast and availability counts will be affected by such an allocation. To support fast product forecast and availability look-ups, the product daily summary counts are partitioned according to the site identifier. This mechanism is transparent to the selection module 120 and delivery system 130 since like inventory hold contracts, the allocation and reciprocal contracts are not associated with any product buy and therefore are never propagated to delivery system.

This mechanism is now illustrated by way of example. Assume a given site has a daily forecast of 100,000 impressions and wants to allocate 60,000 impressions per day to the network. An allocation contract for the 60,000 daily impressions is created, causing the system to also create a reciprocal contract for the remaining 40,000 impressions. For the sake of illustration, assume no other contract has been created. In this scenario, when a site-level user queries the available inventory at the site level, the effects of the 60,000 impressions assigned to the allocation contract will be considered, however the reciprocal contract will not, resulting in a count of availability of 40,000. Conversely, for the network-level user, the reciprocal contract will be considered while the allocation contract would not, thereby resulting in an availability count of 60,000 to be returned. Equally important, the sales channel mechanism utilizes the method of logically necessary allocation, since it uses the previously described contract and allocation methods of the present invention. In the above scenario, if the site had a forecast of 40,000 impressions of product a, all 40,000 impressions would be available to either the site-level user or the network-level user, not a prorated percentage of each, as would have been the case in a randomly assigned allocation.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A computer-based method for representing and managing an inventory of advertising space that includes a plurality of advertising products and advertising impressions, comprising:
   by a microprocessor, running an inventory management module on a computer;
   by the inventory management module, generating a unique identifier for each of the advertising products within the inventory;
   wherein each of the advertising products comprise at least one attribute of a plurality of attributes and a corresponding attribute value;
   wherein the at least one attribute and corresponding attribute value of one or more of the advertising products has at least one attribute and corresponding attribute value in common with another one of the advertising products;
   by the microprocessor, processing input records associated with the advertising impressions;
   determining, by the microprocessor, for each of the processed input records, advertising products of the plurality of advertising products that match one or more attributes and corresponding attribute values of the input records and associating, by the microprocessor, each said input record with a representation of matching unique identifiers, and defining, by the microprocessor, an advertising product vector and a count of the advertising impression inventory associated with the advertising product vector;
   wherein the advertising product vector comprises a bitmap within which each bit corresponds to each one of the unique identifiers that defines the advertising products in the inventory;
   for the inventory, generating by the microprocessor a representation of the inventory as a plurality of inventory regions, wherein each inventory region is identified by the advertising product vector and its count defining a number of the advertising impressions corresponding to each of the inventory regions;
   storing the advertising product vectors and their counts; and
   in response to an inventory availability or forecast request being received by the inventory management module, providing a report that identifies a relevant portion of the counts for one or more of the advertising products in the inventory to a requesting device using the advertising product vectors.

2. The method of claim 1, wherein the generating of the unique identifiers comprises receiving a segment expression from an order management system and forming the received segment expression into a standardized expression corresponding to one of the plurality of inventory regions.

3. The method of claim 1, wherein the inventory comprises the advertising impressions including the at least one attribute of the plurality of attributes, the at least one attribute tracked by an advertiser or a publisher, and wherein defining the count comprises forecasting for a particular time interval, based on a processing of historical transaction logs, a number of the advertising impressions corresponding to each of the advertising products in the inventory based on the number of the counts for each of the inventory regions associated with each of the advertising products.

4. The method of claim 3, further including:
   receiving by the inventory management module an order query, operating the inventory management module to parse the order query to determine whether criteria in the order query correspond to one of the plurality of advertising products in the inventory;
   wherein when no correspondence is determined by operation of the inventory management module step, generating an additional unique identifier for those advertising products within the inventory that correspond to the criteria, and repeating the processing step to generate an updated representation of the inventory.

5. The method of claim 3, further comprising:
   retrieving by the inventory management module a growth model, the growth model including a plurality of expected growth rates;
   defining for each of the plurality of advertising products in the inventory an expected growth rate of the plurality expected growth rates; and
   applying the expected growth rate as part of the defining counts.

6. The method of claim 1, further comprising:
   receiving a quantity to be allocated from one of the plurality of advertising products in the inventory, in response decrementing an available remaining quantity of the one of the plurality of advertising products in the inventory by the quantity to be allocated, and computing change in the available remaining quantity of all other advertising products in the inventory to account for cannibalization while minimizing effects of the cannibalization on the availabilities of the other advertising products including those advertising products that have inventory in common.

7. The method of claim 1, further comprising:
   determining availability of the plurality of advertising products in the inventory in response to receiving an allocation request, wherein the determining comprises implementing at least one of:
   a hierarchical method of determining advertising product availability that is based on logically necessary allocation to control cannibalization of non-overlapping advertising products and overlapping advertising products of the plurality of advertising products,
   an overlapping set method of determining advertising product availability of the plurality of advertising products,
   a constraining set method of determining advertising product availability of the plurality of advertising products, and
   a lowest cardinality assignment method of determining advertising product availability of the plurality of advertising products.

8. The method of claim 1, further comprising:
   receiving an allocation request identifying an advertising product from the plurality of advertising products in the inventory and an allocation amount, in response determining a correlation of all other advertising products in the inventory to the identified advertising product, and determining advertising product availability after allocation by adjusting the allocation amount by the correlation for each of the advertising products in the inventory and subtracting the adjusted amount from a count of the plurality of advertising products in the inventory.

9. The method of claim 1, further comprising:
   providing the counts and the representation of the inventory as the plurality of inventory regions to a selection module running on a computer, wherein the selection module processes requests for a particular one of the plurality of advertising products in the inventory by processing the plurality of inventory regions and associated counts to reduce cannibalization of the plurality of inventory regions.

\* \* \* \* \*